United States Patent
Nanni et al.

(10) Patent No.: US 11,632,146 B2
(45) Date of Patent: Apr. 18, 2023

(54) METHODS AND APPARATUS FOR LAUNCHING OR RECEIVING ELECTROMAGNETIC WAVES

(71) Applicant: AT&T Intellectual Property I, L.P., Atlanta, GA (US)

(72) Inventors: Emilio Alessandro Nanni, Menlo Park, CA (US); Paul Shala Henry, Holmdel, NJ (US); Liling Xiao, Menlo Park, CA (US); Jeffrey Michael Neilson, Menlo Park, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 230 days.

(21) Appl. No.: 17/034,532

(22) Filed: Sep. 28, 2020

(65) Prior Publication Data
US 2021/0013928 A1    Jan. 14, 2021

Related U.S. Application Data

(63) Continuation of application No. 16/149,170, filed on Oct. 2, 2018, now Pat. No. 10,833,727.

(51) Int. Cl.
*H04B 3/48* (2015.01)
*H04B 3/52* (2006.01)
*H04B 3/56* (2006.01)

(52) U.S. Cl.
CPC ............. *H04B 3/48* (2013.01); *H04B 3/52* (2013.01); *H04B 3/56* (2013.01)

(58) Field of Classification Search
CPC ............. H04B 3/48; H04B 3/52; H04B 3/56
USPC ........................................................ 333/240
See application file for complete search history.

(56) References Cited

U.S. PATENT DOCUMENTS

| | | | |
|---|---|---|---|
| 2,542,980 A | 2/1951 | Barrow |
| 2,685,068 A | 7/1954 | Goubau |
| 2,737,632 A | 3/1956 | Grieg et al. |
| 2,770,783 A | 11/1956 | Clavier et al. |
| 2,852,753 A | 9/1958 | Walter et al. |
| 2,867,776 A | 1/1959 | Wilkinson, Jr. |
| 2,912,695 A | 11/1959 | Cutler |
| 2,921,277 A | 1/1960 | Goubau |

(Continued)

FOREIGN PATENT DOCUMENTS

| | | |
|---|---|---|
| CA | 2515560 A1 | 2/2007 |
| EP | 2568528 B1 | 12/2017 |

(Continued)

OTHER PUBLICATIONS

"International Search Report and Written Opinion", PCT/US2018/015634, dated Jun. 25, 2018, 8 pages.

(Continued)

*Primary Examiner* — Hafizur Rahman
(74) *Attorney, Agent, or Firm* — Guntin & Gust, PLC; John G. Rauch

(57) ABSTRACT

Aspects of the subject disclosure may include, a system configured for generating a signal, and inducing, by a coupler, an electromagnetic wave that propagates along a physical transmission medium. The coupler can be configured to convert the signal into a plurality of wave modes that combine to form the electromagnetic wave having an electromagnetic field configuration that reduces leakage of the electromagnetic wave as the electromagnetic wave propagates along the physical transmission medium. Other embodiments are disclosed.

20 Claims, 43 Drawing Sheets

(56) References Cited

U.S. PATENT DOCUMENTS

| | | |
|---|---|---|
| 2,949,589 A | 8/1960 | Hafner |
| 3,201,724 A | 8/1965 | Hafner |
| 3,389,394 A | 6/1968 | Lewis |
| 3,566,317 A | 2/1971 | Theodore |
| 3,588,754 A | 6/1971 | Hafner |
| 4,367,446 A | 1/1983 | Hall et al. |
| 4,730,172 A | 3/1988 | Bengeult |
| 4,783,665 A | 11/1988 | Lier et al. |
| 4,825,221 A | 4/1989 | Suzuki et al. |
| RE34,036 E | 8/1992 | McGeehan et al. |
| 5,642,121 A | 6/1997 | Martek et al. |
| 5,889,449 A | 3/1999 | Fiedziuszko |
| 5,937,335 A | 8/1999 | Park et al. |
| 6,239,377 B1 | 5/2001 | Nishikawa et al. |
| 7,009,471 B2 | 3/2006 | Elmore |
| 7,043,271 B1 | 5/2006 | Seto et al. |
| 7,194,528 B1 | 3/2007 | Davidow et al. |
| 7,280,033 B2 | 10/2007 | Berkman et al. |
| 7,301,424 B2 | 11/2007 | Suarez-gartner et al. |
| 7,345,623 B2 | 3/2008 | McEwan et al. |
| 7,531,803 B2 | 5/2009 | Mittleman et al. |
| 7,567,154 B2 | 7/2009 | Elmore |
| 7,590,404 B1 | 9/2009 | Johnson et al. |
| 7,915,980 B2 | 3/2011 | Hardacker et al. |
| 7,925,235 B2 | 4/2011 | Konya et al. |
| 8,159,385 B2 | 4/2012 | Farneth et al. |
| 8,212,635 B2 | 7/2012 | Miller, II et al. |
| 8,237,617 B1 | 8/2012 | Johnson et al. |
| 8,253,516 B2 | 8/2012 | Miller, II et al. |
| 8,269,583 B2 | 9/2012 | Miller, II et al. |
| 8,344,829 B2 | 1/2013 | Miller, II et al. |
| 8,736,502 B1 | 5/2014 | Mehr et al. |
| 8,897,697 B1 | 11/2014 | Bennett et al. |
| 9,113,347 B2 | 8/2015 | Henry |
| 9,178,282 B2 | 11/2015 | Mittleman et al. |
| 9,209,902 B2 | 12/2015 | Willis, III et al. |
| 9,312,919 B1 | 4/2016 | Barzegar et al. |
| 9,461,706 B1 | 10/2016 | Bennett et al. |
| 9,490,869 B1 | 11/2016 | Henry |
| 9,509,415 B1 | 11/2016 | Henry et al. |
| 9,520,945 B2 | 12/2016 | Gerszberg et al. |
| 9,525,524 B2 | 12/2016 | Barzegar et al. |
| 9,544,006 B2 | 1/2017 | Henry et al. |
| 9,564,947 B2 | 2/2017 | Stuckman et al. |
| 9,577,306 B2 | 2/2017 | Willis, III et al. |
| 9,608,692 B2 | 3/2017 | Willis, III et al. |
| 9,608,740 B2 | 3/2017 | Henry et al. |
| 9,615,269 B2 | 4/2017 | Henry et al. |
| 9,627,768 B2 | 4/2017 | Henry et al. |
| 9,628,116 B2 | 4/2017 | Willis, III et al. |
| 9,640,850 B2 | 5/2017 | Henry et al. |
| 9,653,770 B2 | 5/2017 | Henry et al. |
| 9,680,670 B2 | 6/2017 | Henry et al. |
| 9,692,101 B2 | 6/2017 | Henry et al. |
| 9,705,561 B2 | 7/2017 | Henry et al. |
| 9,705,571 B2 | 7/2017 | Gerszberg et al. |
| 9,742,462 B2 | 8/2017 | Bennett et al. |
| 9,748,626 B2 | 8/2017 | Henry et al. |
| 9,749,013 B2 | 8/2017 | Barnickel et al. |
| 9,749,053 B2 | 8/2017 | Henry et al. |
| 9,722,318 B2 | 9/2017 | Adriazola et al. |
| 9,768,833 B2 | 9/2017 | Fuchs et al. |
| 9,769,020 B2 | 9/2017 | Henry et al. |
| 9,780,834 B2 | 10/2017 | Henry et al. |
| 9,793,951 B2 | 10/2017 | Henry et al. |
| 9,793,954 B2 | 10/2017 | Bennett et al. |
| 9,847,566 B2 | 12/2017 | Henry et al. |
| 9,853,342 B2 | 12/2017 | Henry et al. |
| 9,860,075 B1 | 1/2018 | Gerszberg et al. |
| 9,865,911 B2 | 1/2018 | Henry et al. |
| 9,866,309 B2 | 1/2018 | Bennett et al. |
| 9,871,282 B2 | 1/2018 | Henry et al. |
| 9,871,283 B2 | 1/2018 | Henry et al. |
| 9,876,264 B2 | 1/2018 | Barnickel et al. |
| 9,876,570 B2 | 1/2018 | Henry et al. |
| 9,876,605 B1 | 1/2018 | Henry et al. |
| 9,882,257 B2 | 1/2018 | Henry et al. |
| 9,893,795 B1 | 2/2018 | Willis et al. |
| 9,912,381 B2 | 3/2018 | Bennett et al. |
| 9,917,341 B2 | 3/2018 | Henry et al. |
| 9,991,580 B2 | 6/2018 | Henry et al. |
| 9,997,819 B2 | 6/2018 | Bennett et al. |
| 9,998,172 B1 | 6/2018 | Barzegar et al. |
| 9,998,870 B1 | 6/2018 | Bennett et al. |
| 9,999,038 B2 | 6/2018 | Barzegar et al. |
| 10,003,364 B2 | 6/2018 | Willis, III et al. |
| 10,009,063 B2 | 6/2018 | Gerszberg et al. |
| 10,009,065 B2 | 6/2018 | Henry et al. |
| 10,009,067 B2 | 6/2018 | Birk et al. |
| 10,009,901 B2 | 6/2018 | Gerszberg |
| 10,027,397 B2 | 7/2018 | Kim |
| 10,027,427 B2 | 7/2018 | Vannucci et al. |
| 10,033,107 B2 | 7/2018 | Henry et al. |
| 10,033,108 B2 | 7/2018 | Henry et al. |
| 10,044,409 B2 | 8/2018 | Barzegar et al. |
| 10,051,483 B2 | 8/2018 | Barzegar et al. |
| 10,051,488 B1 | 8/2018 | Vannucci et al. |
| 10,062,970 B1 | 8/2018 | Vannucci et al. |
| 10,069,535 B2 | 9/2018 | Vannucci et al. |
| 10,079,661 B2 | 9/2018 | Gerszberg et al. |
| 10,090,606 B2 | 10/2018 | Henry et al. |
| 10,096,883 B2 | 10/2018 | Henry et al. |
| 10,097,241 B1 | 10/2018 | Bogdan et al. |
| 10,103,777 B1 | 10/2018 | Henry et al. |
| 10,103,801 B2 | 10/2018 | Bennett et al. |
| 10,123,217 B1 | 11/2018 | Barzegar et al. |
| 10,129,057 B2 | 11/2018 | Willis, III et al. |
| 10,135,145 B2 | 11/2018 | Henry et al. |
| 10,136,434 B2 | 11/2018 | Gerszberg et al. |
| 10,142,086 B2 | 11/2018 | Bennett et al. |
| 10,148,016 B2 | 12/2018 | Johnson et al. |
| 10,154,493 B2 | 12/2018 | Bennett et al. |
| 10,170,840 B2 | 1/2019 | Henry et al. |
| 10,171,158 B1 | 1/2019 | Barzegar et al. |
| 10,200,106 B1 | 2/2019 | Barzegar et al. |
| 10,205,212 B2 | 2/2019 | Henry et al. |
| 10,205,231 B1 | 2/2019 | Henry et al. |
| 10,205,655 B2 | 2/2019 | Barzegar et al. |
| 10,224,981 B2 | 3/2019 | Henry et al. |
| 10,230,426 B1 | 3/2019 | Henry et al. |
| 10,230,428 B1 | 3/2019 | Barzegar et al. |
| 10,243,270 B2 | 3/2019 | Henry et al. |
| 10,244,408 B1 | 3/2019 | Vannucci et al. |
| 10,264,586 B2 | 4/2019 | Beattie, Jr. et al. |
| 10,276,907 B2 | 4/2019 | Bennett et al. |
| 10,284,261 B1 | 5/2019 | Barzegar et al. |
| 10,291,286 B2 | 5/2019 | Henry et al. |
| 10,305,190 B2 | 5/2019 | Britz et al. |
| 10,305,192 B1 | 5/2019 | Rappaport |
| 10,305,197 B2 | 5/2019 | Henry et al. |
| 10,312,567 B2 | 6/2019 | Bennett et al. |
| 10,320,586 B2 | 6/2019 | Henry et al. |
| 10,326,495 B1 | 6/2019 | Barzegar et al. |
| 10,340,573 B2 | 7/2019 | Johnson et al. |
| 10,340,600 B2 | 7/2019 | Henry et al. |
| 10,340,979 B1 | 7/2019 | Barzegar et al. |
| 10,348,391 B2 | 7/2019 | Bennett et al. |
| 10,355,745 B2 | 7/2019 | Henry et al. |
| 10,361,489 B2 | 7/2019 | Britz et al. |
| 10,371,889 B1 | 8/2019 | Barzegar et al. |
| 10,374,277 B2 | 8/2019 | Henry et al. |
| 10,374,278 B2 | 8/2019 | Henry et al. |
| 10,374,281 B2 | 8/2019 | Henry et al. |
| 10,374,316 B2 | 8/2019 | Bennett et al. |
| 10,389,029 B2 | 8/2019 | Henry et al. |
| 10,389,037 B2 | 8/2019 | Johnson et al. |
| 10,389,403 B2 | 8/2019 | Henry et al. |
| 10,389,419 B2 | 8/2019 | Johnson et al. |
| 10,405,199 B1 | 9/2019 | Henry et al. |
| 10,411,356 B2 | 9/2019 | Johnson et al. |
| 10,411,920 B2 | 9/2019 | Henry et al. |
| 10,418,678 B2 | 9/2019 | Henry et al. |
| 10,419,074 B1 | 9/2019 | Evans |
| 10,424,845 B2 | 9/2019 | Johnson et al. |

(56) References Cited

U.S. PATENT DOCUMENTS

| | | |
|---|---|---|
| 10,439,290 B2 | 10/2019 | Adriazola et al. |
| 10,446,899 B2 | 10/2019 | Henry et al. |
| 10,446,936 B2 | 10/2019 | Henry et al. |
| 10,454,151 B2 | 10/2019 | Henry et al. |
| 10,469,156 B1 | 11/2019 | Barzegar et al. |
| 10,469,192 B2 | 11/2019 | Wolniansky et al. |
| 10,469,228 B2 | 11/2019 | Barzegar et al. |
| 10,498,589 B2 | 12/2019 | Barzegar et al. |
| 10,505,248 B2 | 12/2019 | Henry et al. |
| 10,505,249 B2 | 12/2019 | Henry et al. |
| 10,505,250 B2 | 12/2019 | Henry et al. |
| 10,505,252 B2 | 12/2019 | Stuckman et al. |
| 10,505,584 B1 | 12/2019 | Henry et al. |
| 10,511,346 B2 | 12/2019 | Henry et al. |
| 10,516,555 B2 | 12/2019 | Henry et al. |
| 10,523,269 B1 | 12/2019 | Henry et al. |
| 10,523,388 B2 | 12/2019 | Gerszberg et al. |
| 10,530,505 B2 | 1/2020 | Henry et al. |
| 10,547,545 B2 | 1/2020 | Barzegar et al. |
| 10,553,959 B2 | 2/2020 | Vannucci et al. |
| 10,553,960 B2 | 2/2020 | Vannucci et al. |
| 10,554,454 B2 | 2/2020 | Henry et al. |
| 10,555,249 B2 | 2/2020 | Barzegar et al. |
| 10,555,318 B2 | 2/2020 | Willis, III et al. |
| 10,560,152 B2 | 2/2020 | Birk et al. |
| 10,581,275 B2 | 3/2020 | Vannucci et al. |
| 10,587,310 B1 | 3/2020 | Bennett et al. |
| 10,594,039 B2 | 3/2020 | Henry et al. |
| 10,601,494 B2 | 3/2020 | Vannucci |
| 10,608,312 B2 | 3/2020 | Henry et al. |
| 10,623,033 B1 | 4/2020 | Henry et al. |
| 10,623,056 B1 | 4/2020 | Bennett et al. |
| 10,623,057 B1 | 4/2020 | Bennett et al. |
| 10,629,995 B2 | 4/2020 | Rappaport |
| 10,637,149 B2 | 4/2020 | Britz |
| 10,637,535 B1 | 4/2020 | Vannucci et al. |
| 10,665,942 B2 | 5/2020 | Henry et al. |
| 10,673,116 B2 | 6/2020 | Henry et al. |
| 10,680,308 B2 | 6/2020 | Vannucci et al. |
| 10,686,493 B2 | 6/2020 | Barzegar et al. |
| 10,693,667 B2 | 6/2020 | Barzegar et al. |
| 10,714,824 B2 | 7/2020 | Bennett et al. |
| 10,714,831 B2 | 7/2020 | Vannucci et al. |
| 10,727,577 B2 | 7/2020 | Henry et al. |
| 10,727,583 B2 | 7/2020 | Henry et al. |
| 10,727,599 B2 | 7/2020 | Wolniansky |
| 10,727,955 B2 | 7/2020 | Barzegar et al. |
| 10,749,569 B2 | 8/2020 | Barzegar et al. |
| 10,749,570 B2 | 8/2020 | Bennett et al. |
| 10,763,916 B2 | 9/2020 | Henry et al. |
| 10,764,762 B2 | 9/2020 | Barzegar et al. |
| 10,778,286 B2 | 9/2020 | Henry et al. |
| 10,784,721 B2 | 9/2020 | Vannucci et al. |
| 10,790,569 B2 | 9/2020 | Bennett et al. |
| 10,790,593 B2 | 9/2020 | Bennett et al. |
| 10,804,959 B1 | 10/2020 | Bennett et al. |
| 10,804,962 B2 | 10/2020 | Britz |
| 10,811,767 B2 | 10/2020 | Henry et al. |
| 10,812,123 B1 | 10/2020 | Bennett et al. |
| 10,812,136 B1 | 10/2020 | Henry et al. |
| 10,812,139 B2 | 10/2020 | Barzegar et al. |
| 10,812,142 B2 | 10/2020 | Vannucci et al. |
| 10,812,143 B2 | 10/2020 | Vannucci et al. |
| 10,812,144 B1 | 10/2020 | Henry et al. |
| 10,812,174 B2 | 10/2020 | Bennett et al. |
| 10,812,291 B1 | 10/2020 | Barzegar et al. |
| 10,819,035 B2 | 10/2020 | Wolniansky |
| 10,819,391 B2 | 10/2020 | Rappaport et al. |
| 10,820,329 B2 | 10/2020 | Willis, III et al. |
| 10,833,727 B2 | 11/2020 | Nanni et al. |
| 10,833,730 B1 | 11/2020 | Barzegar et al. |
| 10,886,589 B1 | 1/2021 | Rappaport et al. |
| 10,930,992 B1 | 2/2021 | Barzegar et al. |
| 10,931,012 B2 | 2/2021 | Henry et al. |
| 10,938,104 B2 | 3/2021 | Henry |
| 10,938,108 B2 | 3/2021 | Henry et al. |
| 10,951,265 B1 | 3/2021 | Henry et al. |
| 10,951,266 B1 | 3/2021 | Wolniansky et al. |
| 10,951,267 B1 | 3/2021 | Bennett et al. |
| 10,957,977 B2 | 3/2021 | Henry et al. |
| 10,965,344 B2 | 3/2021 | Henry et al. |
| 10,978,773 B2 | 4/2021 | Bennett et al. |
| 11,018,525 B2 | 5/2021 | Vannucci et al. |
| 11,025,299 B2 | 6/2021 | Wolniansky et al. |
| 11,025,460 B2 | 6/2021 | Henry et al. |
| 11,031,667 B1 | 6/2021 | Henry et al. |
| 11,032,819 B2 | 6/2021 | Gerszberg |
| 11,063,334 B2 | 7/2021 | Henry et al. |
| 11,070,250 B2 | 7/2021 | Henry et al. |
| 11,082,091 B2 | 8/2021 | Barzegar et al. |
| 11,121,466 B2 | 9/2021 | Johnson |
| 11,205,857 B2 | 12/2021 | Rappaport et al. |
| 11,223,098 B2 | 1/2022 | Henry et al. |
| 11,277,159 B2 | 3/2022 | Kim et al. |
| 11,283,177 B2 | 3/2022 | Henry et al. |
| 11,283,182 B2 | 3/2022 | Britz et al. |
| 11,356,143 B2 | 6/2022 | Bennett et al. |
| 11,387,560 B2 | 7/2022 | Johnson et al. |
| 11,394,122 B2 | 7/2022 | Wolniansky et al. |
| 2003/0151548 A1 | 8/2003 | Kingsley et al. |
| 2004/0110469 A1 | 6/2004 | Judd et al. |
| 2004/0113756 A1 | 6/2004 | Mollenkopf et al. |
| 2004/0169572 A1 | 9/2004 | Elmore et al. |
| 2004/0218688 A1 | 11/2004 | Santhoff et al. |
| 2005/0017825 A1 | 1/2005 | Hansen |
| 2005/0042989 A1 | 2/2005 | Ho et al. |
| 2005/0085259 A1 | 4/2005 | Conner et al. |
| 2005/0111533 A1 | 5/2005 | Berkman et al. |
| 2005/0258920 A1 | 11/2005 | Elmore et al. |
| 2006/0083269 A1 | 4/2006 | Kang et al. |
| 2007/0229231 A1 | 10/2007 | Hurwitz et al. |
| 2008/0064331 A1 | 3/2008 | Washiro et al. |
| 2008/0125036 A1 | 5/2008 | Konya et al. |
| 2008/0211727 A1 | 9/2008 | Elmore et al. |
| 2008/0252541 A1 | 10/2008 | Diaz et al. |
| 2009/0008753 A1 | 1/2009 | Rofougaran |
| 2009/0079660 A1 | 3/2009 | Elmore et al. |
| 2009/0258652 A1 | 10/2009 | Lambert et al. |
| 2010/0033391 A1 | 2/2010 | McLean et al. |
| 2010/0225426 A1 | 9/2010 | Unger et al. |
| 2010/0277003 A1 | 11/2010 | Von Novak et al. |
| 2011/0110404 A1 | 5/2011 | Washiro |
| 2011/0132658 A1 | 6/2011 | Miller, II et al. |
| 2011/0136432 A1 | 6/2011 | Miller, II et al. |
| 2011/0140911 A1 | 6/2011 | Pant et al. |
| 2011/0187578 A1 | 8/2011 | Farneth et al. |
| 2011/0215887 A1 | 9/2011 | Kunes |
| 2011/0243255 A1 | 10/2011 | Paoletti |
| 2012/0133373 A1 | 5/2012 | Ali et al. |
| 2012/0306587 A1 | 12/2012 | Strid et al. |
| 2013/0064311 A1 | 3/2013 | Turner et al. |
| 2013/0169499 A1 | 7/2013 | Lin et al. |
| 2014/0155054 A1 | 6/2014 | Henry et al. |
| 2014/0167882 A1 | 6/2014 | Shinoda et al. |
| 2014/0176340 A1 | 6/2014 | Liang et al. |
| 2014/0285277 A1 | 9/2014 | Herbsommer et al. |
| 2015/0126107 A1 | 5/2015 | Bennett et al. |
| 2015/0188584 A1 | 7/2015 | Laurent-Michel |
| 2015/0311951 A1 | 10/2015 | Hariz |
| 2016/0080839 A1 | 3/2016 | Fuchs et al. |
| 2016/0094879 A1 | 3/2016 | Gerszberg et al. |
| 2016/0112093 A1 | 4/2016 | Barzegar |
| 2016/0149614 A1 | 5/2016 | Barzegar |
| 2016/0164571 A1 | 6/2016 | Bennett et al. |
| 2016/0182096 A1 | 6/2016 | Panioukov et al. |
| 2016/0197642 A1 | 7/2016 | Henry et al. |
| 2016/0315660 A1 | 10/2016 | Henry |
| 2016/0315662 A1 | 10/2016 | Henry |
| 2016/0359530 A1 | 12/2016 | Bennett |
| 2016/0359541 A1 | 12/2016 | Bennett |
| 2016/0359546 A1 | 12/2016 | Bennett |
| 2016/0359547 A1 | 12/2016 | Bennett et al. |
| 2016/0360533 A1 | 12/2016 | Bennett et al. |
| 2016/0365966 A1 | 12/2016 | Bennett et al. |

(56) References Cited

U.S. PATENT DOCUMENTS

| | | |
|---|---|---|
| 2017/0012667 A1 | 1/2017 | Bennett |
| 2017/0018852 A1 | 1/2017 | Adriazola et al. |
| 2017/0018856 A1 | 1/2017 | Henry et al. |
| 2017/0019130 A1 | 1/2017 | Henry et al. |
| 2017/0033465 A1 | 2/2017 | Henry et al. |
| 2017/0033953 A1 | 2/2017 | Henry et al. |
| 2017/0033954 A1 | 2/2017 | Henry et al. |
| 2017/0079037 A1 | 3/2017 | Gerszberg et al. |
| 2017/0079038 A1 | 3/2017 | Gerszberg et al. |
| 2017/0079039 A1 | 3/2017 | Gerszberg et al. |
| 2017/0085003 A1 | 3/2017 | Johnson et al. |
| 2017/0093693 A1 | 3/2017 | Barzegar et al. |
| 2017/0110795 A1 | 4/2017 | Henry |
| 2017/0110804 A1 | 4/2017 | Henry et al. |
| 2017/0229782 A1 | 8/2017 | Adriazola et al. |
| 2018/0048497 A1 | 2/2018 | Henry et al. |
| 2018/0054232 A1 | 2/2018 | Henry et al. |
| 2018/0054233 A1 | 2/2018 | Henry et al. |
| 2018/0054234 A1 | 2/2018 | Stuckman et al. |
| 2018/0062886 A1 | 3/2018 | Paul et al. |
| 2018/0069594 A1 | 3/2018 | Henry et al. |
| 2018/0069731 A1 | 3/2018 | Henry et al. |
| 2018/0076515 A1 | 3/2018 | Perlman et al. |
| 2018/0076982 A1 | 3/2018 | Henry et al. |
| 2018/0076988 A1 | 3/2018 | Willis, III et al. |
| 2018/0077709 A1 | 3/2018 | Gerszberg |
| 2018/0108997 A1 | 4/2018 | Henry et al. |
| 2018/0108998 A1 | 4/2018 | Henry et al. |
| 2018/0108999 A1 | 4/2018 | Henry et al. |
| 2018/0115040 A1 | 4/2018 | Bennett et al. |
| 2018/0115058 A1 | 4/2018 | Henry et al. |
| 2018/0115060 A1 | 4/2018 | Bennett et al. |
| 2018/0115075 A1 | 4/2018 | Bennett et al. |
| 2018/0115081 A1 | 4/2018 | Johnson et al. |
| 2018/0123207 A1 | 5/2018 | Henry et al. |
| 2018/0123208 A1 | 5/2018 | Henry et al. |
| 2018/0123643 A1 | 5/2018 | Henry et al. |
| 2018/0123836 A1 | 5/2018 | Henry et al. |
| 2018/0151957 A1 | 5/2018 | Bennett et al. |
| 2018/0159195 A1 | 6/2018 | Henry et al. |
| 2018/0159196 A1 | 6/2018 | Henry et al. |
| 2018/0159197 A1 | 6/2018 | Henry et al. |
| 2018/0159228 A1 | 6/2018 | Britz et al. |
| 2018/0159229 A1 | 6/2018 | Britz |
| 2018/0159230 A1 | 6/2018 | Henry et al. |
| 2018/0159232 A1 | 6/2018 | Henry et al. |
| 2018/0159235 A1 | 6/2018 | Wolniansky |
| 2018/0159238 A1 | 6/2018 | Wolniansky |
| 2018/0159240 A1 | 6/2018 | Henry et al. |
| 2018/0159243 A1 | 6/2018 | Britz et al. |
| 2018/0166761 A1 | 6/2018 | Henry et al. |
| 2018/0166784 A1 | 6/2018 | Johnson et al. |
| 2018/0166785 A1 | 6/2018 | Henry et al. |
| 2018/0166787 A1 | 6/2018 | Johnson et al. |
| 2018/0167130 A1 | 6/2018 | Vannucci |
| 2018/0167927 A1 | 6/2018 | Beattie, Jr. et al. |
| 2018/0331720 A1 | 11/2018 | Adriazola et al. |
| 2019/0013577 A1 | 1/2019 | Henry et al. |
| 2019/0074563 A1 | 3/2019 | Henry et al. |
| 2019/0074580 A1 | 3/2019 | Henry et al. |
| 2019/0074864 A1 | 3/2019 | Henry et al. |
| 2019/0074865 A1 | 3/2019 | Henry et al. |
| 2019/0074878 A1 | 3/2019 | Henry et al. |
| 2019/0075470 A1 | 3/2019 | Bennett et al. |
| 2019/0104419 A1 | 4/2019 | Barzegar et al. |
| 2019/0104420 A1 | 4/2019 | Barzegar et al. |
| 2019/0123442 A1 | 4/2019 | Vannucci et al. |
| 2019/0123783 A1 | 4/2019 | Henry et al. |
| 2019/0140679 A1 | 5/2019 | Vannucci et al. |
| 2019/0174506 A1 | 6/2019 | Willis, III et al. |
| 2019/0181532 A1 | 6/2019 | Vannucci et al. |
| 2019/0181683 A1 | 6/2019 | Vannucci et al. |
| 2019/0296430 A1 | 9/2019 | Bennett et al. |
| 2019/0305413 A1 | 10/2019 | Henry et al. |
| 2019/0305592 A1 | 10/2019 | Vannucci et al. |
| 2019/0305820 A1 | 10/2019 | Barzegar et al. |
| 2020/0014423 A1 | 1/2020 | Britz |
| 2020/0076088 A1 | 3/2020 | Bennett et al. |
| 2020/0083744 A1 | 3/2020 | Vannucci et al. |
| 2020/0083927 A1 | 3/2020 | Henry et al. |
| 2020/0106477 A1 | 4/2020 | Nanni et al. |
| 2020/0119934 A1 | 4/2020 | Barzegar et al. |
| 2020/0153095 A1 | 5/2020 | Henry et al. |
| 2020/0153096 A1 | 5/2020 | Henry et al. |
| 2020/0161757 A1 | 5/2020 | Henry |
| 2020/0174185 A1 | 6/2020 | Barzegar et al. |
| 2020/0176847 A1 | 6/2020 | Rappaport et al. |
| 2020/0176848 A1 | 6/2020 | Bennett et al. |
| 2020/0176879 A1 | 6/2020 | Wolniansky et al. |
| 2020/0176881 A1 | 6/2020 | Britz et al. |
| 2020/0176888 A1 | 6/2020 | Henry et al. |
| 2020/0177234 A1 | 6/2020 | Barzegar et al. |
| 2020/0177237 A1 | 6/2020 | Barzegar et al. |
| 2020/0177238 A1 | 6/2020 | Barzegar et al. |
| 2020/0194863 A1 | 6/2020 | Bennett et al. |
| 2020/0195302 A1 | 6/2020 | Vannucci et al. |
| 2020/0195303 A1 | 6/2020 | Vannucci et al. |
| 2021/0167811 A1 | 6/2021 | Henry et al. |
| 2021/0175595 A1 | 6/2021 | Henry et al. |
| 2021/0175698 A1 | 6/2021 | Barnickel et al. |
| 2021/0175926 A1 | 6/2021 | Henry et al. |
| 2021/0176010 A1 | 6/2021 | Bennett et al. |
| 2022/0302958 A1 | 9/2022 | Bennett et al. |
| 2022/0303915 A1 | 9/2022 | Bennett et al. |

FOREIGN PATENT DOCUMENTS

| | | |
|---|---|---|
| EP | 1898532 B1 | 12/2018 |
| WO | 8605327 A1 | 9/1986 |
| WO | 2004054159 A2 | 6/2004 |
| WO | 2013008292 A1 | 1/2013 |
| WO | 2015069431 A2 | 5/2015 |
| WO | 2016060761 A1 | 4/2016 |
| WO | 2016171914 A1 | 10/2016 |
| WO | 2018106455 A1 | 6/2018 |
| WO | 2018106684 A1 | 6/2018 |
| WO | 2018106915 A1 | 6/2018 |
| WO | 2019050752 A1 | 3/2019 |

OTHER PUBLICATIONS

Akalin, Tahsin et al., "Single-Wire Transmission Lines at Terahertz Frequencies", IEEE Transactions on Microwave Theory and Techniques, vol. 54, No. 6, 2006, 2762-2767.

Alam, M. N. et al., "Novel Surface Wave Exciters for Power Line Fault Detection and Communications", Department of Electrical Engineering, University of South Carolina, Antennas and Propagation (APSURSI), 2011 IEEE International Symposium, IEEE, 2011, 1-4.

Barlow, H. M. et al., "Surface Waves", 621.396.11 : 538.566, Paper No. 1482 Radio Section, 1953, pp. 329-341.

Corridor Systems, , "A New Approach to Outdoor DAS Network Physical Layer Using E-Line Technology", Mar. 2011, 5 pages.

Elmore, Glenn et al., "A Surface Wave Transmission Line", QEX, May/Jun. 2012, pp. 3-9.

Elmore, Glenn , "Introduction to the Propagating Wave on a Single Conductor", www.corridor.biz, Jul. 27, 2009, 30 pages.

Friedman, M et al., "Low-Loss RF Transport Over Long Distances", IEEE Transactions on Microwave Theory and Techniques, vol. 49, No. 2, Feb. 2001, 8 pages.

Goubau, Georg et al., "Investigation of a Surface-Wave Line for Long Distance Transmission", 1952, 263-267.

Goubau, Georg et al., "Investigations with a Model Surface Wave Transmission Line", IRE Transactions on Antennas and Propagation, 1957, 222-227.

Goubau, Georg , "Open Wire Lines", IRE Transactions on Microwave Theory and Techniques, 1956, 197-200.

Goubau, Georg , "Single-Conductor Surface-Wave Transmission Lines", Proceedings of the I.R.E., 1951, 619-624.

(56) References Cited

OTHER PUBLICATIONS

Goubau, Georg, "Surface Waves and Their Application to Transmission Lines", Radio Communication Branch, Coles Signal Laboratory, Mar. 10, 1950, 1119-1128.
Goubau, Georg, "Waves on Interfaces", IRE Transactions on Antennas and Propagation, Dec. 1959, 140-146.
Ren-Bin, Zhong et al., "Surface plasmon wave propagation along single metal wire", Chin. Phys. B, vol. 21, No. 11, May 2, 2012, 9 pages.
Sommerfeld, A., "On the propagation of electrodynamic waves along a wire", Annals of Physics And Chemistry New Edition, vol. 67, No. 2, 1899, 72 pages.
Villaran, Michael et al., "Condition Monitoring of Cables Task 3 Report: Condition Monitoring Techniques for Electric Cables", Brookhaven National Laboratory, Technical Report, Nov. 30, 2009, 89 pages.
Wang, Hao et al., "Dielectric Loaded Substrate Integrated Waveguide (SIW)—Plan Horn Antennas", IEEE Transactions on Antennas and Propagation, IEEE Service Center, Piscataway, NJ, US, vol. 56, No. 3, Mar. 1, 2010, 640-647.
Wang, Kanglin, "Dispersion of Surface Plasmon Polaritons on Metal Wires in the Terahertz Frequency Range", Physical Review Letters, PRL 96, 157401, 2006, 4 pages.

300

400

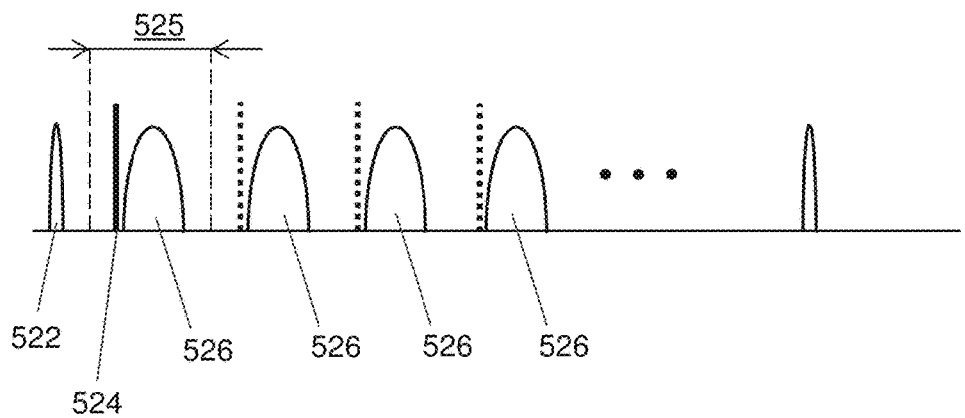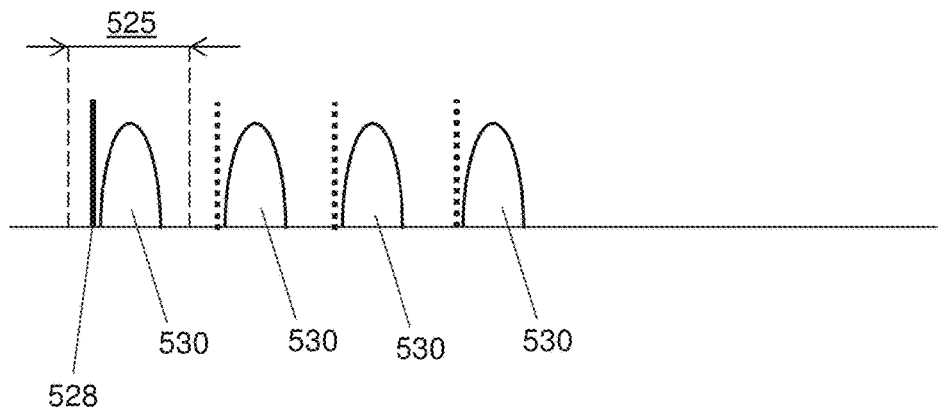
FIG. 5C

560

570

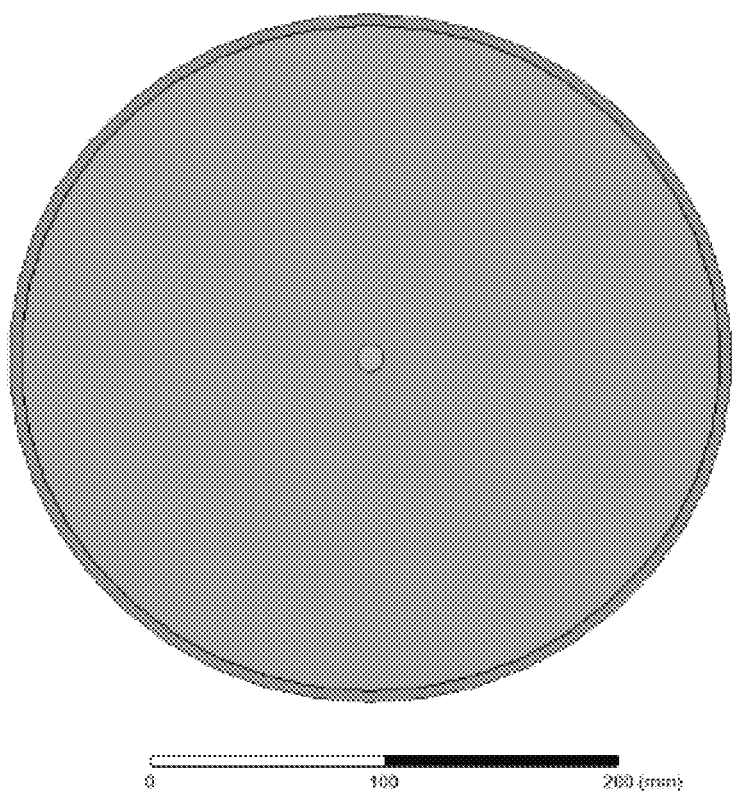
FIG. 7A1

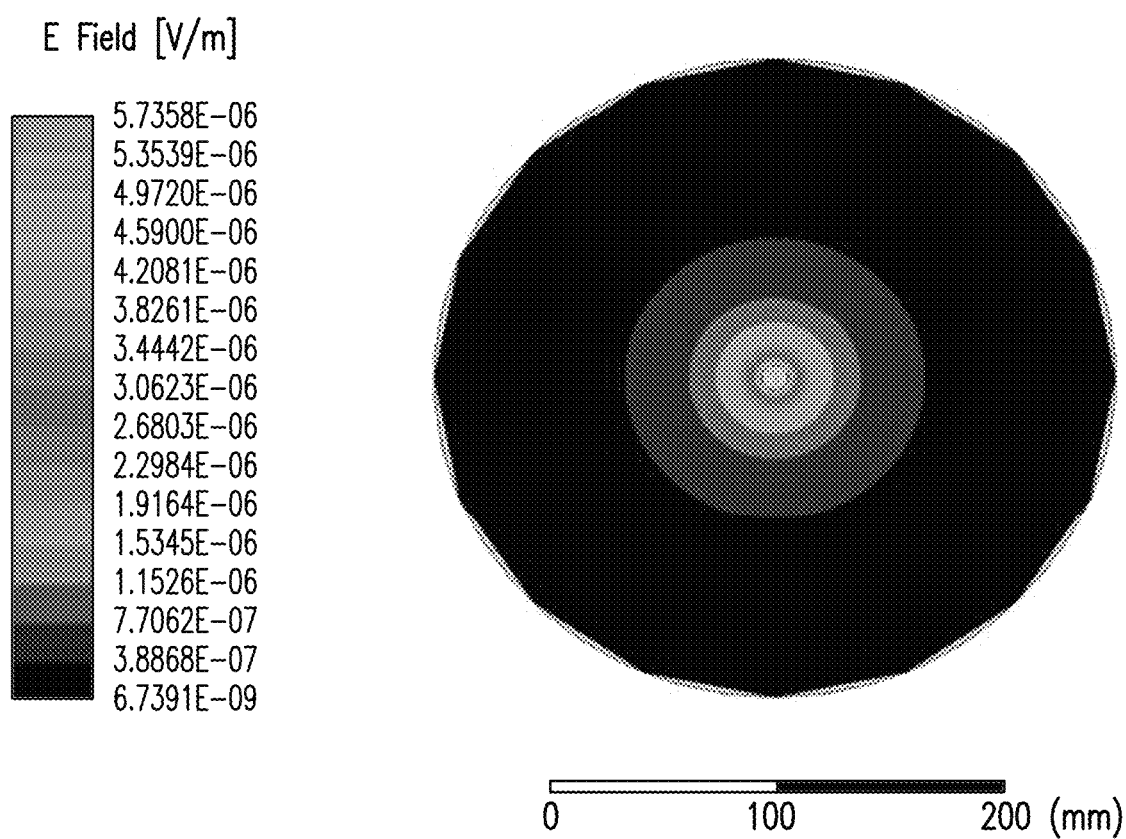
FIG. 7A2

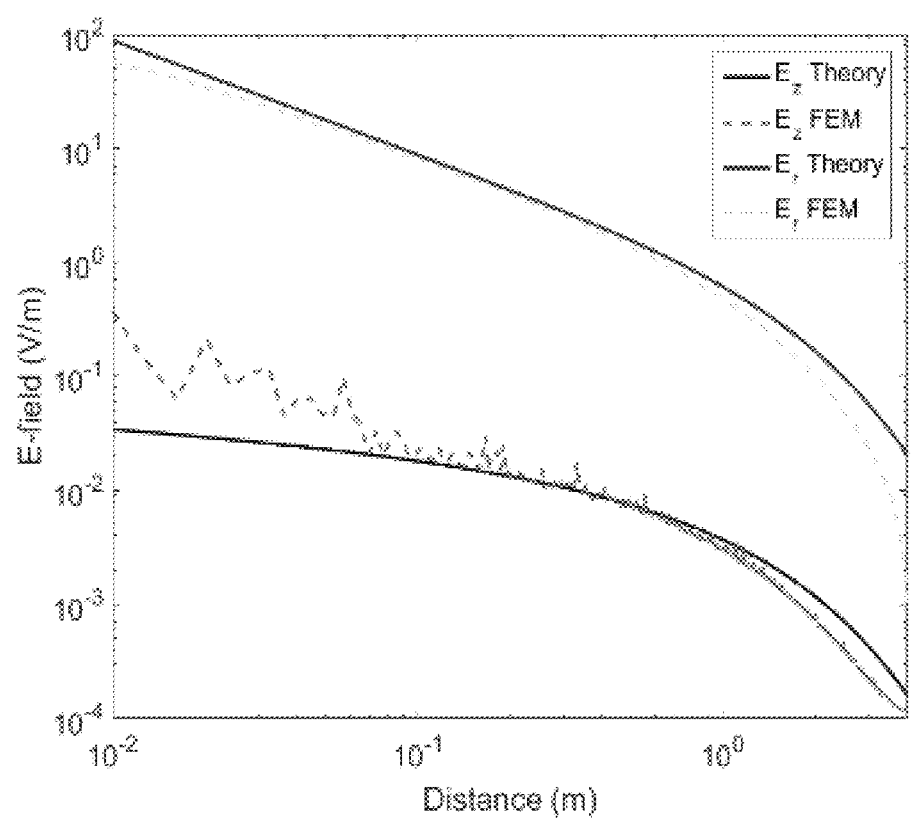
FIG. 7A3

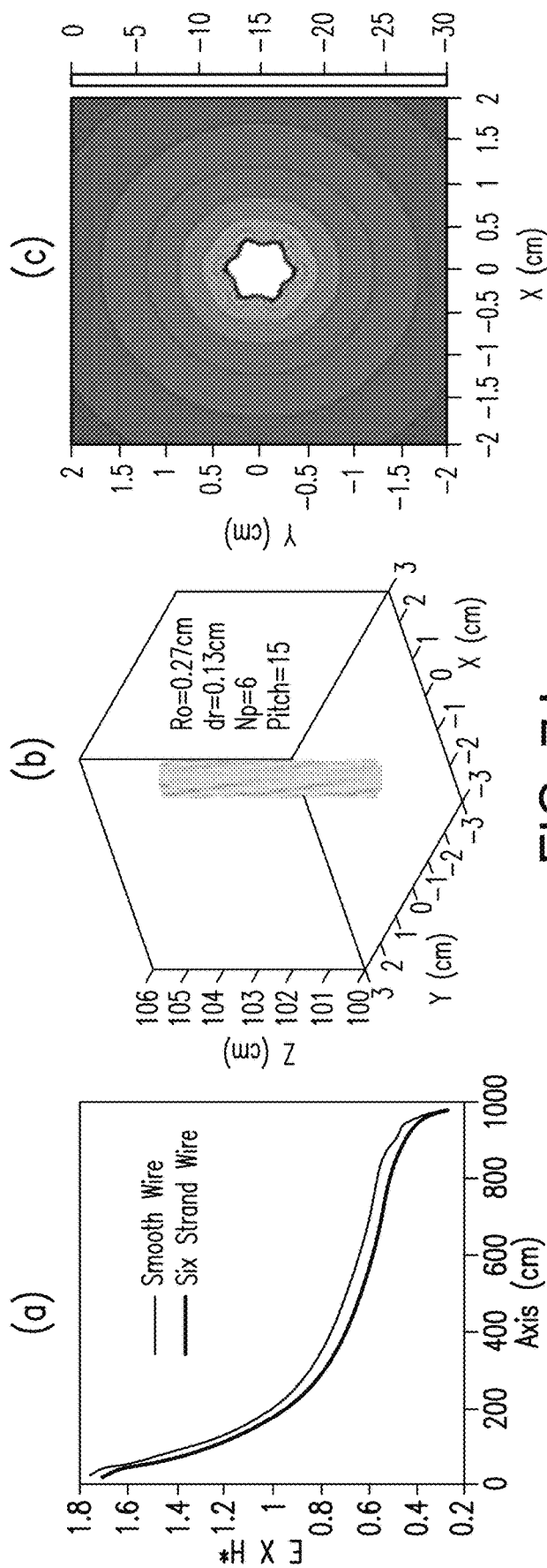
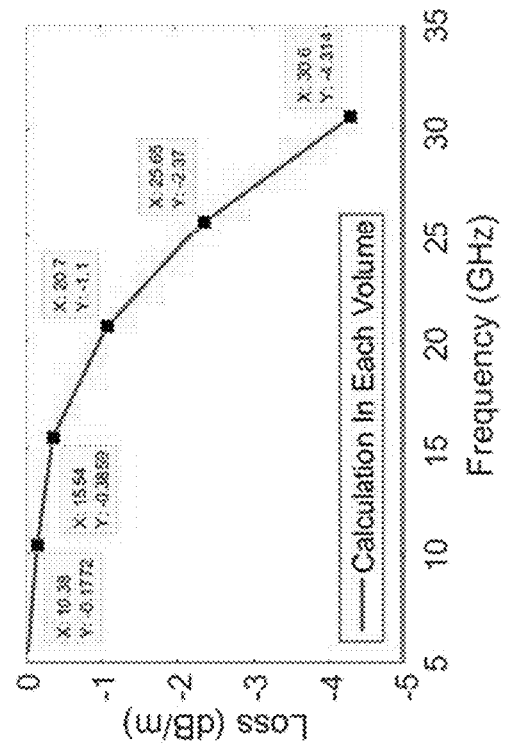
FIG. 7J
FIG. 7K

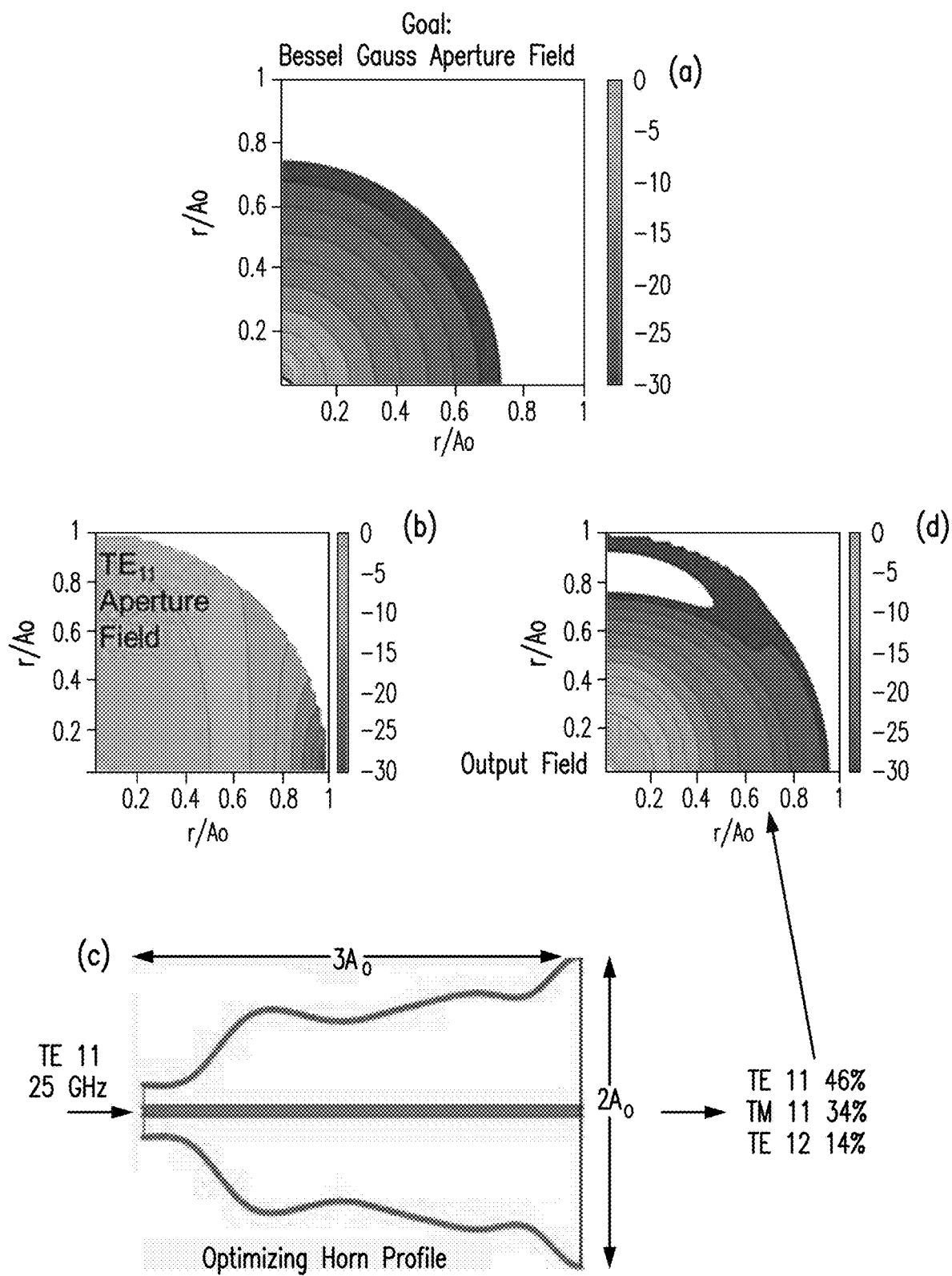
FIG. 7P1A

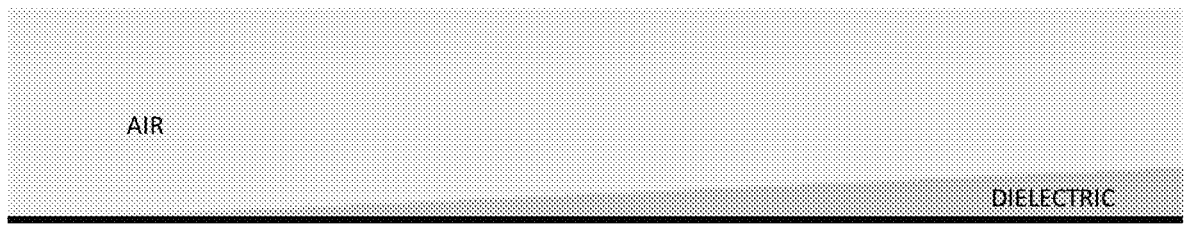
FIG. 7P1B
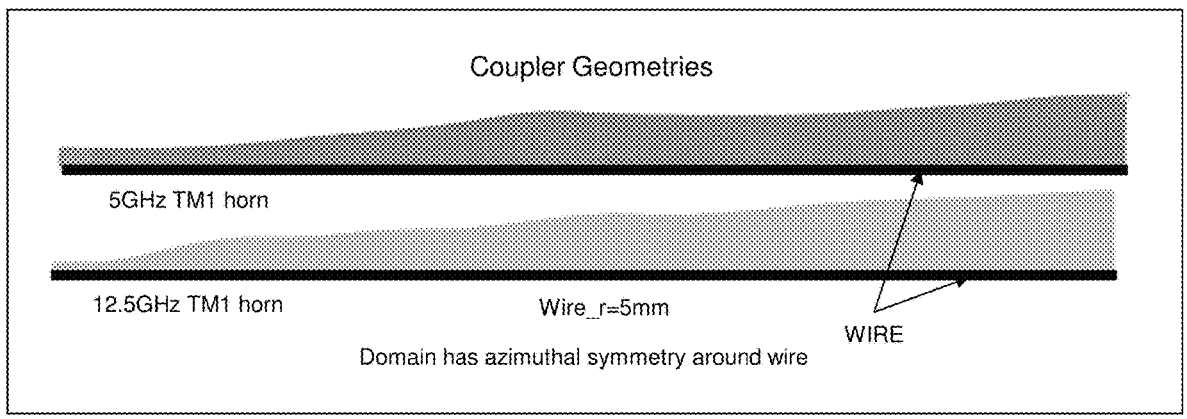
FIG. 7P1C

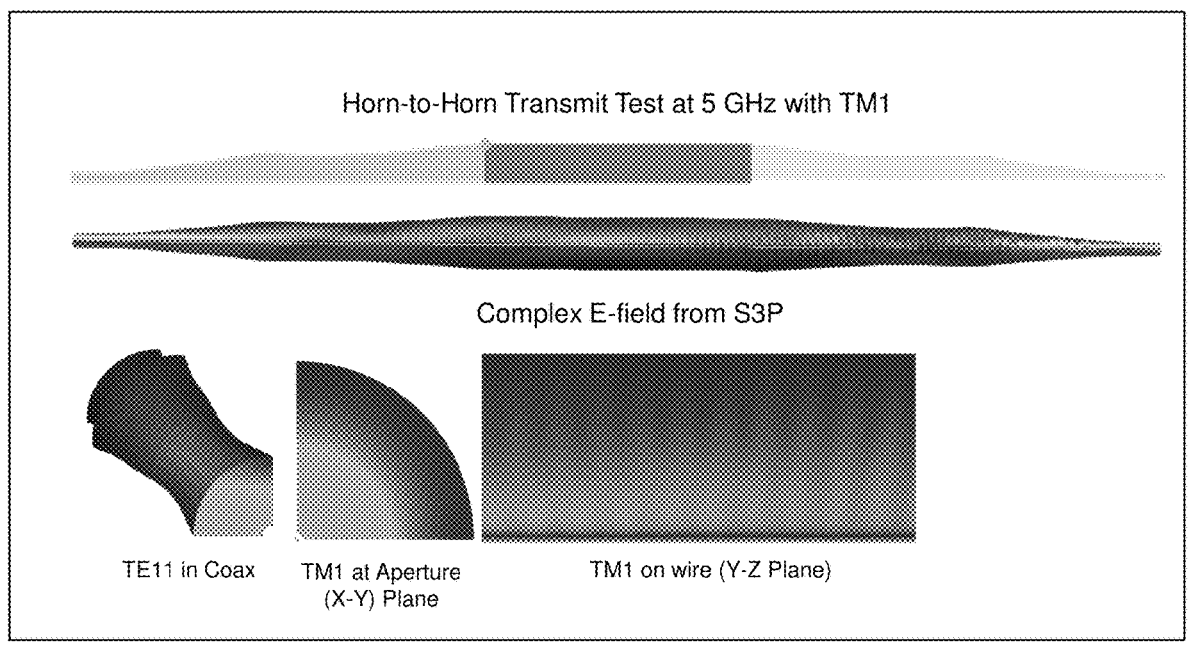
FIG. 7P1D

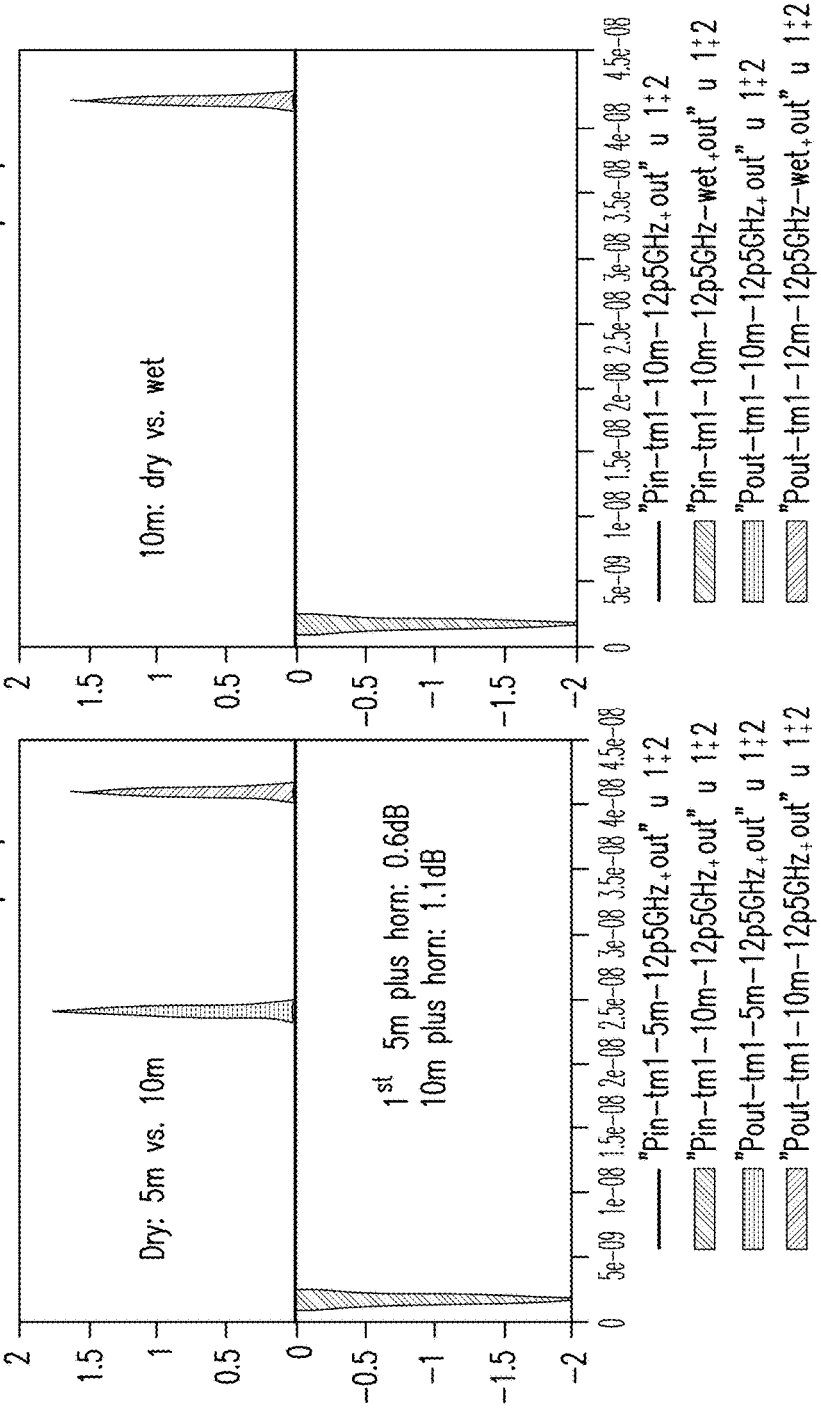
FIG. 7P1E

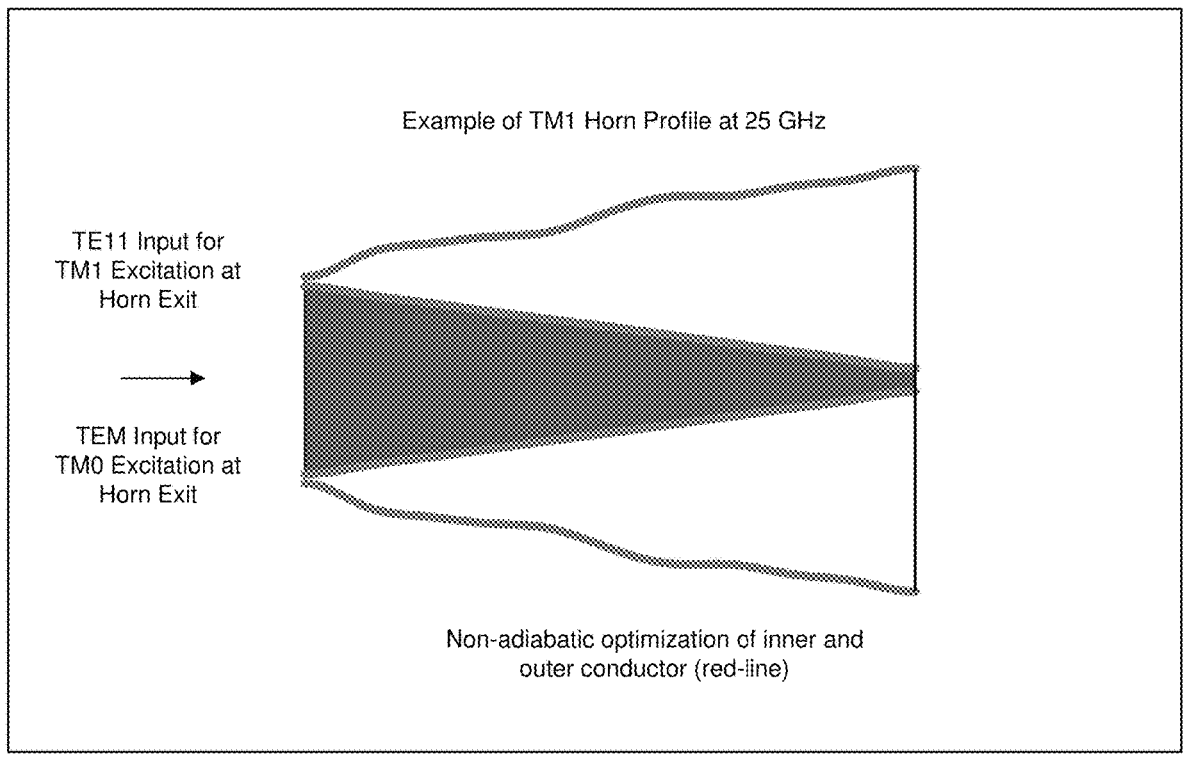
FIG. 7P1F

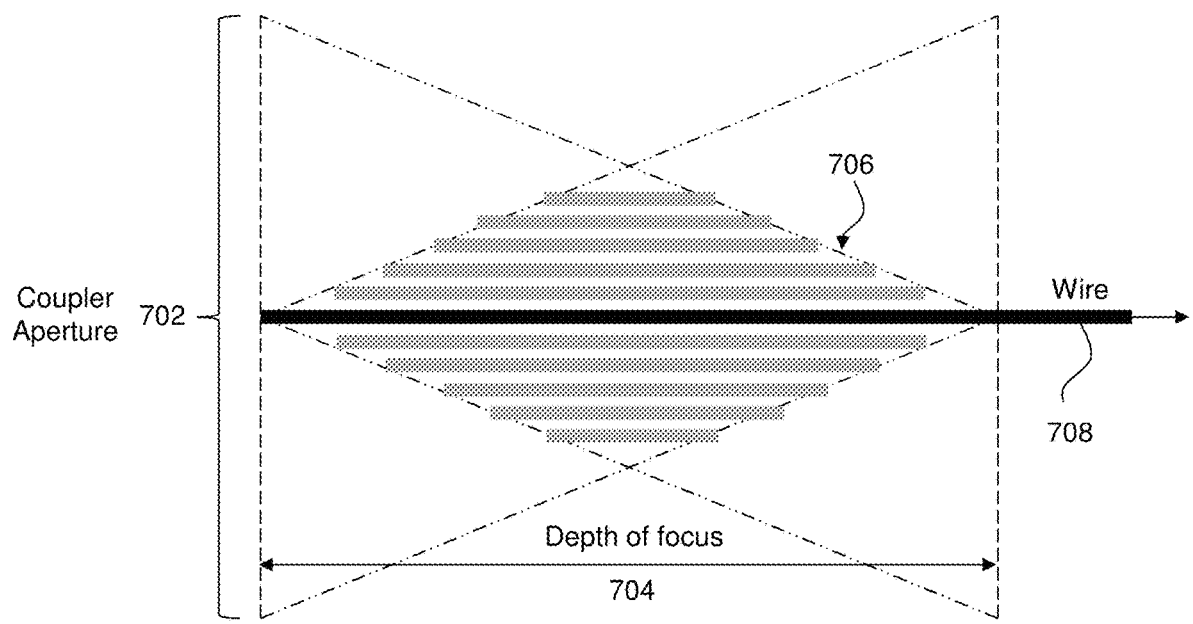
FIG. 7P2

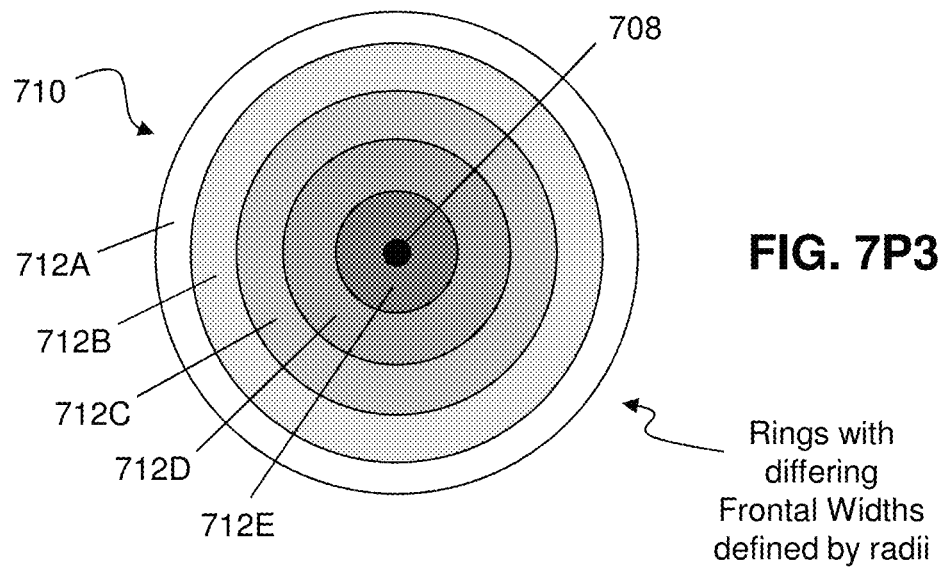
FIG. 7P3
Rings with differing Frontal Widths defined by radii
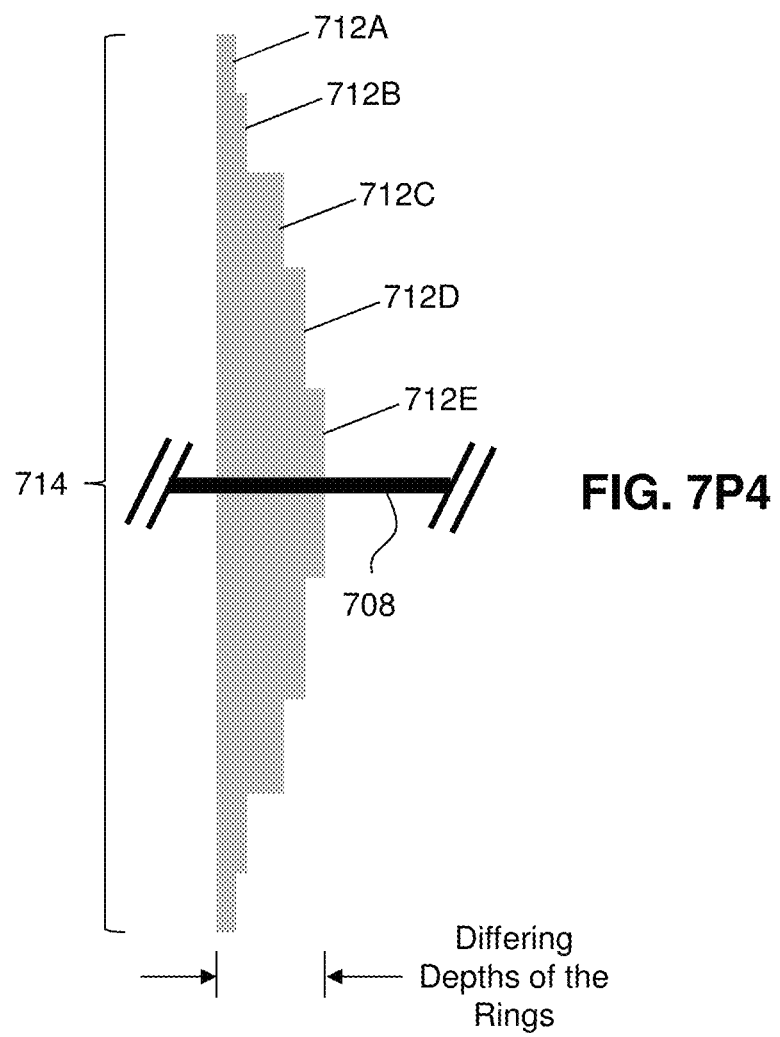
FIG. 7P4
Differing Depths of the Rings

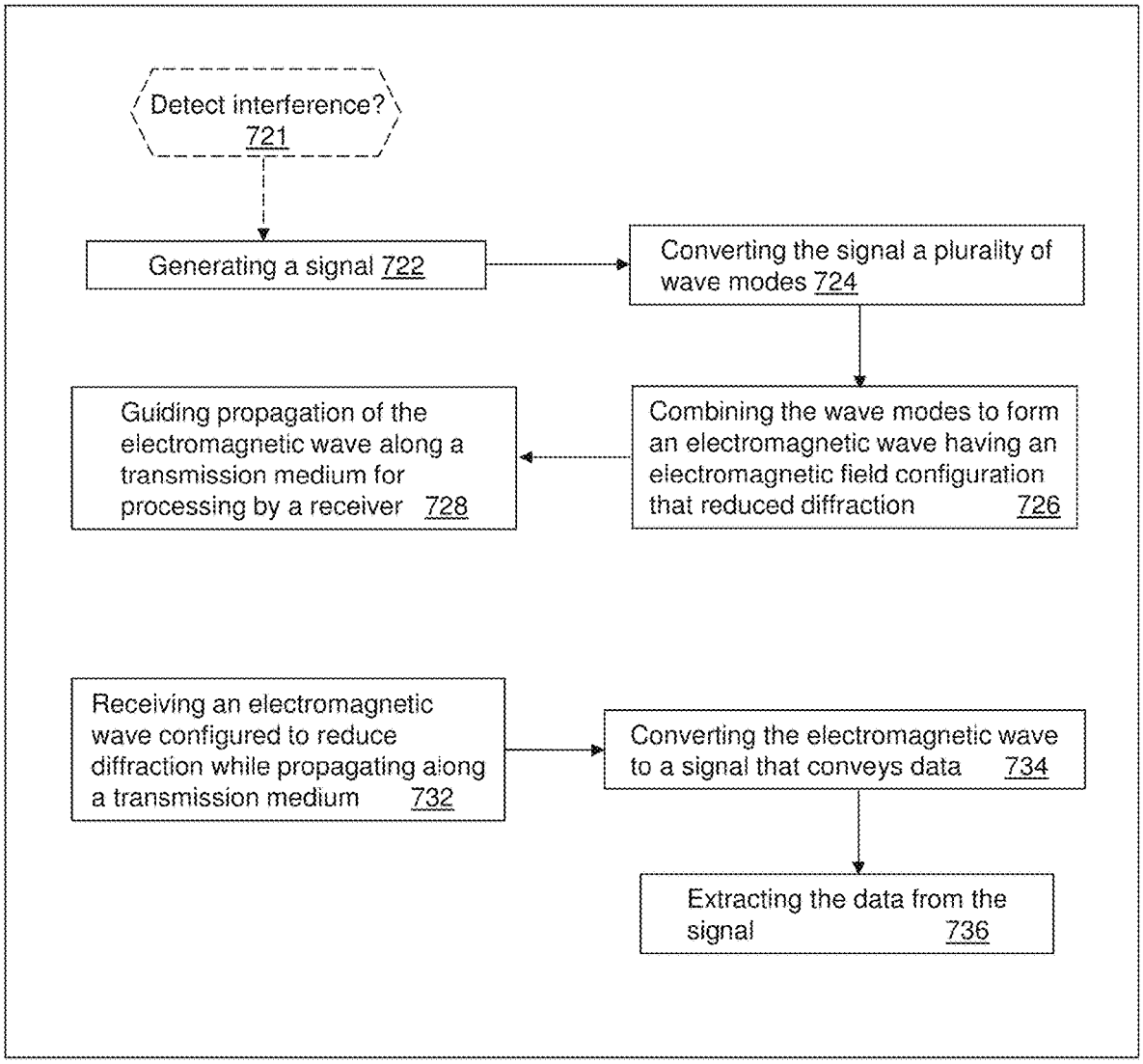
FIG. 7P5

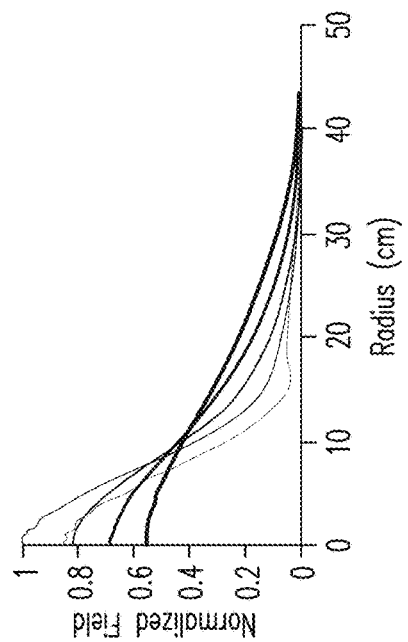
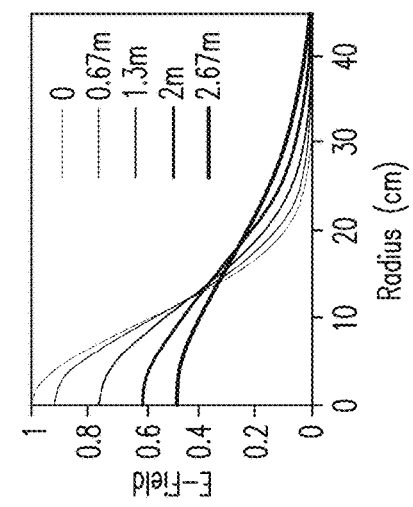
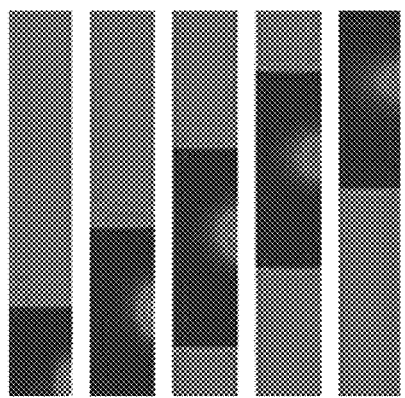
FIG. 7Q
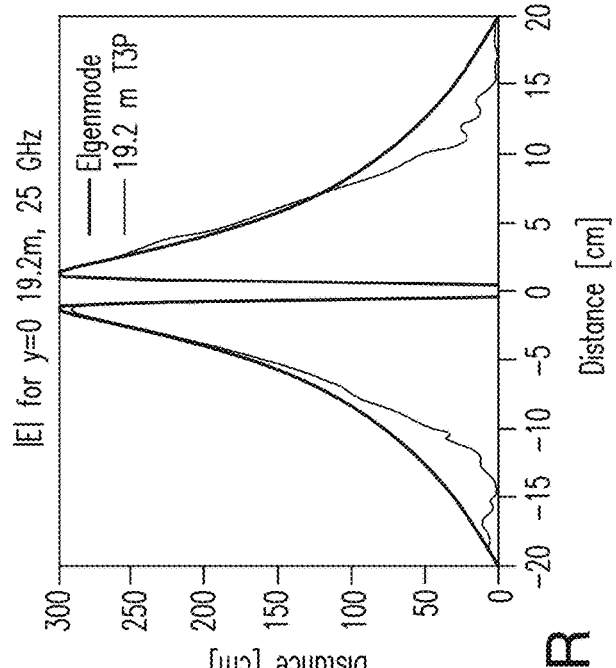
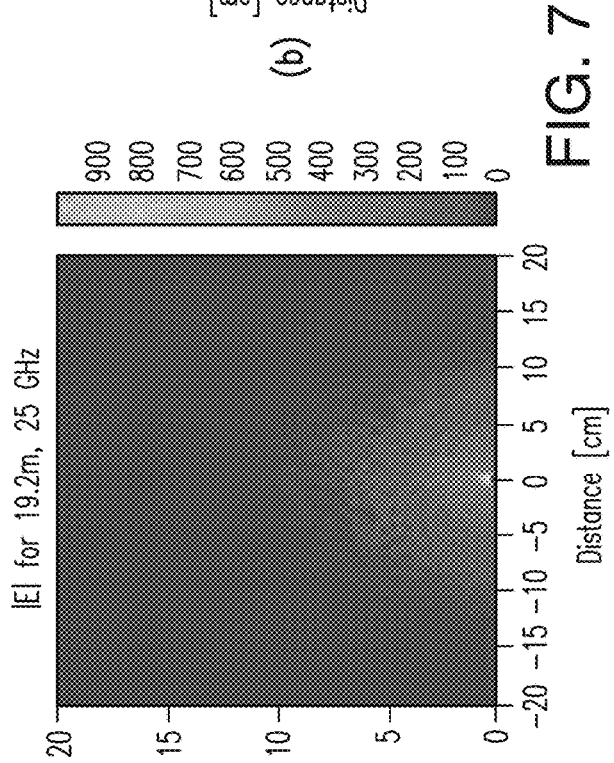
FIG. 7R

METHODS AND APPARATUS FOR LAUNCHING OR RECEIVING ELECTROMAGNETIC WAVES

CROSS REFERENCE TO RELATED APPLICATIONS

This application is a continuation of U.S. patent application Ser. No. 16/149,170 filed on Oct. 2, 2018, pending. All sections of the aforementioned application are incorporated herein by reference in their entirety.

STATEMENT REGARDING SPONSORED RESEARCH OR DEVELOPMENT

The Government has rights in this invention pursuant to the Strategic Partnership Project Agreement ([17-047]) between Stanford University and AT&T Services, Inc.

FIELD OF THE DISCLOSURE

The subject disclosure relates to methods and apparatus for launching or receiving electromagnetic waves.

BACKGROUND

As smart phones and other portable devices increasingly become ubiquitous, and data usage increases, macrocell base station devices and existing wireless infrastructure in turn require higher bandwidth capability in order to address the increased demand. To provide additional mobile bandwidth, small cell deployment is being pursued, with microcells and picocells providing coverage for much smaller areas than traditional macrocells.

In addition, most homes and businesses have grown to rely on broadband data access for services such as voice, video and Internet browsing, etc. Broadband access networks include satellite, 4G or 5G wireless, power line communication, fiber, cable, and telephone networks.

BRIEF DESCRIPTION OF THE DRAWINGS

Reference will now be made to the accompanying drawings, which are not necessarily drawn to scale, and wherein:

FIG. 5C is a graphical diagram illustrating an example, non-limiting embodiment of downlink and uplink communication techniques for enabling a base station to communicate with communication nodes in accordance with various aspects described herein.

FIG. 7A1 is a graphical diagram illustrating, an example, non-limiting embodiment of an eigenmode simulation with metal wire (orange), vacuum (blue) and PML (pink) in accordance with various aspects described herein.

FIG. 7A2 is a graphical diagram illustrating, an example, non-limiting embodiment of an electric field magnitude for a 20 GHz Sommerfeld wave propagating on a 5 mm radius copper wire in accordance with various aspects described herein.

FIG. 7A3 is a graphical diagram illustrating, an example, non-limiting embodiment of large radius simulations comparing radial and longitudinal electric field between theory and simulation in accordance with various aspects described herein.

FIG. 7I is a graphical diagram illustrating, an example, non-limiting embodiment of a radial field intensity versus distance for three excitation frequencies. The light-yellow lines at the beginning and end of the calculation are the surface position of the horns in accordance with various aspects described herein.

FIG. 7J is a graphical diagram illustrating, an example, non-limiting embodiment of plots for wire transmission calculations. (a) Power flow along the wire for smooth and six strand wire case. (b) Mesh used to model six strand wire. (c) Magnitude of transverse electric field at 500 cm in accordance with various aspects described herein.

FIG. 7K is a graphical diagram illustrating, an example, non-limiting embodiment of loss as a function of frequency calculated with the Eigenmode solver for the Sommerfeld $TM_0$ mode with a radius of 0.5 cm on aluminum wire with a 0.1 mm water film thickness in accordance with various aspects described herein.

FIG. 7P1A is a graphical diagram illustrating, an example, non-limiting embodiment of (a) target field (b) Initial field distribution of the TE11 mode at the entrance aperture of (c) the horn, and (d) the output field profile of the horn which has mode converted and is closer to the initial target field.

FIG. 7P1B is a graphical diagram illustrating, an example, non-limiting embodiment of a tapered direlectric coating on a transmission medium.

FIG. 7P1C are graphical diagrams illustrating, an example, non-limiting embodiments of horn geometries.

FIGS. 7P1D and 7P1E are graphical diagrams illustrating, example, non-limiting embodiments of simulated performance of a horn structure as depicted in FIG. 7P1C at 5 GHz and 12.5 GHz, respectively.

FIG. 7P1F is a graphical diagram illustrating, an example, non-limiting embodiment of a horn.

FIG. 7P2 is a graphical diagram illustrating, an example, non-limiting embodiment of a desired beam structure of an electromagnetic wave in accordance with various aspects described herein.

FIG. 7P3 is a graphical diagram illustrating, an example, non-limiting embodiment of a front-view of an aperture of a coupler in accordance with various aspects described herein.

FIG. 7P4 is a graphical diagram illustrating, an example, non-limiting embodiment of a side-view of the aperture of the coupler of FIG. 7P3 in accordance with various aspects described herein.

FIG. 7P5 illustrates a flow diagram of an example, non-limiting embodiment of a method in accordance with various aspects described herein.

FIG. 7Q is a graphical diagram illustrating, an example, non-limiting embodiment of simulation in T3P for a Bessel-Gauss $TM_1$ excitation with no wire demonstrating divergence over 3 m for a 10 GHz bandwidth, 1 ns pulse. (a) Electric field distribution for five progressive times during the simulation. (b) Analytical fields compared with (c) numerical result for five distances. The transverse radius of the simulation domain was 0.5 m in accordance with various aspects described herein.

FIG. 7R is a graphical diagram illustrating, an example, non-limiting embodiment of (a) Magnitude of the electric field on the XY plane at 19.2 m for a 25 GHz, r=0.5 cm wire, t=0.1 mm water film, $TM_1$ mode simulation with T3P. (b) Comparison between the electric field profile for y=0 between the input field distribution (blue) and the output (red) in accordance with various aspects described herein.

FIG. 7AA is a graphical diagram illustrating, an example, non-limiting embodiment of (a) spectral amplitude compared between input (blue) and out (red) pulse for a 1 ns 12.5 GHz $TM_1$ pulse for at 25 m simulation on a 0.5 cm radius wire with 0.1 mm water film. (b) Calculated loss from spectral attenuation for various simulations of the $TM_1$ mode in accordance with various aspects described herein.

FIG. 7AB is a graphical diagram illustrating, an example, non-limiting embodiment of dispersion as a function of frequency calculated from a 25 GHz $TM_1$ pulse in a 10 m simulation on a 0.5 cm radius wire with a 01 mm water film after removing the constant phase advance from the group velocity of the pulse in accordance with various aspects described herein.

DETAILED DESCRIPTION

Figure 1:
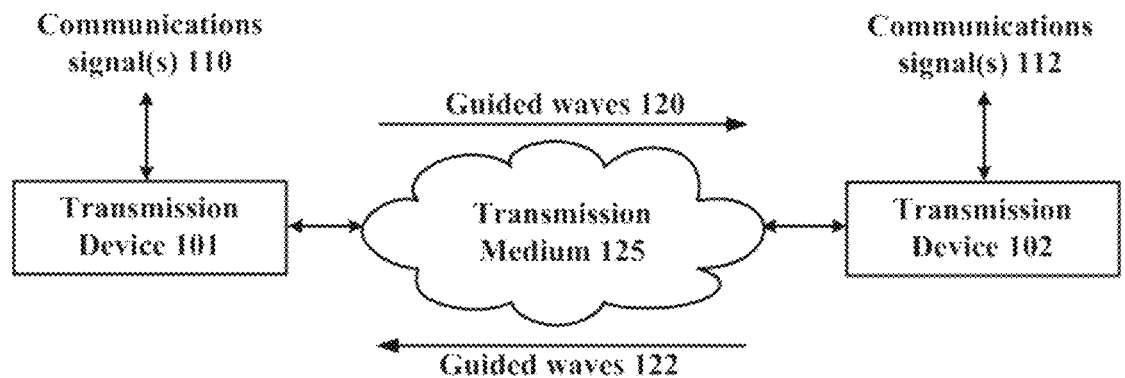
FIG. 1 is a block diagram illustrating an example, non-limiting embodiment of a guided-wave communications system in accordance with various aspects described herein.

One or more embodiments are now described with reference to the drawings, wherein like reference numerals are used to refer to like elements throughout the drawings. In the following description, for purposes of explanation, numerous details are set forth in order to provide a thorough understanding of the various embodiments. It is evident, however, that the various embodiments can be practiced without these details (and without applying to any particular networked environment or standard).

In an embodiment, a guided wave communication system is presented for sending and receiving communication signals such as data or other signaling via guided electromagnetic waves. The guided electromagnetic waves include, for example, surface waves or other electromagnetic waves that are bound to or guided by a transmission medium as described herein. It will be appreciated that a variety of transmission media can be utilized with guided wave communications without departing from example embodiments. Examples of such transmission media can include one or more of the following, either alone or in one or more combinations: wires, whether insulated or not, and whether single-stranded or multi-stranded; conductors of other shapes or configurations including unshielded twisted pair cables including single twisted pairs, Category 5e and other twisted pair cable bundles, other wire bundles, cables, rods, rails, pipes; non-conductors such as dielectric pipes, rods, rails, or other dielectric members; combinations of conductors and dielectric materials such as coaxial cables; or other guided wave transmission media.

The inducement of guided electromagnetic waves that propagate along a transmission medium can be independent of any electrical potential, charge or current that is injected or otherwise transmitted through the transmission medium as part of an electrical circuit. For example, in the case where the transmission medium is a wire, it is to be appreciated that while a small current in the wire may be formed in response to the propagation of the electromagnetic waves guided along the wire, this can be due to the propagation of the electromagnetic wave along the wire surface, and is not formed in response to electrical potential, charge or current that is injected into the wire as part of an electrical circuit. The electromagnetic waves traveling along the wire therefore do not require an electrical circuit (i.e., ground or other electrical return path) to propagate along the wire surface. The wire therefore can be a single wire transmission line that is not part of an electrical circuit. For example, electromagnetic waves can propagate along a wire configured as an electrical open circuit. Also, in some embodiments, a wire is not necessary, and the electromagnetic waves can propagate along a single line transmission medium that is not a wire including a single line transmission medium that is conductorless. Accordingly, electromagnetic waves can propagate along a physical transmission medium without requiring an electrical return path.

More generally, "guided electromagnetic waves" or "guided waves" as described by the subject disclosure are affected by the presence of a physical object that is at least a part of the transmission medium (e.g., a bare wire or other conductor, a dielectric including a dielectric core without a conductive shield and/or without an inner conductor, an insulated wire, a conduit or other hollow element whether conductive or not, a bundle of insulated wires that is coated, covered or surrounded by a dielectric or insulator or other wire bundle, or another form of solid, liquid or otherwise non-gaseous transmission medium) so as to be at least partially bound to or guided by the physical object and so as to propagate along a transmission path of the physical object. Such a physical object can operate as at least a part of a transmission medium that guides, by way of one or more interfaces of the transmission medium (e.g., an outer surface, inner surface, an interstitial spacing formed between surfaces of a transmission medium, an interior portion between the outer and the inner surfaces or other boundary between elements of the transmission medium).

In this fashion, a transmission medium may support multiple transmission paths over different surfaces of the transmission medium. For example, a stranded cable or wire bundle may support electromagnetic waves that are guided by the outer surface of the stranded cable or wire bundle, as well as electromagnetic waves that are guided by inner cable surfaces between two, three or more individual strands or wires within the stranded cable or wire bundle. For example, electromagnetic waves can be guided within interstitial areas of a stranded cable, insulated twisted pair wires, or a wire bundle. The guided electromagnetic waves of the subject disclosure are launched from a sending (transmitting) device and propagate along the transmission medium for reception by at least one receiving device. The propagation of guided electromagnetic waves, can carry energy, data and/or other signals along the transmission path from the sending device to the receiving device.

As used herein the term "conductor" (based on a definition of the term "conductor" from *IEEE* 100, *the Authoritative Dictionary of IEEE Standards Terms*, $7^{th}$ Edition, 2000) means a substance or body that allows a current of electricity to pass continuously along it. The terms "insulator", "conductorless" or "nonconductor" (based on a definition of the term "insulator" from *IEEE 100, the Authoritative Dictionary of IEEE Standards Terms,* 7$^{th}$ Edition, 2000) means a device or material in which electrons or ions cannot be moved easily. It is possible for an insulator, or a conductorless or nonconductive material to be intermixed intentionally (e.g., doped) or unintentionally into a resulting substance with a small amount of another material having the properties of a conductor. However, the resulting substance may remain substantially resistant to a flow of a continuous electrical current along the resulting substance. Furthermore, a conductorless member such as a dielectric rod or other conductorless core lacks an inner conductor and a conductive shield.

As used herein, the term "eddy current" (based on a definition of the term "conductor" from *IEEE 100, the Authoritative Dictionary of IEEE Standards Terms,* 7$^{th}$ Edition, 2000) means a current that circulates in a metallic material as a result of electromotive forces induced by a variation of magnetic flux. Although it may be possible for an insulator, conductorless or nonconductive material in the foregoing embodiments to allow eddy currents that circulate within the doped or intermixed conductor and/or a very small continuous flow of an electrical current along the extent of the insulator, conductorless or nonconductive material, any such continuous flow of electrical current along such an insulator, conductorless or nonconductive material is de minimis compared to the flow of an electrical current along a conductor. Accordingly, in the subject disclosure an insulator, and a conductorless or nonconductor material are not considered to be a conductor. The term "dielectric" means an insulator that can be polarized by an applied electric field. When a dielectric is placed in an electric field, electric charges do not continuously flow through the material as they do in a conductor, but only slightly shift from their average equilibrium positions causing dielectric polarization. The terms "conductorless transmission medium or non-conductor transmission medium" can mean a transmission medium consisting of any material (or combination of materials) that may or may not contain one or more conductive elements but lacks a continuous conductor between the sending and receiving devices along the conductorless transmission medium or non-conductor transmission medium—similar or identical to the aforementioned properties of an insulator, conductorless or nonconductive material.

Unlike free space propagation of wireless signals such as unguided (or unbounded) electromagnetic waves that decrease in intensity inversely by the square of the distance traveled by the unguided electromagnetic waves, guided electromagnetic waves can propagate along a transmission medium with less loss in magnitude per unit distance than experienced by unguided electromagnetic waves.

Unlike electrical signals, guided electromagnetic waves can propagate along different types of transmission media from a sending device to a receiving device without requiring a separate electrical return path between the sending device and the receiving device. As a consequence, guided electromagnetic waves can propagate from a sending device to a receiving device along a conductorless transmission medium including a transmission medium having no conductive components (e.g., a dielectric strip, rod, or pipe), or via a transmission medium having no more than a single conductor (e.g., a single bare wire or insulated wire configured in an open electrical circuit). Even if a transmission medium includes one or more conductive components and the guided electromagnetic waves propagating along the transmission medium generate currents that flow in the one or more conductive components in a direction of the guided electromagnetic waves, such guided electromagnetic waves can propagate along the transmission medium from a sending device to a receiving device without requiring a flow of opposing currents on an electrical return path between the sending device and the receiving device (i.e., in an electrical open circuit configuration).

In a non-limiting illustration, consider electrical systems that transmit and receive electrical signals between sending and receiving devices by way of conductive media. Such systems generally rely on an electrical forward path and an electrical return path. For instance, consider a coaxial cable having a center conductor and a ground shield that are separated by an insulator. Typically, in an electrical system a first terminal of a sending (or receiving) device can be connected to the center conductor, and a second terminal of the sending (or receiving) device can be connected to the ground shield or other second conductor. If the sending device injects an electrical signal in the center conductor via the first terminal, the electrical signal will propagate along the center conductor causing forward currents in the center conductor, and return currents in the ground shield or other second conductor. The same conditions apply for a two terminal receiving device.

In contrast, consider a guided wave communication system such as described in the subject disclosure, which can utilize different embodiments of a transmission medium (including among others a coaxial cable) for transmitting and receiving guided electromagnetic waves without requiring an electrical return path. In one embodiment, for example, the guided wave communication system of the subject disclosure can be configured to induce guided electromagnetic waves that propagate along an outer surface of a coaxial cable. Although the guided electromagnetic waves can cause forward currents on the ground shield, the guided electromagnetic waves do not require return currents on, for example, the center conductor to enable the guided electromagnetic waves to propagate along the outer surface of the coaxial cable. The same can be said of other transmission media used by a guided wave communication system for the transmission and reception of guided electromagnetic waves. For example, guided electromagnetic waves induced by the guided wave communication system on a bare wire, an insulated wire, or a dielectric transmission medium (e.g., a dielectric core with no conductive materials), can propagate along the bare wire, the insulated bare wire, or the dielectric transmission medium without requiring return currents on an electrical return path.

Consequently, electrical systems that require forward and return conductors for carrying corresponding forward and reverse currents on conductors to enable the propagation of electrical signals injected by a sending device are distinct from guided wave systems that induce guided electromagnetic waves on an interface of a transmission medium without requiring an electrical return path to enable the propagation of the guided electromagnetic waves along the interface of the transmission medium. It is also noted that a transmission medium having an electrical return path (e.g., ground) for purposes of conducting currents (e.g., a power line) can be used to contemporaneously propagate guided electromagnetic waves along the transmission medium. However, the propagation of the guided electromagnetic waves is not dependent on the electrical currents flowing through the transmission medium. For example, if the electrical currents flowing through the transmission medium stop flowing for any reason (e.g., a power outage), guided electromagnetic waves propagating along the transmission medium can continue to propagate without interruption.

It is further noted that guided electromagnetic waves as described in the subject disclosure can have an electromagnetic field structure that lies primarily or substantially on an outer surface of a transmission medium so as to be bound to or guided by the outer surface of the transmission medium and so as to propagate non-trivial distances on or along the outer surface of the transmission medium. In other embodiments, guided electromagnetic waves can have an electromagnetic field structure that substantially lies above an outer surface of a transmission medium, but is nonetheless bound to or guided by the transmission medium and so as to propagate non-trivial distances on or along the transmission medium. In other embodiments, guided electromagnetic waves can have an electromagnetic field structure that has a field strength that is de minimis at the outer surface, below the outer surface, and/or in proximity to the outer surface of a transmission medium, but is nonetheless bound to or guided by the transmission medium and so as to propagate non-trivial distances along the transmission medium.

In other embodiments, guided electromagnetic waves can have an electromagnetic field structure that lies primarily or substantially below an outer surface of a transmission medium so as to be bound to or guided by an inner material of the transmission medium (e.g., dielectric material) and so as to propagate non-trivial distances within the inner material of the transmission medium. In other embodiments, guided electromagnetic waves can have an electromagnetic field structure that lies within a region that is partially below and partially above an outer surface of a transmission medium so as to be bound to or guided by this region of the transmission medium and so as to propagate non-trivial distances along this region of the transmission medium. It will be appreciated that electromagnetic waves that propagate along a transmission medium or are otherwise guided by a transmission medium (i.e., guided electromagnetic waves) can have an electric field structure such as described in one or more of the foregoing embodiments. The desired electromagnetic field structure in an embodiment may vary based upon a variety of factors, including the desired transmission distance, the characteristics of the transmission medium itself, environmental conditions/characteristics outside of the transmission medium (e.g., presence of rain, fog, humidity, atmospheric conditions, etc.), and characteristics of an electromagnetic wave that are configurable by a launcher (or coupler) as will be described below (e.g., configurable wave mode, configurable electromagnetic field structure, configurable polarity, configurable wavelength, configurable bandwidth, and so on).

Various embodiments described herein relate to coupling devices, that can be referred to as "waveguide coupling devices", "waveguide couplers" or more simply as "couplers", "coupling devices" or "launchers" for launching/inducing and/or receiving/extracting guided electromagnetic waves to and from a transmission medium. A wavelength of the guided electromagnetic waves can be small compared to one or more dimensions of the coupling device and/or the transmission medium such as the circumference of a wire or other cross sectional dimension. Such electromagnetic waves can operate at millimeter wave frequencies (e.g., 30 to 300 GHz), or lower than microwave frequencies such as 300 MHz to 30 GHz. Electromagnetic waves can be induced to propagate along a transmission medium by a coupling device, such as: a strip, arc or other length of dielectric material; a millimeter wave integrated circuit (MMIC), a horn, monopole, dipole, rod, slot, patch, planar or other antenna; an array of antennas; a magnetic resonant cavity or other resonant coupler; a coil, a strip line, a coaxial waveguide, a hollow waveguide, or other waveguide and/or other coupling device.

In operation, the coupling device receives an electromagnetic wave from a transmitter or transmission medium. The electromagnetic field structure of the electromagnetic wave can be carried below an outer surface of the coupling device, substantially on the outer surface of the coupling device, within a hollow cavity of the coupling device, can be radiated from a coupling device or a combination thereof. When the coupling device is in close proximity to a transmission medium, at least a portion of an electromagnetic wave can couple from the coupling device to the transmission medium, and continues to propagate as guided electromagnetic waves along the transmission medium. In a reciprocal fashion, a coupling device can receive or extract at least a portion of a guided electromagnetic waves propagating along a transmission medium and transfer these electromagnetic waves to a receiver. The guided electromagnetic waves launched and/or received by the coupling device propagate along the transmission medium from a sending device to a receiving device without requiring an electrical return path between the sending device and the receiving device. In this circumstance, the transmission medium acts as a waveguide to support the propagation of the guided electromagnetic waves from the sending device to the receiving device.

According to an example embodiment, a surface wave is a type of guided wave that is guided by a surface of a transmission medium, such as an exterior or outer surface or an interior or inner surface including an interstitial surface of the transmission medium such as the interstitial area between wires in a multi-stranded cable, insulated twisted pair wires, or wire bundle, and/or another surface of the transmission medium that is adjacent to or exposed to another type of medium having different properties (e.g., dielectric properties). Indeed, in an example embodiment, a surface of the transmission medium that guides a surface wave can represent a transitional surface between two different types of media. For example, in the case of a bare wire, the surface of the wire can be the outer or exterior conductive surface of the bare wire or uninsulated wire that is exposed to air or free space.

As another example, in the case of insulated wire, the surface of the wire can be the conductive portion of the wire, an exterior surface of the insulation of the wire, an inner region of the insulation of the wire, a gap formed between the insulation and the conductor of the wire, or a combination thereof. Accordingly, a surface of the transmission medium can be any one of an inner surface of an insulator surface of a wire or a conductive surface of the wire that is separated by a gap composed of, for example, air or free space. A surface of a transmission medium can otherwise be any material region of the transmission medium. The surface that guides an electromagnetic wave can depend upon the relative differences in the properties (e.g., dielectric properties) of the insulator, air, and/or the conductor and further dependent on the frequency and propagation mode or modes of the guided wave.

According to an example embodiment, the term "about" a wire or other transmission medium used in conjunction with a guided wave can include fundamental guided wave propagation modes such as a guided wave having a circular or substantially circular field pattern/distribution, a symmetrical electromagnetic field pattern/distribution (e.g., electric field or magnetic field) or other fundamental mode pattern at least partially around a wire or other transmission medium. Unlike Zenneck waves that propagate along a single planar surface of a planar transmission medium, the guided electromagnetic waves of the subject disclosure that are bound to a transmission medium can have electromagnetic field patterns that surround or circumscribe, at least in part, a non-planar surface of the transmission medium with electromagnetic energy in all directions, or in all but a finite number of azimuthal null directions characterized by field strengths that approach zero field strength for infinitesimally small azimuthal widths.

For example, such non-circular field distributions can be unilateral or multi-lateral with one or more axial lobes characterized by relatively higher field strength and/or one or more nulls directions of zero field strength or substantially zero-field strength or null regions characterized by relatively low-field strength, zero-field strength and/or substantially zero-field strength. Further, the field distribution can otherwise vary as a function of azimuthal orientation around a transmission medium such that one or more angular regions around the transmission medium have an electric or magnetic field strength (or combination thereof) that is higher than one or more other angular regions of azimuthal orientation, according to an example embodiment. It will be appreciated that the relative orientations or positions of the guided wave higher order modes, particularly asymmetrical modes, can vary as the guided wave travels along the wire.

In addition, when a guided wave propagates "about" a wire or other type of transmission medium, it can do so according to a guided wave propagation mode that includes not only the fundamental wave propagation modes (e.g., zero order modes), but additionally or alternatively, non-fundamental wave propagation modes such as higher-order guided wave modes (e.g., $1^{st}$ order modes, $2^{nd}$ order modes, etc.). Higher-order modes include symmetrical modes that have a circular or substantially circular electric or magnetic field distribution and/or a symmetrical electric or magnetic field distribution, or asymmetrical modes and/or other guided (e.g., surface) waves that have non-circular and/or asymmetrical field distributions around the wire or other transmission medium. For example, the guided electromagnetic waves of the subject disclosure can propagate along a transmission medium from the sending device to the receiving device or along a coupling device via one or more guided wave modes such as a fundamental transverse magnetic (TM) TM00 mode (or Goubau mode), a fundamental hybrid mode (EH or HE) "EH00" mode or "HE00" mode, a transverse electromagnetic "TEMnm" mode, a total internal reflection (TIR) mode or any other mode such as EHnm, HEnm or TMnm, where n and/or m have integer values greater than or equal to 0, and other fundamental, hybrid and non-fundamental wave modes.

As used herein, the term "guided wave mode" refers to a guided wave propagation mode of a transmission medium, coupling device or other system component of a guided wave communication system that propagates for non-trivial distances along the length of the transmission medium, coupling device or other system component.

As used herein, the term "millimeter-wave" can refer to electromagnetic waves/signals that fall within the "millimeter-wave frequency band" of 30 GHz to 300 GHz. The term "microwave" can refer to electromagnetic waves/signals that fall within a "microwave frequency band" of 300 MHz to 300 GHz. The term "radio frequency" or "RF" can refer to electromagnetic waves/signals that fall within the "radio frequency band" of 10 kHz to 1 THz. It is appreciated that wireless signals, electrical signals, and guided electromagnetic waves as described in the subject disclosure can be configured to operate at any desirable frequency range, such as, for example, at frequencies within, above or below millimeter-wave and/or microwave frequency bands. In particular, when a coupling device or transmission medium includes a conductive element, the frequency of the guided electromagnetic waves that are carried by the coupling device and/or propagate along the transmission medium can be below the mean collision frequency of the electrons in the conductive element. Further, the frequency of the guided electromagnetic waves that are carried by the coupling device and/or propagate along the transmission medium can be a non-optical frequency, e.g., a radio frequency below the range of optical frequencies that begins at 1 THz.

It is further appreciated that a transmission medium as described in the subject disclosure can be configured to be opaque or otherwise resistant to (or at least substantially reduce) a propagation of electromagnetic waves operating at optical frequencies (e.g., greater than 1 THz).

As used herein, the term "antenna" can refer to a device that is part of a transmitting or receiving system to transmit/radiate or receive free space wireless signals.

In accordance with one or more embodiments, a method can include generating, by a transmitter, a signal, and inducing, by a coupler, an electromagnetic wave that propagates along a physical transmission medium, wherein the coupler has a structure that converts the signal into a plurality of wave modes that combine to form the electromagnetic wave, and wherein the electromagnetic wave has an electromagnetic field configuration that reduces leakage of the electromagnetic wave as the electromagnetic wave propagates along the physical transmission medium.

In accordance with one or more embodiments, a machine-readable medium can include executable instructions that, when executed by a processing system including a processor, facilitate performance of operations. The operations can include receiving data, and causing a transmitter to transmit a signal that conveys the data, wherein a coupler coupled to the transmitter converts the signal into a plurality of wave modes that combine to form a first electromagnetic wave that propagates along a transmission medium, wherein the first electromagnetic wave has a depth of focus that increases a concentration of electromagnetic fields of the first electromagnetic wave, and wherein the concentration of electromagnetic fields reduces a leakage of the first electromagnetic wave while propagating along the transmission medium.

In accordance with one or more embodiments, a communication device can include a processing system including a processor, and a memory that stores executable instructions that, when executed by the processing system, facilitate performance of operations. The operations can include detecting an obstruction that increases a propagation loss of a first electromagnetic wave as it propagates along a physical transmission medium, and responsive to the detecting, inducing propagation of a second electromagnetic wave along the physical transmission medium, wherein the second electromagnetic wave comprises an electromagnetic field configuration, wherein a first portion of the electromagnetic field configuration has a first intensity, wherein a second portion of the electromagnetic field configuration has a second intensity, wherein the first intensity of the first portion of the electromagnetic field configuration is greater than the second intensity of the second portion of the electromagnetic field configuration, and wherein the first portion of the electromagnetic field configuration is positioned away from the obstruction to reduce the propagation loss caused by the obstruction.

Referring now to FIG. 1, a block diagram 100 illustrating an example, non-limiting embodiment of a guided wave communications system is shown. In operation, a transmission device 101 receives one or more communication signals 110 from a communication network or other communications device that includes data and generates guided waves 120 to convey the data via the transmission medium 125 to the transmission device 102. The transmission device 102 receives the guided waves 120 and converts them to communication signals 112 that include the data for transmission to a communications network or other communications device. The guided waves 120 can be modulated to convey data via a modulation technique such as phase shift keying, frequency shift keying, quadrature amplitude modulation, amplitude modulation, multi-carrier modulation such as orthogonal frequency division multiplexing and via multiple access techniques such as frequency division multiplexing, time division multiplexing, code division multiplexing, multiplexing via differing wave propagation modes and via other modulation and access strategies.

The communication network or networks can include a wireless communication network such as a mobile data network, a cellular voice and data network, a wireless local area network (e.g., WiFi or an IEEE 802.xx network), a satellite communications network, a personal area network or other wireless network. The communication network or networks can also include a wired communication network such as a telephone network, an Ethernet network, a local area network, a wide area network such as the Internet, a broadband access network, a cable network, a fiber optic network, or other wired network. The communication devices can include a network edge device, bridge device or home gateway, a set-top box, broadband modem, telephone adapter, access point, base station, or other fixed communication device, a mobile communication device such as an automotive gateway or automobile, laptop computer, tablet, smartphone, cellular telephone, or other communication device.

In an example embodiment, the guided wave communication system 100 can operate in a bi-directional fashion where transmission device 102 receives one or more communication signals 112 from a communication network or device that includes other data and generates guided waves 122 to convey the other data via the transmission medium 125 to the transmission device 101. In this mode of operation, the transmission device 101 receives the guided waves 122 and converts them to communication signals 110 that include the other data for transmission to a communications network or device. The guided waves 122 can be modulated to convey data via a modulation technique such as phase shift keying, frequency shift keying, quadrature amplitude modulation, amplitude modulation, multi-carrier modulation such as orthogonal frequency division multiplexing and via multiple access techniques such as frequency division multiplexing, time division multiplexing, code division multiplexing, multiplexing via differing wave propagation modes and via other modulation and access strategies.

The transmission medium 125 can include a cable having at least one inner portion surrounded by a dielectric material such as an insulator or other dielectric cover, coating or other dielectric material, the dielectric material having an outer surface and a corresponding circumference. In an example embodiment, the transmission medium 125 operates as a single-wire transmission line to guide the transmission of an electromagnetic wave. When the transmission medium 125 is implemented as a single wire transmission system, it can include a wire. The wire can be insulated or uninsulated, and single-stranded or multi-stranded (e.g., braided). In other embodiments, the transmission medium 125 can contain conductors of other shapes or configurations including wire bundles, cables, rods, rails, pipes. In addition, the transmission medium 125 can include non-conductors such as dielectric pipes, rods, rails, or other dielectric members; combinations of conductors and dielectric materials, conductors without dielectric materials or other guided wave transmission media and/or consist essentially of non-conductors such as dielectric pipes, rods, rails, or other dielectric members that operate without a continuous conductor such as an inner conductor or a conductive shield. It should be noted that the transmission medium 125 can otherwise include any of the transmission media previously discussed.

Further, as previously discussed, the guided waves 120 and 122 can be contrasted with radio transmissions over free space/air or conventional propagation of electrical power or signals through the conductor of a wire via an electrical circuit. In addition to the propagation of guided waves 120 and 122, the transmission medium 125 may optionally contain one or more wires that propagate electrical power or other communication signals in a conventional manner as a part of one or more electrical circuits.

Figure 2:
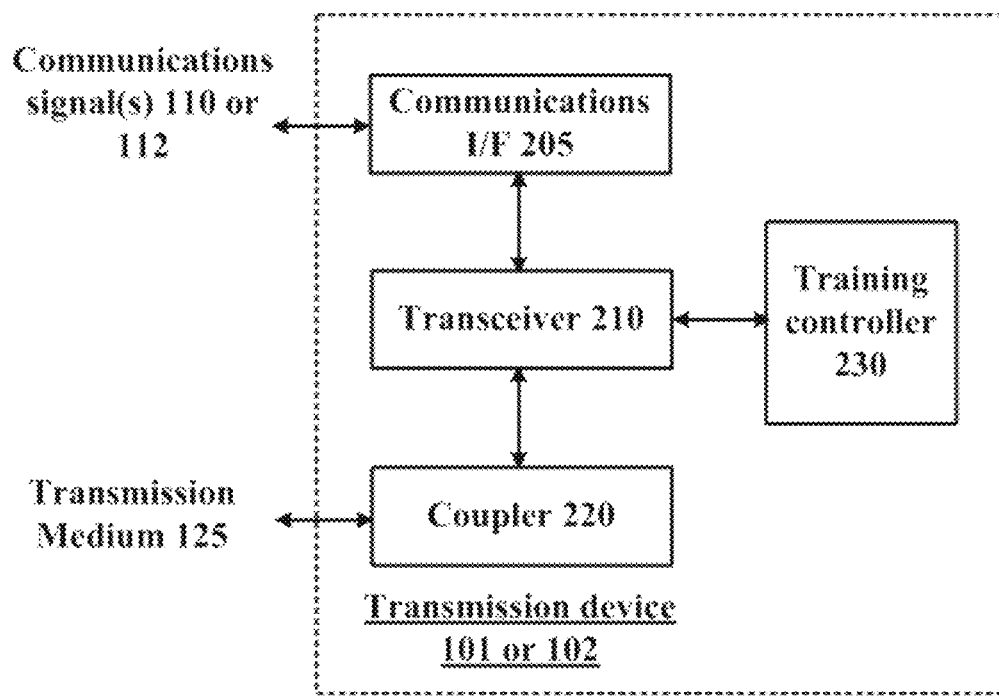
FIG. 2 is a block diagram illustrating an example, non-limiting embodiment of a transmission device in accordance with various aspects described herein.

Referring now to FIG. 2, a block diagram 200 illustrating an example, non-limiting embodiment of a transmission device is shown. The transmission device 101 or 102 includes a communications interface (I/F) 205, a transceiver 210 and a coupler 220.

In an example of operation, the communications interface 205 receives a communication signal 110 or 112 that includes data. In various embodiments, the communications interface 205 can include a wireless interface for receiving a wireless communication signal in accordance with a wireless standard protocol such as LTE or other cellular voice and data protocol, WiFi or an 802.11 protocol, WIMAX protocol, Ultra Wideband protocol, Bluetooth® protocol, Zigbee® protocol, a direct broadcast satellite (DBS) or other satellite communication protocol or other wireless protocol. In addition or in the alternative, the communications interface 205 includes a wired interface that operates in accordance with an Ethernet protocol, universal serial bus (USB) protocol, a data over cable service interface specification (DOCSIS) protocol, a digital subscriber line (DSL) protocol, a Firewire (IEEE 1394) protocol, or other wired protocol. In additional to standards-based protocols, the communications interface 205 can operate in conjunction with other wired or wireless protocol. In addition, the communications interface 205 can optionally operate in conjunction with a protocol stack that includes multiple protocol layers including a MAC protocol, transport protocol, application protocol, etc.

In an example of operation, the transceiver 210 generates an electromagnetic wave based on the communication signal 110 or 112 to convey the data. The electromagnetic wave has at least one carrier frequency and at least one corresponding wavelength. The carrier frequency can be within a millimeter-wave frequency band of 30 GHz-300 GHz, such as 60 GHz or a carrier frequency in the range of 30-40 GHz or a lower frequency band of 300 MHz-30 GHz in the microwave frequency range such as 26-30 GHz, 11 GHz, or 3-6 GHz, but it will be appreciated that other carrier frequencies are possible in other embodiments. In one mode of operation, the transceiver 210 merely upconverts the communications signal or signals 110 or 112 for transmission of the electromagnetic signal in the microwave or millimeter-wave band as a guided electromagnetic wave that is guided by or bound to the transmission medium 125. In another mode of operation, the communications interface 205 either converts the communication signal 110 or 112 to a baseband or near baseband signal or extracts the data from the communication signal 110 or 112 and the transceiver 210 modulates a high-frequency carrier with the data, the baseband or near baseband signal for transmission. It should be appreciated that the transceiver 210 can modulate the data received via the communication signal 110 or 112 to preserve one or more data communication protocols of the communication signal 110 or 112 either by encapsulation in the payload of a different protocol or by simple frequency shifting. In the alternative, the transceiver 210 can otherwise translate the data received via the communication signal 110 or 112 to a protocol that is different from the data communication protocol or protocols of the communication signal 110 or 112.

In an example of operation, the coupler 220 couples the electromagnetic wave to the transmission medium 125 as a guided electromagnetic wave to convey the communications signal or signals 110 or 112. While the prior description has focused on the operation of the transceiver 210 as a transmitter, the transceiver 210 can also operate to receive electromagnetic waves that convey other data from the single wire transmission medium via the coupler 220 and to generate communications signals 110 or 112, via communications interface 205 that includes the other data. Consider embodiments where an additional guided electromagnetic wave conveys other data that also propagates along the transmission medium 125. The coupler 220 can also couple this additional electromagnetic wave from the transmission medium 125 to the transceiver 210 for reception.

The transmission device 101 or 102 includes an optional training controller 230. In an example embodiment, the training controller 230 is implemented by a standalone processor or a processor that is shared with one or more other components of the transmission device 101 or 102. The training controller 230 selects the carrier frequencies, modulation schemes and/or guided wave modes for the guided electromagnetic waves based on testing of the transmission medium 125, environmental conditions and/or feedback data received by the transceiver 210 from at least one remote transmission device coupled to receive the guided electromagnetic wave.

In an example embodiment, a guided electromagnetic wave transmitted by a remote transmission device 101 or 102 conveys data that also propagates along the transmission medium 125. The data from the remote transmission device 101 or 102 can be generated to include the feedback data. In operation, the coupler 220 also couples the guided electromagnetic wave from the transmission medium 125 and the transceiver receives the electromagnetic wave and processes the electromagnetic wave to extract the feedback data.

In an example embodiment, the training controller 230 operates based on the feedback data to evaluate a plurality of candidate frequencies, modulation schemes and/or transmission modes to select a carrier frequency, modulation scheme and/or transmission mode to enhance performance, such as throughput, signal strength, reduce propagation loss, etc.

Consider the following example: a transmission device 101 begins operation under control of the training controller 230 by sending a plurality of guided waves as test signals such as pilot waves or other test signals at a corresponding plurality of candidate frequencies and/or candidate modes directed to a remote transmission device 102 coupled to the transmission medium 125. The guided waves can include, in addition or in the alternative, test data. The test data can indicate the particular candidate frequency and/or guidewave mode of the signal. In an embodiment, the training controller 230 at the remote transmission device 102 receives the test signals and/or test data from any of the guided waves that were properly received and determines the best candidate frequency and/or guided wave mode, a set of acceptable candidate frequencies and/or guided wave modes, or a rank ordering of candidate frequencies and/or guided wave modes. This selection of candidate frequencies or/and guided-mode(s) are generated by the training controller 230 based on one or more optimizing criteria such as received signal strength, bit error rate, packet error rate, signal to noise ratio, propagation loss, etc. The training controller 230 generates feedback data that indicates the selection of candidate frequencies or/and guided wave mode(s) and sends the feedback data to the transceiver 210 for transmission to the transmission device 101. The transmission device 101 and 102 can then communicate data with one another based on the selection of candidate frequencies or/and guided wave mode(s).

In other embodiments, the guided electromagnetic waves that contain the test signals and/or test data are reflected back, repeated back or otherwise looped back by the remote transmission device 102 to the transmission device 101 for reception and analysis by the training controller 230 of the transmission device 101 that initiated these waves. For example, the transmission device 101 can send a signal to the remote transmission device 102 to initiate a test mode where a physical reflector is switched on the line, a termination impedance is changed to cause reflections, a loop back mode is switched on to couple electromagnetic waves back to the source transmission device 102, and/or a repeater mode is enabled to amplify and retransmit the electromagnetic waves back to the source transmission device 102. The training controller 230 at the source transmission device 102 receives the test signals and/or test data from any of the guided waves that were properly received and determines selection of candidate frequencies or/and guided wave mode(s).

While the procedure above has been described in a start-up or initialization mode of operation, each transmission device 101 or 102 can send test signals, evaluate candidate frequencies or guided wave modes via non-test conditions such as normal transmissions or otherwise evaluate candidate frequencies or guided wave modes at other times or continuously as well. In an example embodiment, the communication protocol between the transmission devices 101 and 102 can include an on-request or periodic test mode where either full testing or more limited testing of a subset of candidate frequencies and guided wave modes are tested and evaluated. In other modes of operation, the re-entry into such a test mode can be triggered by a degradation of performance due to a disturbance, weather conditions, etc. In an example embodiment, the receiver bandwidth of the transceiver 210 is either sufficiently wide or swept to receive all candidate frequencies or can be selectively adjusted by the training controller 230 to a training mode where the receiver bandwidth of the transceiver 210 is sufficiently wide or swept to receive all candidate frequencies.

Figure 3:
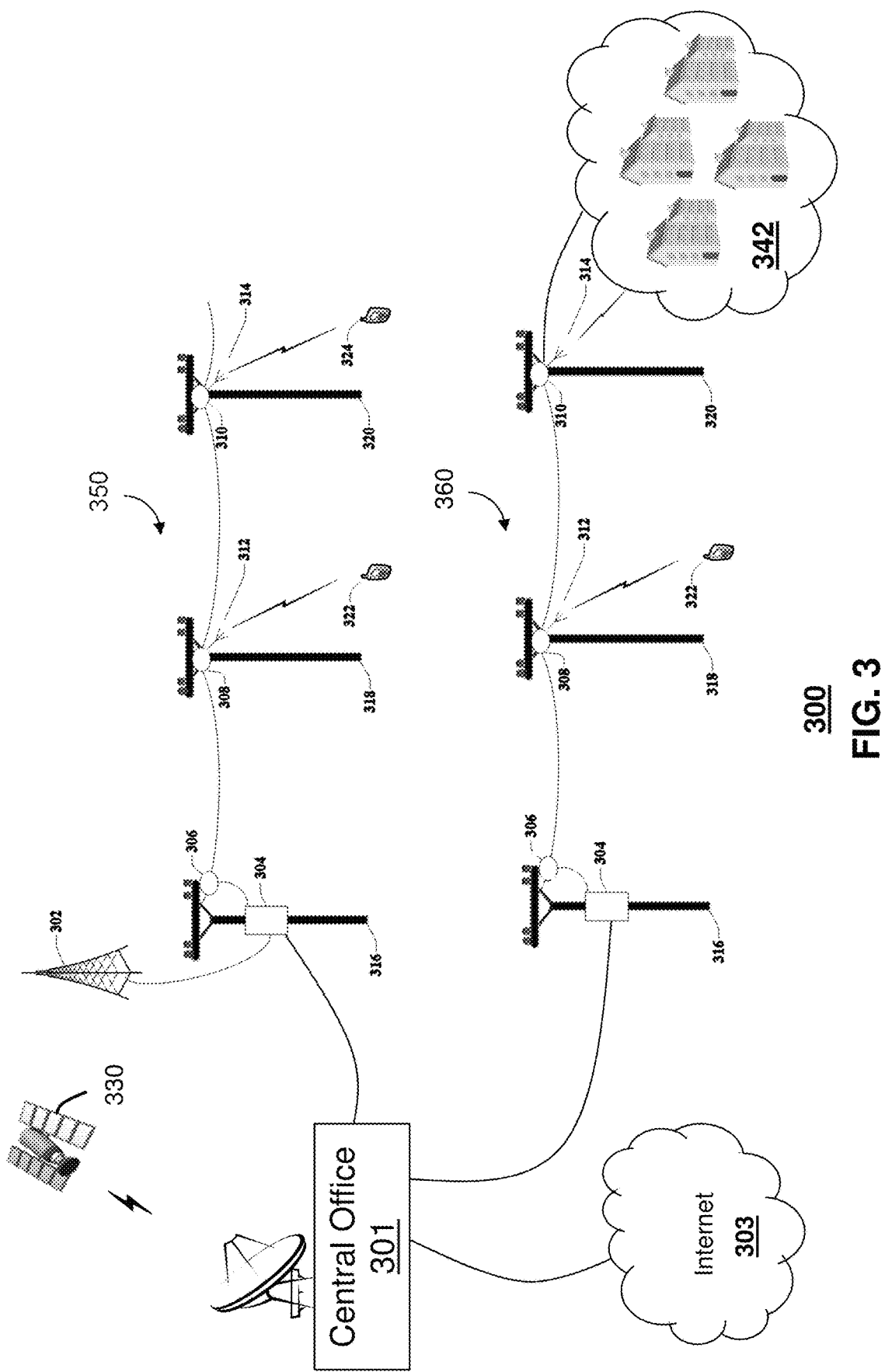
FIG. 3 is a block diagram illustrating an example, non-limiting embodiment of a guided-wave communications system in accordance with various aspects described herein.

Referring now to FIG. 3, a block diagram 300 illustrating an example, non-limiting embodiment of a guided wave communications system is shown. This diagram depicts an exemplary environment in which a guided wave communication system, such as the guided wave communication system presented in conjunction with FIG. 1, can be used.

To provide network connectivity to additional base station devices, a backhaul network that links the communication cells (e.g., microcells and macrocells) to network devices of a core network is desirable. Similarly, to provide network connectivity to a distributed antenna system, an extended communication system that links base station devices and their distributed antennas is also desirable. A guided wave communication system 300 such as shown in FIG. 3 can be provided to enable alternative, increased or additional network connectivity and a waveguide coupling system can be provided to transmit and/or receive guided wave (e.g., surface wave) communications on a transmission medium such as a wire that operates as a single-wire transmission line (e.g., a utility line), and that can be used as a waveguide and/or that otherwise operates to guide the transmission of an electromagnetic wave.

The guided wave communication system 300 can comprise a first instance of a distribution system 350 that includes one or more base station devices (e.g., base station device 304) that are communicably coupled to a central office 301 and/or a macrocell site 302. Base station device 304 can be connected by a wired (e.g., fiber and/or cable), or by a wireless (e.g., microwave wireless) connection to the macrocell site 302 and the central office 301. A second instance of the distribution system 360 can be used to provide wireless voice and data services to mobile device 322 and to residential and/or commercial establishments 342 (herein referred to as establishments 342). System 300 can have additional instances of the distribution systems 350 and 360 for providing voice and/or data services to mobile devices 322-324 and establishments 342 as shown in FIG. 3.

Macrocells such as macrocell site 302 can have dedicated connections to a mobile network and base station device 304 or can share and/or otherwise use another connection. Central office 301 can be used to distribute media content and/or provide internet service provider (ISP) services to mobile devices 322-324 and establishments 342. The central office 301 can receive media content from a constellation of satellites 330 (one of which is shown in FIG. 3) or other sources of content, and distribute such content to mobile devices 322-324 and establishments 342 via the first and second instances of the distribution system 350 and 360. The central office 301 can also be communicatively coupled to the Internet 303 for providing internet data services to mobile devices 322-324 and establishments 342.

Base station device 304 can be mounted on, or attached to, utility pole 316. In other embodiments, base station device 304 can be near transformers and/or other locations situated nearby a power line. Base station device 304 can facilitate connectivity to a mobile network for mobile devices 322 and 324. Antennas 312 and 314, mounted on or near utility poles 318 and 320, respectively, can receive signals from base station device 304 and transmit those signals to mobile devices 322 and 324 over a much wider area than if the antennas 312 and 314 were located at or near base station device 304.

It is noted that FIG. 3 displays three utility poles, in each instance of the distribution systems 350 and 360, with one base station device, for purposes of simplicity. In other embodiments, systems 350 and 360 can be expanded with more base station devices, and more utility poles with distributed antennas and/or tethered connections to establishments 342 (as well as other establishments).

A transmission device 306, such as transmission device 101 or 102 presented in conjunction with FIG. 1, can transmit a signal from base station device 304 to antennas 312 and 314 via utility or power line(s) that connect the utility poles 316, 318, and 320. To transmit the signal, transmission device 306 frequency shifts the signal (e.g., via frequency mixing) from base station device 304 or otherwise converts the signal from the base station device 304 to a microwave band signal and the transmission device 306 launches a microwave band wave that propagates as a guided wave traveling along the utility line or other wire as described in previous embodiments. At utility pole 318, another transmission device 308 receives the guided wave (and optionally can amplify it as needed or desired or operate as a repeater to receive it and regenerate it) and sends it forward as a guided wave on the utility line or other wire. The transmission device 308 can also extract the signal in whole or in part from the microwave band guided wave and frequency shift it to its prior operating frequency, e.g., convert it to its original cellular band frequency (e.g., 1.9 GHz or other defined cellular frequency) or another cellular (or non-cellular) band frequency. An antenna 312 can wirelessly transmit the frequency-shifted signal to mobile device 322. The process can be repeated by transmission device 310, antenna 314 and mobile device 324, as necessary or desirable.

Transmissions from mobile devices 322 and 324 can also be received by antennas 312 and 314 respectively. The transmission devices 308 and 310 can frequency shift the receive signal (e.g., convert the cellular band signals to microwave band) and transmit the signals as guided wave (e.g., surface wave or other electromagnetic wave) transmissions over the power line(s) to base station device 304.

Media content received by the central office 301 can be supplied to the second instance of the distribution system 360 via the base station device 304 for distribution to mobile devices 322 and establishments 342. The transmission device 310 can be tethered to the establishments 342 by one or more wired connections or a wireless interface. The one or more wired connections may include without limitation, a power line, a coaxial cable, a fiber cable, a twisted pair cable, a guided wave transmission medium or other suitable mediums for distribution of media content and/or for providing internet services.

In an example embodiment, the wired connections from the transmission device 310 can be communicatively coupled to one or more very high bit rate digital subscriber line (VDSL) modems located at one or more corresponding service area interfaces (SAIs—not shown) or pedestals, each SAI or pedestal providing services to a portion of the establishments 342. The VDSL modems can be used to selectively distribute media content and/or provide internet services to gateways (not shown) located in the establishments 342. The SAIs or pedestals can also be communicatively coupled to the establishments 342 over a wired medium such as a power line, a coaxial cable, a fiber cable, a twisted pair cable, a guided wave transmission medium or other suitable mediums. In other example embodiments, the transmission device 310 can be communicatively coupled directly to establishments 342 without intermediate interfaces such as the SAIs or pedestals.

In another example embodiment, system 300 can employ diversity paths, where two or more utility lines or other wires are strung between the utility poles 316, 318, and 320 (e.g., for example, two or more wires between poles 316 and 320) and redundant transmissions from base station/macrocell site 302 are transmitted as guided waves down the surface of the utility lines or other wires. The utility lines or other wires can be either insulated or uninsulated, and depending on the environmental conditions that cause transmission losses, the coupling devices can selectively receive signals from one or more of the insulated or uninsulated utility lines or other wires. The selection can be based on measurements of the signal-to-noise ratio of the wires, or based on determined weather/environmental conditions (e.g., moisture detectors, weather forecasts, etc.). The use of diversity paths with system 300 can enable alternate routing capabilities, load balancing, increased load handling, concurrent bi-directional or synchronous communications, spread spectrum communications, etc. Multi-input multi-output (MIMO), SISO, SIMO, and/or MISO transmission and reception techniques can also be employed, in the alternative, or in combination with the foregoing embodiments, by the transmission devices 306, 308, and/or 310.

It is noted that the use of the transmission devices 306, 308, and 310 in FIG. 3 are by way of example only, and that in other embodiments, other uses are possible. For instance, transmission devices can be used in a backhaul communication system, providing network connectivity to base station devices. Transmission devices 306, 308, and 310 can be used in circumstances where it is desirable to transmit guided wave communications over a wire, whether insulated or not insulated. Transmission devices 306, 308, and 310 can be configured with coupling devices that do not make contact or have limited physical and/or electrical contact with the wires that may carry high voltages. The transmission devices 306, 308, and 310 can be located away from the wire (e.g., spaced apart from the wire) and/or located on the wire so long as it is not electrically in contact with the wire allowing for easy, and/or less complex installation.

It is further noted, that while a base station device 304 and macrocell site 302 are illustrated in an embodiment, other network configurations are likewise possible. For example, devices such as access points or other wireless gateways can be employed in a similar fashion to extend the reach of other networks such as a wireless local area network, a wireless personal area network or other wireless network that operates in accordance with a communication protocol such as a 802.11 protocol, WIMAX protocol, UltraWideband protocol, Bluetooth® protocol, Zigbee® protocol or other wireless protocol.

Figure 4:
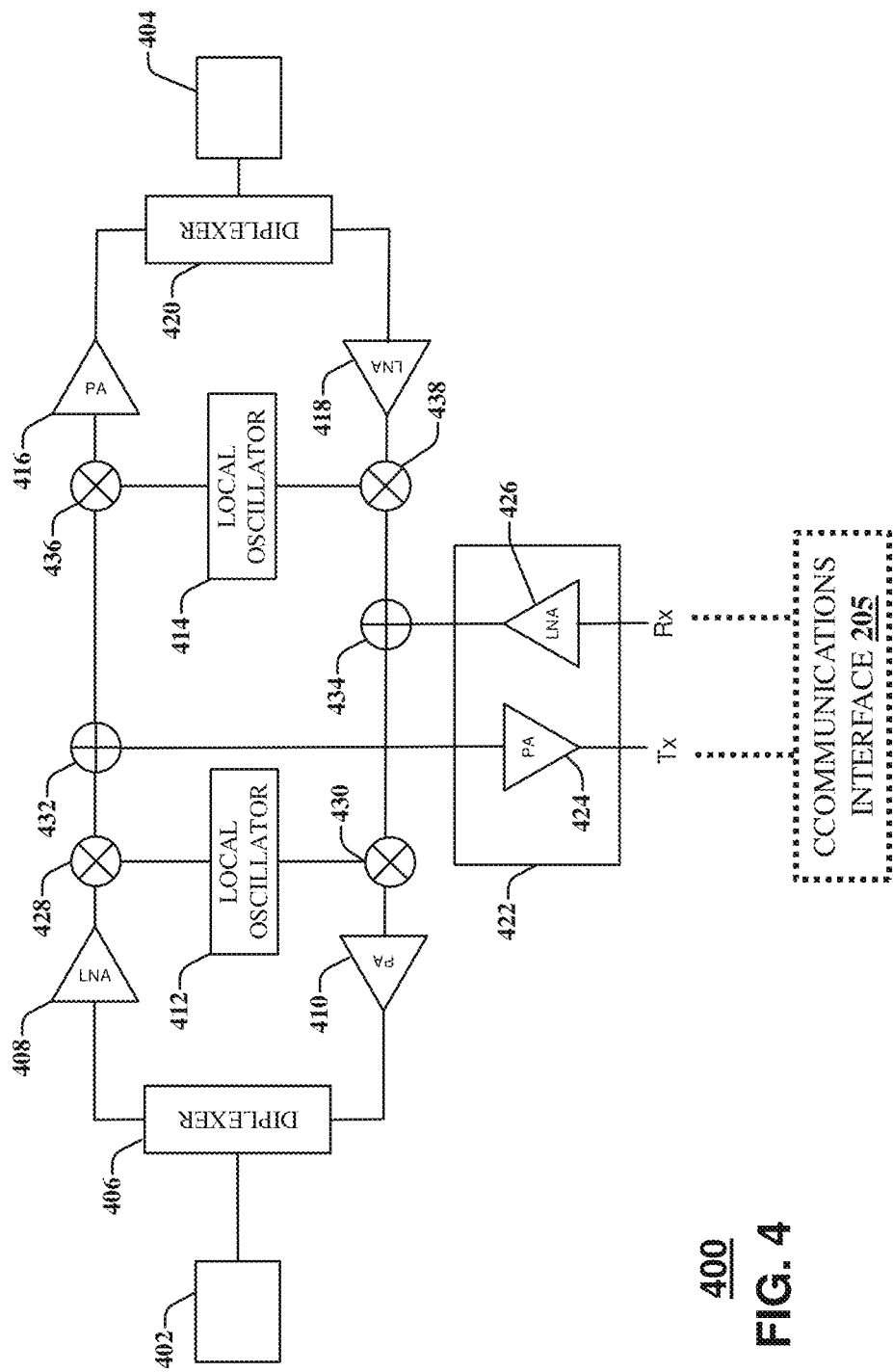
FIG. 4 is a block diagram illustrating an example, non-limiting embodiment of a waveguide system in accordance with various aspects described herein.

Turning now to FIG. 4, illustrated is a block diagram 400 illustrating an example, non-limiting embodiment of a bidirectional repeater system. In particular, a bidirectional repeater system is presented for use in a transmission device, such as transmission device 101 or 102 presented in conjunction with FIGS. 1, 2 and 3. The bidirectional repeater system includes waveguide coupling devices 402 and 404 that receive guide waves from other coupling devices located in a distributed antenna system or backhaul system, and/or transmit guided waves directed to coupling devices located in the distributed antenna system or backhaul system.

In various embodiments, waveguide coupling device 402 can receive a transmission from another waveguide coupling device, wherein the transmission has a plurality of subcarriers (or data channels). Diplexer 406 can separate the transmission from other transmissions, and direct the transmission to a low-noise amplifier ("LNA") 408. A frequency mixer 428, coupled to a local oscillator 412, can frequency shift the transmission (e.g., in the millimeter-wave band or around 38 GHz in some embodiments) to another frequency, such as a cellular band (~1.9 GHz) for a distributed antenna system, a native frequency, or other frequency for a backhaul system. An extractor (or demultiplexer) 432 can extract from the frequency-shifted signal a subcarrier (or data channel) and direct the extracted subcarrier (or data channel) to an output component 422 for optional amplification, buffering or isolation by power amplifier 424 for coupling to a communications interface 205 (such as shown in FIG. 2). The communications interface 205 can further process the extracted subcarrier (or data channel) received from the power amplifier 424 or otherwise transmit the extracted subcarrier over a wireless or wired interface to other devices such as a base station, mobile devices, a building, etc. For the subcarriers that are not being extracted at this location, extractor 432 can redirect them to another frequency mixer 436, coupled to another local oscillator 414, that can frequency-shift them to another carrier frequency (e.g., millimeter-wave band). The frequency-shifted signal can be directed to a power amplifier ("PA") 416 and is then retransmitted by waveguide coupling device 404 to another system, via diplexer 420.

An LNA 426 can be used to amplify, buffer or isolate signals that are received by the communication interface 205 and send the received signals to a multiplexer 434 which merges the received signals with signals that have been received from waveguide coupling device 404. The signals received from coupling device 404 have been split by diplexer 420, and then passed through LNA 418, and frequency-shifted by frequency mixer 438. When the signals from the LNA 418 are combined by multiplexer 434 with the signals provided by the LNA 426, they are frequency shifted by frequency mixer 430, and then boosted by PA 410, and transmitted to another system by waveguide coupling device 402 via diplexer 406. In an embodiment bidirectional repeater system can be merely a repeater without the input/output device 422. In this embodiment, the multiplexer 434 would not be utilized and signals from LNA 418 would be directed to mixer 430 as previously described. It will be appreciated that in some embodiments, the bidirectional repeater system could also be implemented using two distinct and separate unidirectional repeaters. In an alternative embodiment, a bidirectional repeater system could also be a booster or otherwise perform retransmissions without frequency shifting signals. Indeed in example embodiment, the retransmissions can be based upon receiving a signal or guided wave and performing some signal or guided wave processing or reshaping, filtering, and/or amplification, prior to retransmission of the signal or guided wave.

Figure 5A:
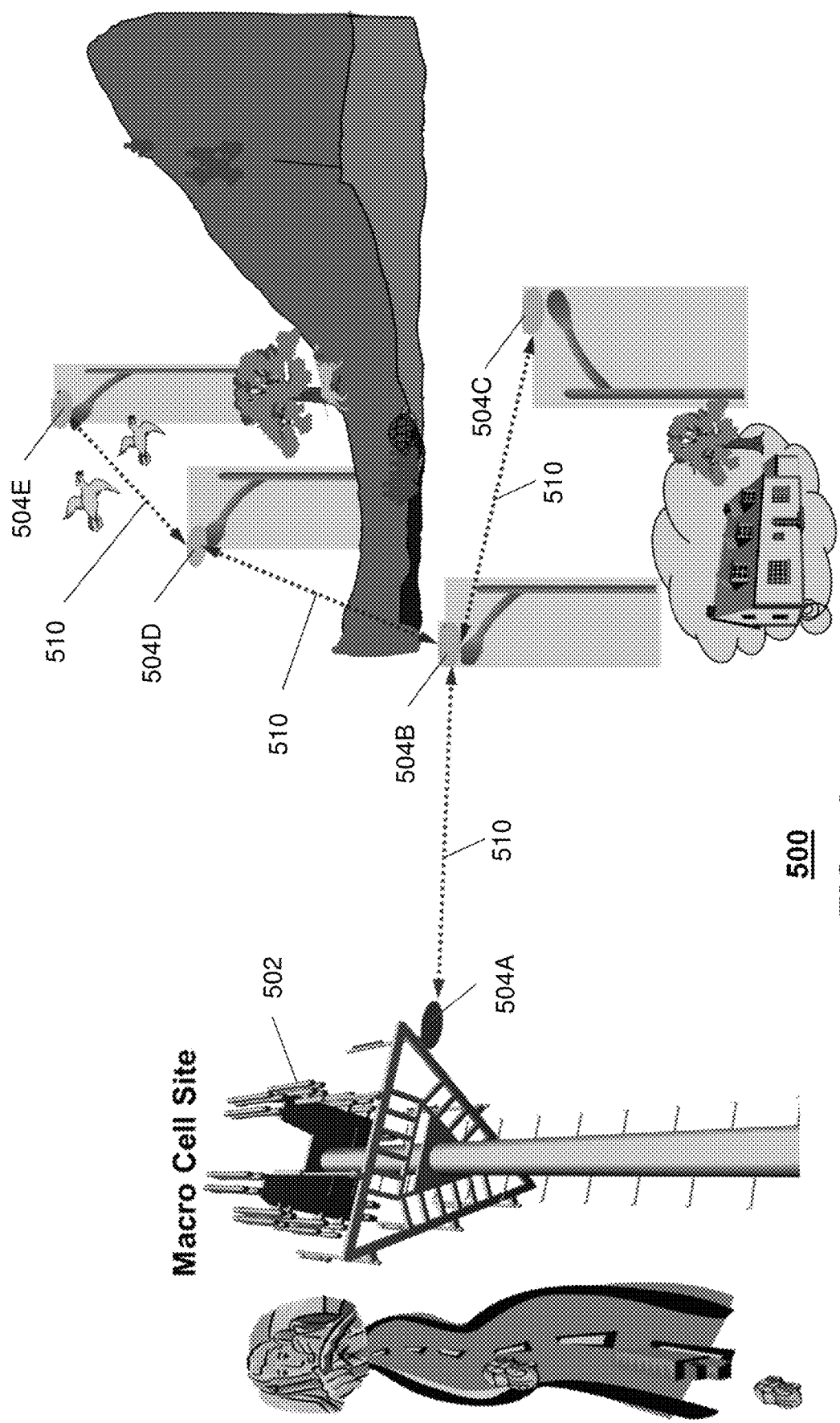
FIG. 5A is a block diagram illustrating an example, non-limiting embodiment of a communication system in accordance with various aspects described herein.

Turning now to FIG. 5A, a block diagram illustrating an example, non-limiting embodiment of a communication system 500 in accordance with various aspects of the subject disclosure is shown. The communication system 500 can include a macro base station 502 such as a base station or access point having antennas that covers one or more sectors (e.g., 6 or more sectors). The macro base station 502 can be communicatively coupled to a communication node 504A that serves as a master or distribution node for other communication nodes 504B-E distributed at differing geographic locations inside or beyond a coverage area of the macro base station 502. The communication nodes 504 operate as a distributed antenna system configured to handle communications traffic associated with client devices such as mobile devices (e.g., cell phones) and/or fixed/stationary devices (e.g., a communication device in a residence, or commercial establishment) that are wirelessly coupled to any of the communication nodes 504. In particular, the wireless resources of the macro base station 502 can be made available to mobile devices by allowing and/or redirecting certain mobile and/or stationary devices to utilize the wireless resources of a communication node 504 in a communication range of the mobile or stationary devices.

The communication nodes 504A-E can be communicatively coupled to each other over an interface 510. In one embodiment, the interface 510 can comprise a wired or tethered interface (e.g., fiber optic cable). In other embodiments, the interface 510 can comprise a wireless RF interface forming a radio distributed antenna system. In various embodiments, the communication nodes 504A-E can include one or more antennas, such as dielectric horn antennas or antenna arrays, poly rod antennas or antenna arrays or any of the other antennas described herein. The communication nodes 504A-E can be configured to provide communication services to mobile and stationary devices according to instructions provided by the macro base station 502. In other examples of operation however, the communication nodes 504A-E operate merely as analog repeaters to spread the coverage of the macro base station 502 throughout the entire range of the individual communication nodes 504A-E.

The micro base stations (depicted as communication nodes 504) can differ from the macro base station in several ways. For example, the communication range of the micro base stations can be smaller than the communication range of the macro base station. Consequently, the power consumed by the micro base stations can be less than the power consumed by the macro base station. The macro base station optionally directs the micro base stations as to which mobile and/or stationary devices they are to communicate with, and which carrier frequency, spectral segment(s) and/or timeslot schedule of such spectral segment(s) are to be used by the micro base stations when communicating with certain mobile or stationary devices. In these cases, control of the micro base stations by the macro base station can be performed in a master-slave configuration or other suitable control configurations. Whether operating independently or under the control of the macro base station 502, the resources of the micro base stations can be simpler and less costly than the resources utilized by the macro base station 502.

Figure 5B:
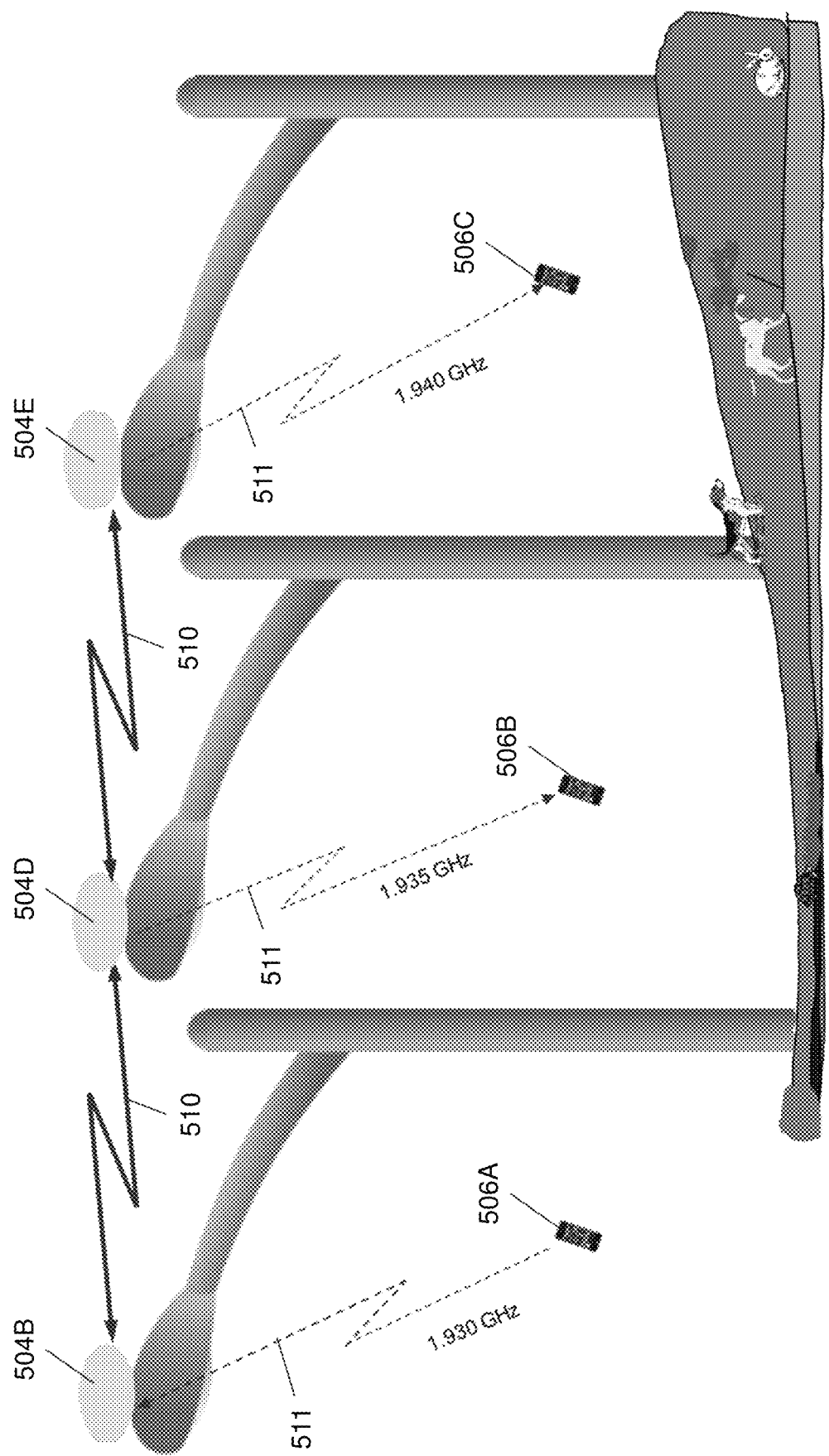
FIG. 5B is a block diagram illustrating an example, non-limiting embodiment of a portion of the communication system of FIG. 44A in accordance with various aspects described herein.

Turning now to FIG. 5B, a block diagram illustrating an example, non-limiting embodiment of the communication nodes 504B-E of the communication system 500 of FIG. 5A is shown. In this illustration, the communication nodes 504B-E are placed on a utility fixture such as a light post. In other embodiments, some of the communication nodes 504B-E can be placed on a building or a utility post or pole that is used for distributing power and/or communication lines. The communication nodes 504B-E in these illustrations can be configured to communicate with each other over the interface 510, which in this illustration is shown as a wireless interface. The communication nodes 504B-E can also be configured to communicate with mobile or stationary devices 506A-C over a wireless interface 511 that conforms to one or more communication protocols (e.g., fourth generation (4G) wireless signals such as LTE signals or other 4G signals, fifth generation (5G) wireless signals, WiMAX, 802.11 signals, ultra-wideband signals, etc.). The communication nodes 504 can be configured to exchange signals over the interface 510 at an operating frequency that is may be higher (e.g., 28 GHz, 38 GHz, 60 GHz, 80 GHz or higher) than the operating frequency used for communicating with the mobile or stationary devices (e.g., 1.9 GHz) over interface 511. The high carrier frequency and a wider bandwidth can be used for communicating between the communication nodes 504 enabling the communication nodes 504 to provide communication services to multiple mobile or stationary devices via one or more differing frequency bands, (e.g. a 900 MHz band, 1.9 GHz band, a 2.4 GHz band, and/or a 5.8 GHz band, etc.) and/or one or more differing protocols. In other embodiments, particularly where the interface 510 is implemented via a guided wave communications system on a wire, a wideband spectrum in a lower frequency range (e.g. in the range of 2-6 GHz, 4-10 GHz, etc.) can be employed.

Turning now to FIG. 5C, a block diagram illustrating an example, non-limiting embodiment of downlink and uplink communication techniques for enabling a base station to communicate with the communication nodes 504 of FIG. 5A is shown. In the illustrations of FIG. 5C, downlink signals (i.e., signals directed from the macro base station 502 to the communication nodes 504) can be spectrally divided into control channels 522, downlink spectral segments 526 each including modulated signals which can be frequency converted to their original/native frequency band (e.g., cellular band, or other native frequency band) for enabling the communication nodes 504 to communicate with one or more mobile or stationary devices 526, and pilot signals 524 which can be supplied with some or all of the spectral segments 526 for mitigating distortion created between the communication nodes 504. The pilot signals 524 can be processed by tethered or wireless transceivers of downstream communication nodes 504 to remove distortion from a receive signal (e.g., phase distortion). Each downlink spectral segment 526 can be allotted a bandwidth 525 sufficiently wide (e.g., 50 MHz) to include a corresponding pilot signal 524 and one or more downlink modulated signals located in frequency channels (or frequency slots) in the spectral segment 526. The modulated signals can represent cellular channels, WLAN channels or other modulated communication signals (e.g., 10-20 MHz), which can be used by the communication nodes 504 for communicating with one or more mobile or stationary devices 506.

Uplink modulated signals generated by mobile or stationary communication devices in their native/original frequency bands (e.g., cellular band, or other native frequency band) can be frequency converted and thereby located in frequency channels (or frequency slots) in the uplink spectral segment 530. The uplink modulated signals can represent cellular channels, WLAN channels or other modulated communication signals. Each uplink spectral segment 530 can be allotted a similar or same bandwidth 525 to include a pilot signal 528 which can be provided with some or each spectral segment 530 to enable upstream communication nodes 504 and/or the macro base station 502 to remove distortion (e.g., phase error).

In the embodiment shown, the downlink and uplink spectral segments 526 and 530 each comprise a plurality of frequency channels (or frequency slots), which can be occupied with modulated signals that have been frequency converted from any number of native/original frequency bands (e.g. a 900 MHz band, 1.9 GHz band, a 2.4 GHz band, and/or a 5.8 GHz band, etc.). The modulated signals can be up-converted to adjacent frequency channels in downlink and uplink spectral segments 526 and 530. In this fashion, while some adjacent frequency channels in a downlink spectral segment 526 can include modulated signals originally in a same native/original frequency band, other adjacent frequency channels in the downlink spectral segment 526 can also include modulated signals originally in different native/original frequency bands, but frequency converted to be located in adjacent frequency channels of the downlink spectral segment 526. For example, a first modulated signal in a 1.9 GHz band and a second modulated signal in the same frequency band (i.e., 1.9 GHz) can be frequency converted and thereby positioned in adjacent frequency channels of a downlink spectral segment 526. In another illustration, a first modulated signal in a 1.9 GHz band and a second communication signal in a different frequency band (i.e., 2.4 GHz) can be frequency converted and thereby positioned in adjacent frequency channels of a downlink spectral segment 526. Accordingly, frequency channels of a downlink spectral segment 526 can be occupied with any combination of modulated signals of the same or differing signaling protocols and of a same or differing native/original frequency bands.

Similarly, while some adjacent frequency channels in an uplink spectral segment 530 can include modulated signals originally in a same frequency band, adjacent frequency channels in the uplink spectral segment 530 can also include modulated signals originally in different native/original frequency bands, but frequency converted to be located in adjacent frequency channels of an uplink segment 530. For example, a first communication signal in a 2.4 GHz band and a second communication signal in the same frequency band (i.e., 2.4 GHz) can be frequency converted and thereby positioned in adjacent frequency channels of an uplink spectral segment 530. In another illustration, a first communication signal in a 1.9 GHz band and a second communication signal in a different frequency band (i.e., 2.4 GHz) can be frequency converted and thereby positioned in adjacent frequency channels of the uplink spectral segment 526. Accordingly, frequency channels of an uplink spectral segment 530 can be occupied with any combination of modulated signals of a same or differing signaling protocols and of a same or differing native/original frequency bands. It should be noted that a downlink spectral segment 526 and an uplink spectral segment 530 can themselves be adjacent to one another and separated by only a guard band or otherwise separated by a larger frequency spacing, depending on the spectral allocation in place.

It will be appreciated that downlink modulated signals generated by a base station in their native/original frequency bands (e.g., cellular band, or other native frequency band) can be frequency shifted to one of the downlink spectral segments 526 without re-modulating the modulated signals. That is, frequency shifting the downlink modulated signals can include transitioning the downlink modulated signals from its native/original frequency bands to a spectral segment 526 without modifying the signaling protocol (e.g., LTE, 5G, DOCSIS, etc.) and/or the modulation technique (e.g., orthogonal frequency-division multiple access; generally, referred to as OFDMA, etc.) used by the base station to generate the downlink modulated signal in its native/original frequency bands. Frequency shifting the downlink modulated signals in this manner preserves the signaling protocol and/or modulation technique used to generate the downlink modulated signals, and thereby enables any of the communication nodes 504 to restore the downlink modulated signals in spectral segment 526 to its respective native/original frequency bands with only a frequency conversion process.

Similarly, uplink modulated signals generated by mobile or stationary communication devices in their native/original frequency bands (e.g., cellular band, or other native frequency band) can be frequency shifted to one of the uplink spectral segments 530 without re-modulating the modulated signals. That is, frequency shifting the uplink modulated signals can include transitioning the uplink modulated signals from its native/original frequency bands to a spectral segment 530 without modifying the signaling protocol (e.g., LTE, 5G, DOCSIS, etc.) and/or the modulation technique (e.g., single carrier frequency-division multiple access; generally, referred to as SC-FDMA, etc.) used by the mobile or stationary communication devices to generate the uplink modulated signal in its native/original frequency bands. Frequency shifting the uplink modulated signals in this manner preserves the signaling protocol and/or modulation technique used to generate the uplink modulated signals, and thereby enables any of the communication nodes 504 to restore the uplink modulated signals in spectral segment 530 to its respective native/original frequency bands with only a frequency conversion process.

The foregoing frequency conversion processes can correspond to a frequency up-conversion, a frequency down-conversion, or a combination thereof. The frequency conversion process can be performed with analog circuitry (e.g., amplifiers, mixers, filters, etc.) without digital conversion, which can simplify the design requirements of the communication nodes 504. Frequency conversion can be also performed via digital signal processing while preserving the signaling protocol and/or modulation technique, for example, by shifting the signals in the frequency domain. It will be appreciated that the foregoing principles of frequency conversion without modifying the signaling protocol and/or the modulation technique of previously modulated signals its native/original frequency bands can be applied to any embodiments of the subject disclosure including without limitation wireless signals propagating in free space between antenna systems of a distributed antenna system, and/or guided electromagnetic waves that propagate along a physical transmission medium.

Figure 5D:
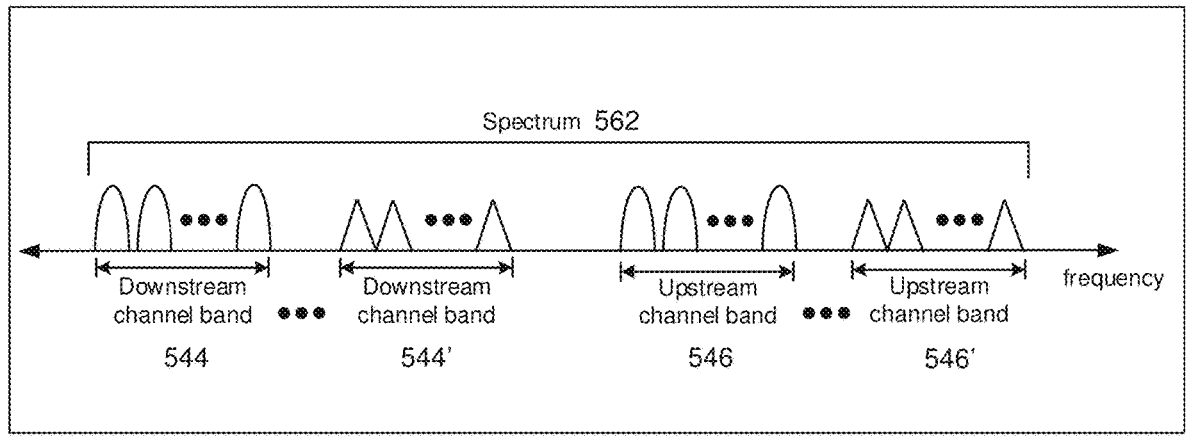
FIG. 5D is a graphical diagram illustrating an example, non-limiting embodiment of a frequency spectrum in accordance with various aspects described herein.

Turning now to FIG. 5D, a graphical diagram 560 illustrating an example, non-limiting embodiment of a frequency spectrum is shown. In particular, a spectrum 562 is shown for a distributed antenna system that conveys modulated signals occupying frequency channels of uplink or downlink spectral segments after they have been converted in frequency (e.g. via up-conversion or down-conversion) from one or more original/native spectral segments into the spectrum 562.

As previously discussed two or more different communication protocols can be employed to communicate upstream and downstream data. When two or more differing protocols are employed, a first subset of the downlink frequency channels of a downlink spectral segment 526 can be occupied by frequency converted modulated signals in accordance with a first standard protocol and a second subset of the downlink frequency channels of the same or a different downlink spectral segment 530 can be occupied by frequency converted modulated signals in accordance with a second standard protocol that differs from the first standard protocol. Likewise a first subset of the uplink frequency channels of an uplink spectral segment 530 can be received by the system for demodulation in accordance with the first standard protocol and a second subset of the uplink frequency channels of the same or a different uplink spectral segment 530 can be received in accordance with a second standard protocol for demodulation in accordance with the second standard protocol that differs from the first standard protocol.

In the example shown, the downstream channel band 544 includes a first plurality of downstream spectral segments represented by separate spectral shapes of a first type representing the use of a first communication protocol. The downstream channel band 544' includes a second plurality of downstream spectral segments represented by separate spectral shapes of a second type representing the use of a second communication protocol. Likewise the upstream channel band 546 includes a first plurality of upstream spectral segments represented by separate spectral shapes of the first type representing the use of the first communication protocol. The upstream channel band 546' includes a second plurality of upstream spectral segments represented by separate spectral shapes of the second type representing the use of the second communication protocol. These separate spectral shapes are meant to be placeholders for the frequency allocation of each individual spectral segment along with associated reference signals, control channels and/or clock signals. While the individual channel bandwidth is shown as being roughly the same for channels of the first and second type, it should be noted that upstream and downstream channel bands 544, 544', 546 and 546' may be of differing bandwidths. Additionally, the spectral segments in these channel bands of the first and second type may be of differing bandwidths, depending on available spectrum and/or the communication standards employed.

Figure 5E:
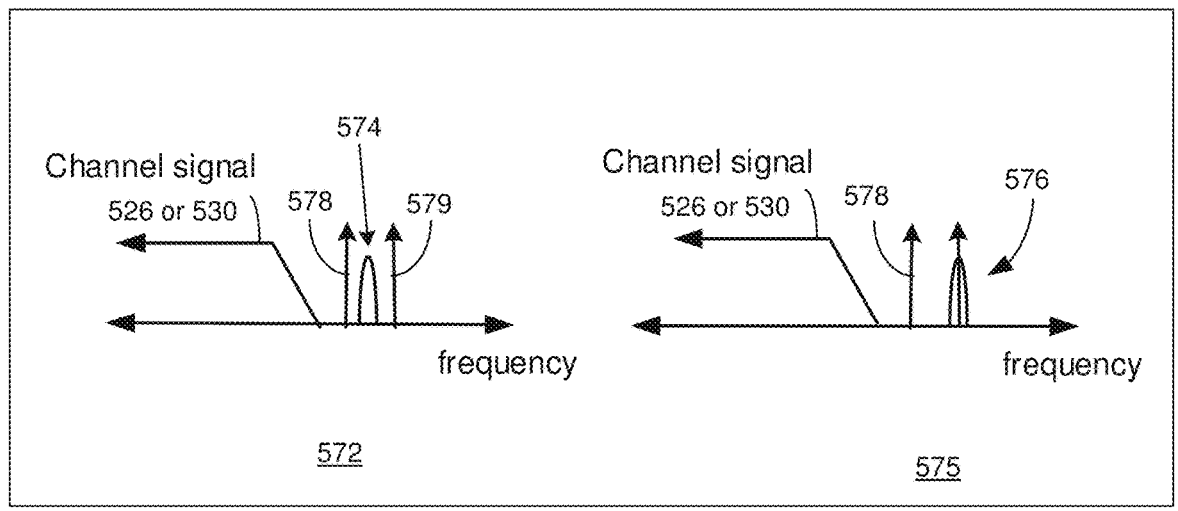
FIG. 5E is a graphical diagram illustrating an example, non-limiting embodiment of a frequency spectrum in accordance with various aspects described herein.

Turning now to FIG. 5E, a graphical diagram 570 illustrating an example, non-limiting embodiment of a frequency spectrum is shown. In particular a portion of the spectrum 562 of FIG. 5D is shown for a distributed antenna system that conveys modulated signals in the form of channel signals that have been converted in frequency (e.g. via up-conversion or down-conversion) from one or more original/native spectral segments.

The portion 572 includes a portion of a downlink or uplink spectral segment 526 and 530 that is represented by a spectral shape and that represents a portion of the bandwidth set aside for a control channel, reference signal, and/or clock signal. The spectral shape 574, for example, represents a control channel that is separate from reference signal 579 and a clock signal 578. It should be noted that the clock signal 578 is shown with a spectral shape representing a sinusoidal signal that may require conditioning into the form of a more traditional clock signal. In other embodiments however, a traditional clock signal could be sent as a modulated carrier wave such by modulating the reference signal 579 via amplitude modulation or other modulation technique that preserves the phase of the carrier for use as a phase reference. In other embodiments, the clock signal could be transmitted by modulating another carrier wave or as another signal. Further, it is noted that both the clock signal 578 and the reference signal 579 are shown as being outside the frequency band of the control channel 574.

In another example, the portion 575 includes a portion of a downlink or uplink spectral segment 526 and 530 that is represented by a portion of a spectral shape that represents a portion of the bandwidth set aside for a control channel, reference signal, and/or clock signal. The spectral shape 576 represents a control channel having instructions that include digital data that modulates the reference signal, via amplitude modulation, amplitude shift keying or other modulation technique that preserves the phase of the carrier for use as a phase reference. The clock signal 578 is shown as being outside the frequency band of the spectral shape 576. The reference signal, being modulated by the control channel instructions, is in effect a subcarrier of the control channel and is in-band to the control channel. Again, the clock signal 578 is shown with a spectral shape representing a sinusoidal signal, in other embodiments however, a traditional clock signal could be sent as a modulated carrier wave or other signal. In this case, the instructions of the control channel can be used to modulate the clock signal 578 instead of the reference signal.

Consider the following example, where the control channel 576 is carried via modulation of a reference signal in the form of a continuous wave (CW) from which the phase distortion in the receiver is corrected during frequency conversion of the downlink or uplink spectral segment 526 and 530 back to its original/native spectral segment. The control channel 576 can be modulated with a robust modulation such as pulse amplitude modulation, binary phase shift keying, amplitude shift keying or other modulation scheme to carry instructions between network elements of the distributed antenna system such as network operations, administration and management traffic and other control data. In various embodiments, the control data can include without limitation:

Status information that indicates online status, offline status, and network performance parameters of each network element.

Network device information such as module names and addresses, hardware and software versions, device capabilities, etc.

Spectral information such as frequency conversion factors, channel spacing, guard bands, uplink/downlink allocations, uplink and downlink channel selections, etc.

Environmental measurements such as weather conditions, image data, power outage information, line of sight blockages, etc.

In a further example, the control channel data can be sent via ultra-wideband (UWB) signaling. The control channel data can be transmitted by generating radio energy at specific time intervals and occupying a larger bandwidth, via pulse-position or time modulation, by encoding the polarity or amplitude of the UWB pulses and/or by using orthogonal pulses. In particular, UWB pulses can be sent sporadically at relatively low pulse rates to support time or position modulation, but can also be sent at rates up to the inverse of the UWB pulse bandwidth. In this fashion, the control channel can be spread over an UWB spectrum with relatively low power, and without interfering with CW transmissions of the reference signal and/or clock signal that may occupy in-band portions of the UWB spectrum of the control channel.

Figure 6:
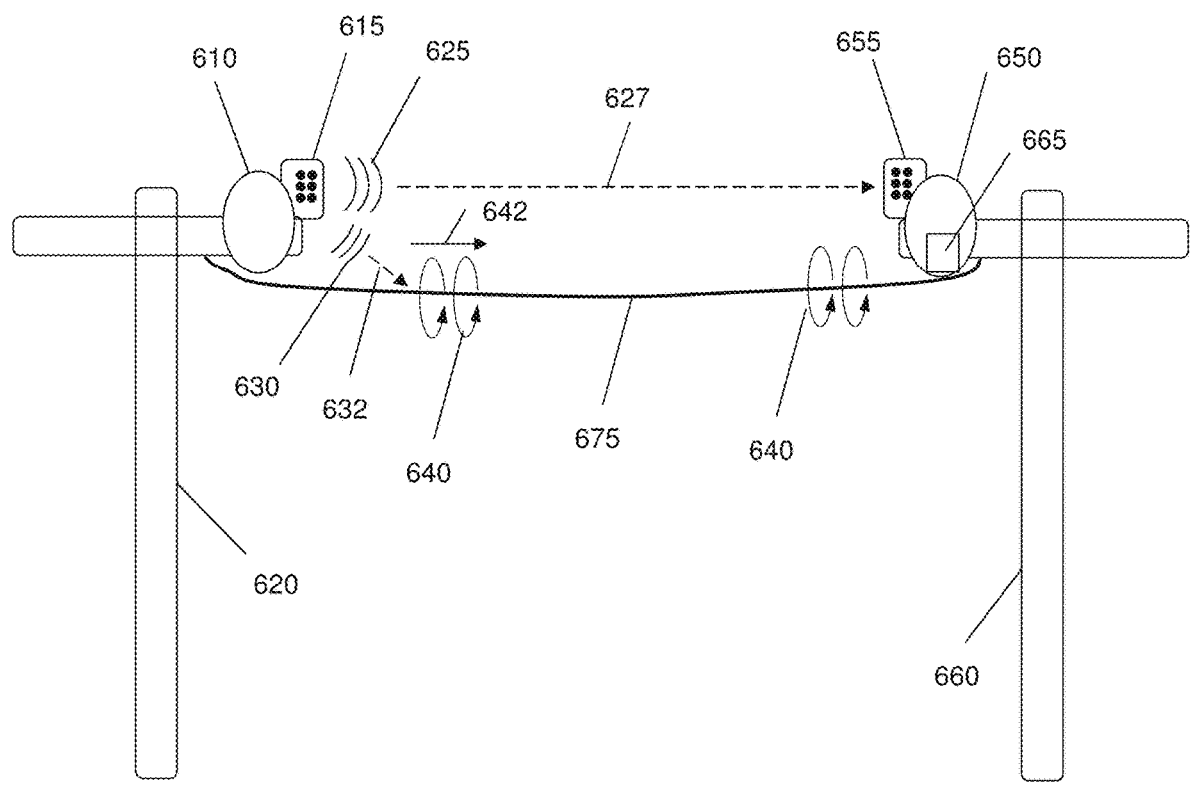
FIG. 6 is a block diagram illustrating an example, non-limiting embodiment of a communication system that utilizes beam steering in accordance with various aspects described herein.

In one or more embodiments in system 600 of FIG. 6, communication device 610 can include an antenna array 615 for transmitting wireless signals. In one or more embodiments, the antenna array 615 can perform beam steering. For example, the antenna array 615 can utilize a first subset of antennas of the antenna array to transmit first wireless signals 625 directed (as shown by reference number 627) via beam steering towards the communication device 650. A second subset of antennas of the antenna array 615 can transmit second wireless signals 630 directed (as shown by reference number 632) via the beam steering towards a transmission medium 675 (e.g., a power line connected between the utility poles 620, 660). In one or more embodiments, the aforementioned beams can be simultaneously created by the same set of antennas in arrays 610 and 650. In one or more embodiments, the beam steering can enable the antenna array to communicate with more than one wireless receiver with or without directing wireless signals to a transmission medium. In one or more embodiments, the beam steering can enable the antenna array to direct the wireless signals to more than one transmission medium with or without communicating with a wireless receiver.

The first and second wireless signals 625, 630 can be associated with communication signals that are to be transmitted over the network. For instance, the first and second wireless signals 625, 630 can be the same signals. In another example, the first wireless signals 625 can represent a first subset of the communication signals, while the second wireless signals 630 represent a second subset of the communication signals. In one embodiment, the first and second wireless signals 625, 630 can be different and can be based on interleaving of a group of communication signals, such as video packets, and so forth. The communication signals can be various types of signals including information associated with subscriber services, network control, testing, and so forth.

In one or more embodiments, the second wireless signals 630 induce electromagnetic waves 640. For example, the electromagnetic waves 640 are induced at a physical interface of the transmission medium 675 and propagate (as shown by reference number 642) without requiring an electrical return path. The electromagnetic waves 640 are guided by the transmission medium 675 towards the communication device 650, which is positioned in proximity to the transmission medium. The electromagnetic waves 640 can be representative of the second wireless signals 630 which are associated with the communication signals.

In one or more embodiments, the communication device 650 can include a receiver that is configured to receive the electromagnetic waves 640 that are propagating along the transmission medium 675. System 600 enables the communication device 610 to transmit information which is received by the communication device 650 (e.g., another antenna array 655) via the wireless communication path 627 and via being guided by the transmission medium 675.

In one or more embodiments, the antenna arrays 615, 655 can include polyrod antennas. For example, each of the polyrod antennas can include a core that is connected with a waveguide that is configured to confine an electromagnetic wave at least in part within the core in a particular region of the core. In one embodiment, each of the polyrod antennas can include a core having a first region, a second region, a third region, and a fourth region, where the core comprises an interface in the first region. One of the plurality of transmitters can generate a first electromagnetic wave that induces a second electromagnetic wave at the interface of the first region. The core can be connected with a waveguide that is configured to confine the second electromagnetic wave at least in part within the core in the first region, where the second region of the core is configured to reduce a radiation loss of the second electromagnetic wave as the second electromagnetic wave propagates into the second region. The third region of the core can be configured to reduce a propagation loss of the second electromagnetic wave as the second electromagnetic wave propagates into the third region. The fourth region of the core can be outside of the waveguide and can be tapered to facilitate transmitting one of the first or second wireless signals based on the second electromagnetic wave.

In one or more embodiments, the communication device 610 can provide a phase adjustment to the second wireless signals 630 to accomplish beam steering towards the transmission medium 675. FIG. 6 illustrates the antenna array 655 and the receiver 665 being co-located at communication device 650, however, in another embodiment the antenna array 655 and the receiver 665 can be separate devices that may or may not be in proximity to each other. For example, the first wireless signals 625 can be received by the antenna array 655 of the communication device 650 while the electromagnetic waves 640 can be received by a receiver of a different communication device (not shown) that is in proximity to the transmission medium 675.

The foregoing embodiments can be combined in whole or in part with the proceeding techniques for processing electromagnetic waves having a field structure that facilitates a reduction of propagation losses when an obstruction such as water is present on an outer surface of a transmission medium such as a cable, power line, or other physical structure. In an embodiment, an approach for low-loss propagation of electromagnetic modes on a single conductor wire can include utilizing higher-order modes to tailor the field distribution of an electromagnetic wave and optimize the mode's sensitivity to the presence of both a water film and water droplets on a wire, while maintaining a reasonable transverse power profile and strong guidance.

Example embodiments of the subject disclosure also include communication devices that can launch/transmit or receive electromagnetic waves that propagate along a physical transmission medium and that have an electromagnetic field spatially configured to avoid in whole or in part energy loss or leakage n. In an example embodiment, these electromagnetic waves can be described as a hollow mode or a donut mode in which the electromagnetic field has a first portion with a higher energy intensity (e.g., the donut portion excluding the hole) than that of a second portion (e.g., the hole of the donut). In an example embodiment, the first portion of the electromagnetic field may be substantially concentric with the second portion of the electromagnetic field. It will be appreciated, however, that asymmetric or symmetric field configurations of the donut mode may be used. These electromagnetic waves can also be described as having a Bessel or Bessel-Gauss-like field structure, as described herein. While communication devices are described herein as launching/transmitting or receiving Bessel or Bessel-Gauss-like TM modes, it will be appreciated that these communication devices could also be configured to operate with other hollow modes or donut modes without departing from example embodiments of the subject disclosure.

In accordance with example embodiments, example communication devices can be configured to utilize or operate with (e.g., launch/transmit, receive, etc.) one or more modes in a class of Bessel-Gauss-like TM modes, which can meet requirements in a variety of operational conditions including: the presence of water films and droplets on the transmission medium, wire curvature and helicity of the transmission medium, with and without insulation on the transmission medium, and/or over a large range in operational frequency and transmission medium length. As described further herein, these conditions can be simulated using multiple simulation techniques consisting of periodic eigenmode; frequency and time domain driven modal; and an electric field integral equation solver. These techniques are believed to be in good agreement when simulating systems that operate under the same conditions. The subject disclosure also identifies communication devices or antennas to launch these modes and couple them to wires for subsequent experimental testing.

Results from simulation tests provide as follows:
- a Bessel-Gauss-like $TM_1$ mode, with simulations of up to 25 m length with curvature, may have an operational bandwidth of 8-24 GHz with 0.2 dB/m loss when accounting for a 0.1 mm water film thickness on the outer surface of the transmission medium.
- a Bessel-Gauss-like $TM_1$ mode, with simulations with eigenmode and frequency domain solvers over short distances, may meet operational requirements even with a water film on at least a portion of the outer surface of the transmission medium.
- Completing benchmarking simulations for comparison with experimental measurements of the Sommerfeld mode.

Over 400,000 CPU compute hours were conducted at NERSC simulating electromagnetic mode propagation on curved wires with water films.

In accordance with the foregoing analysis and simulations, super-positioning of higher order modes may be utilized to tailor the field profile on the wire and adjust the guidance of the electromagnetic wave. The subject disclosure describes the optimization and propagation of these modes in a variety of operational conditions. For illustration purposes only, the subject disclosure refers to these modes as Bessel-Gauss-like, because the fields may be easier to describe with a Bessel-Gauss formalism. This formalism may be convenient in that it limits the number of free parameters that describe the field distribution to primarily two: the Bessel index and the beam waist. It will be appreciated that these field distributions could also be described accurately with a sum of Hankel functions, but it would require more parameters as many Hankel functions must be superimposed to force the fields to zero beyond a given radius. Simulations confirm that these field distributions in the absence of a transmission medium/wire do expand as expected for a Bessel-Gauss beam in free space. Simulations further demonstrate that the propagation of the Bessel-Gauss-like mode is significantly altered by the presence of the transmission medium/wire and water which provide guidance.

The subject disclosure that follows includes:

benchmarking theoretical modeling against an existing problem set, simulations and experiments;

evaluating guided mode propagation in a realistic geometry to illustrate solution(s) for low loss propagation in rainfall;

analyzing solution(s) and attenuation with numerical and computational modeling of real world problems and variations, e.g., rainfall, wire sag, insulation, cable helicity;

understanding scaling with frequency and highest bandwidth operating points; and evaluating solution(s) consistency with QAM/communications requirements.

Simulation Tools Utilized for Analysis

A variety of simulation tools were used to analyze the propagation of electromagnetic modes (e.g., Periodic Eigenmode Simulations, ACE3P—A Time and Frequency Domain Finite Element Solver, and Electric Field Integral Equation Modeling). These simulations will now be described in further detail for illustrative purposes.

a) Periodic Eigenmode Simulations

Figure 7B:
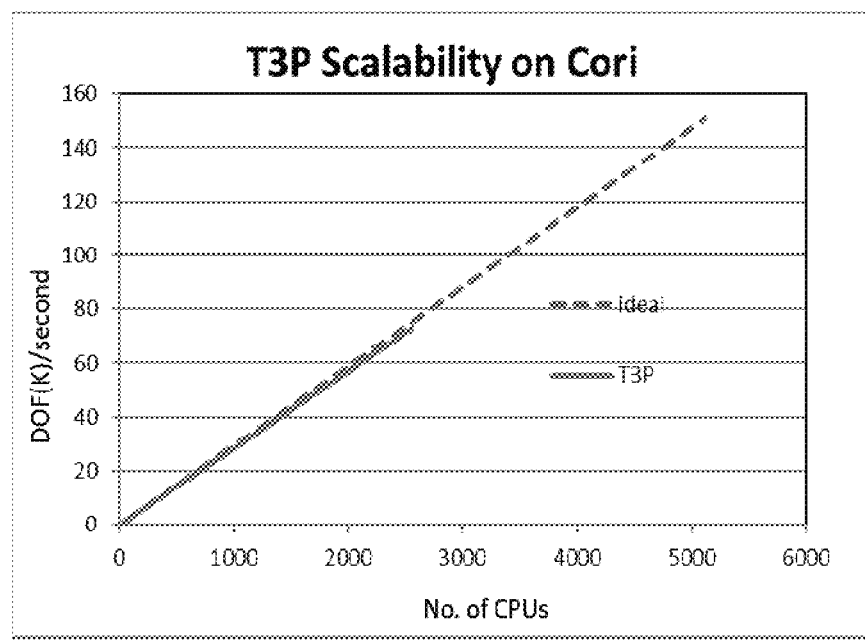
FIG. 7B is a graphical diagram illustrating, an example, non-limiting embodiment of T3P scaling on NERSC Cori computer in accordance with various aspects described herein.

Eigenmode simulations provide fast and accurate solutions to periodic systems and can be implemented to analyze the modes propagating on waveguides. This approach can be utilized with single conductor wires to solve for propagating modes. An example of a simulation domain is shown in FIG. 7A1 with periodic boundary conditions in the longitudinal dimension and a perfectly matched layer (PML) boundary on the outer radius to absorb radiation from the mode. In FIG. 7A2 we show an example of the $TM_0$ mode at 20 GHz. In FIG. 7A3 we show a comparison between theory and simulation for the radial and longitudinal electric field vs radial distance.

b) ACE3P—a Time and Frequency Domain Finite Element Solver

ACE3P (Advanced Computational Electromagnetics 3D Parallel), developed at Standard Linear Accelerator Center (SLAC), is a comprehensive set of parallel finite-element multi-physics codes including electromagnetic, thermal and mechanical characteristics for high-fidelity simulation of RF and accelerator structures. ACE3P runs on Department of Energy (DOE) supercomputing resources at the National Energy Research Scientific Computing Center (NERSC) and thus can handle large-scale computational problems.

i) T3P. T3P, the 3-dimensional (3D) time domain electromagnetic solver in ACE3P, was used for modeling power and signal propagation on a single wire. T3P has a good scaling on the most advanced supercomputer Cori at NERSC as shown in FIG. 7B. The computational time can be reduced by using more compute cores on the machine. A "moving window" simulation was implemented in T3P. The moving window utilizes a pulsed excitation of the simulation domain and only solves for the fields in a volume that is surrounding the finite extent of the pulse. This approach drastically reduces the computational hours needed for time domain simulations, which is critical given the incredibly large meshes for this class of problems.

For benchmarking, a coax feed is used to launch a Sommerfeld $TM_0$ mode pulse at 5 GHZ was driven at the input port of a 50 m long bare smooth copper wire with finite surface conductivity. The computational domain is constrained within 200 mm in the radial direction, and an absorbing boundary condition is set at the outbound surface to ensure minimal reflection of electromagnetic field back to the computational domain. A snapshot in time of the electric field from the T3P simulation is presented in FIG. 7C with an expanded view of the pulse in the top left corner. It clearly shows that the principle $TM_0$ mode is coupled to the copper wire. The $TM_0$ mode attenuation is found to be 0.08 dB/m that includes the mode coupling loss from TEM to $TM_0$ at the input port.

A comparison for two equivalent simulations of 50 m wire at 5 GHz, with and without a moving window, is shown in Table 1.

TABLE 1

Figure 7C:
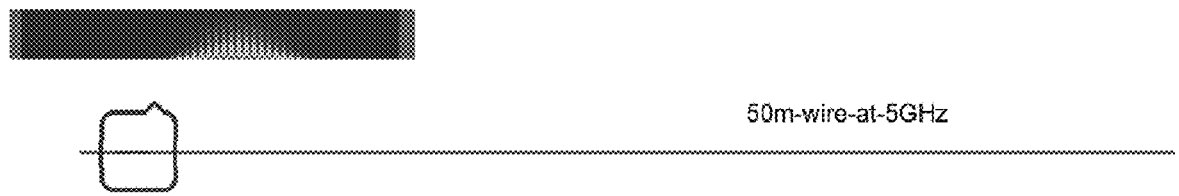
FIG. 7C is a graphical diagram illustrating, an example, non-limiting embodiment of a model generated using a mesh merging tool to generate 50 m wire meshes by merging ten 5 m models. A moving window technique and pulse excitation was utilized to reduce the computation time for the 50 m wire in accordance with various aspects described herein.

Comparison between computational time with and without moving window for model shown in FIG. 7C.

Figure 7D:
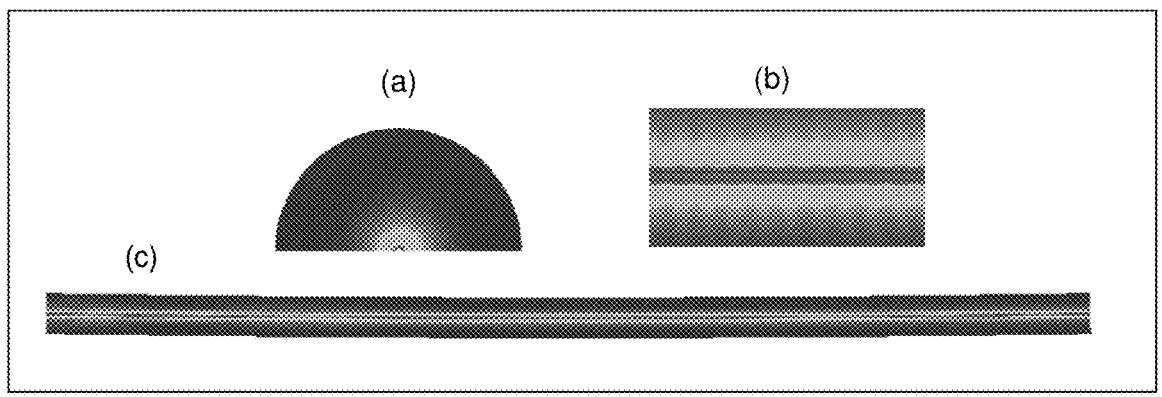
FIG. 7D is a graphical diagram illustrating, an example, non-limiting embodiment of electric field plots for an example of (a) S3P simulation for the $TM_0$ mode with a simulation radius R=200 mm, wire L=10 m, r=5 mm, σ=5.8e7 s/m at 5 GHz; (b) XY plane at input; and (c) Close up of wire; XZ plane over 10 m span showing curvature of wire in accordance with various aspects described herein.

| | Wire Length (m) | dT (ps) | CPU | DOF | Moving Window | Compute Time (min.) |
|---|---|---|---|---|---|---|
| 5 GHz | 50 | 5 | 640 | 7M | No | 450 |
| 5 GHz | 50 | 5 | 640 | 7M | Yes | 35 | ii) S3P. S3P, the 3-dimensional (3D) frequency domain electromagnetic solver in ACE3P, was used for modeling power and signal propagation on a single wire. S3P calculates the S-parameters of electromagnetic structures by solving Maxwell's equations cast as a harmonic Helmholtz equation at a specified frequency. The excitations into the computational domain are realized using ports at the surface boundaries of the computational domain. The port modes are solved numerically and loaded at the ports for the S-parameter calculation. FIG. 7D shows an exemplary simulation of the $TM_0$ on a curved wire at 5 GHz.

c) Electric Field Integral Equation Modeling

We evaluated the use of electric field integral equation (EFIE) method for computation of the propagation of a field guided by a single conductor. For a perfect conducting surface this method yields an equation for the unknown surface current Js on the conductor induced by a known incident field $E^i$ as:

$$E^i(r) = -\frac{jk\eta}{4\pi} \int (I - \nabla\nabla') \frac{\exp(-jk(r-r'))}{|r-r'|} J_s(r') ds'$$

Figure 7E:
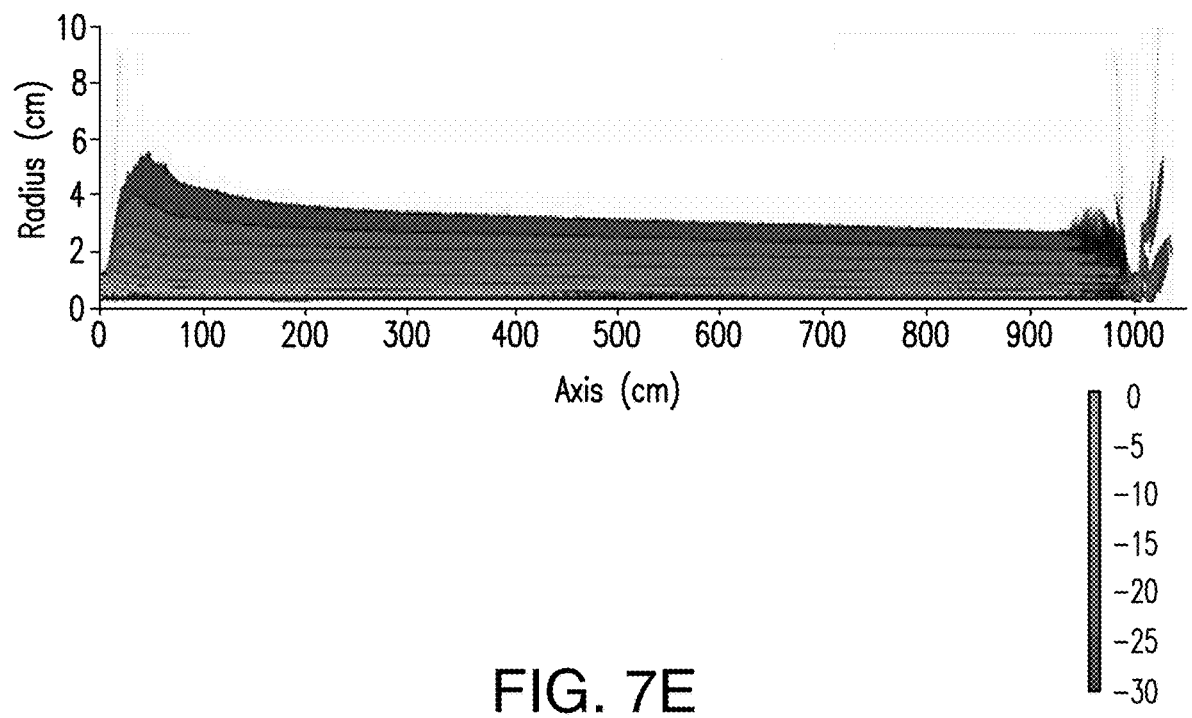
FIG. 7E is a graphical diagram illustrating, an example, non-limiting embodiment of a radial electric field intensity along a 10 meter 0.5 cm radius lossless wire excited by Sommerfeld $TM_0$ mode at 30 GHz in accordance with various aspects described herein.

After finding the solution for surface currents the total field $E^i+E^s(Js)$, can then be computed to calculate quantities of interest such as propagation loss. Using this formulation as shown in FIG. 7E, with a horn we excite the Sommerfeld mode at 30 GHz, we calculated the propagation of the excited fields on a 10 meter length of wire with a 0.5 cm radius.

Benchmarking Simulations

Figure 7F:
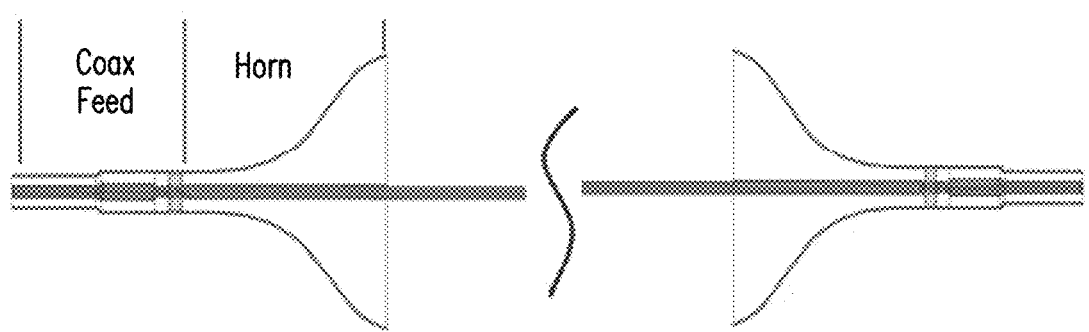
FIG. 7F is a graphical diagram illustrating, an example, non-limiting embodiment of an experiment to measure transmission on single conductor wire fed by tapered waveguide horns. The horns were separated by a distance of approximately 10 meters in accordance with various aspects described herein.
Figure 7G:
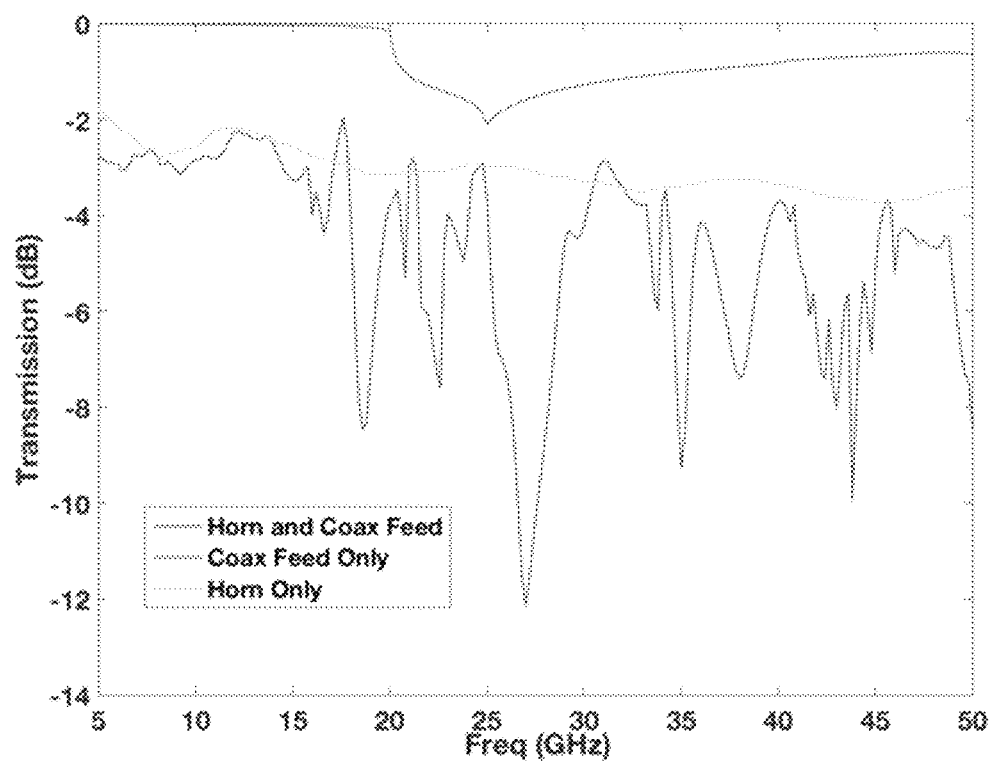
FIG. 7G is a graphical diagram illustrating, an example, non-limiting embodiment of a TEM mode transmission versus frequency through coax feed and horn in accordance with various aspects described herein.

A measurement of a single wire transmission was performed using two back-to-back horns (FIG. 7F) which convert an input coaxial TEM mode to a Sommerfeld-like wave that propagates on the wire connecting the horns. In this section, the subject disclosure demonstrates two computational methods that can be used for calculation of transmission in this configuration. A first computation uses the mode matching method which provides a rapid solution (seconds) but does not model diffraction effects or the free space transmission of fields on a single wire. A second method based on the electric field integral method provides a full wave solution of the problem but is computationally demanding (hours/days) and assumes perfect conductivity.

reflection in the coax feed portion of the horn. This can be seen in FIG. 7G. The TEM transmission for the horn only is somewhat smooth versus frequency, starting at −2 dB and decreasing to −3.5 dB at 50 GHz. The calculation with the combined coax feed and horn shows significant variations in transmission due to complex interactions between the higher order modes generated in the feed and mode conversion in the horn. The mode composition breakdown of TEM power and power in higher order modes calculated for the coax feed and horn together is shown in Table 2. Also shown in the last two columns of Table 2 is an estimate for the transmission that was observed in the experiment with two horns connected by the single conductor. The transmission estimate was calculated as:

Insertion Loss (dB)=2×10 Log 10[fractional power in TEM mode(1−fractional reflected power)].

This estimate has two approximations which are: (i) it assumes the power of the propagating mode on the wire is equal to the TEM mode content at the horn aperture and (ii) does not include ohmic and diffraction losses along the wire connecting the two horns.

TABLE 2

Calculated mode content at horn radiating aperture and transmission estimate for complete transmission experiment using the two horns. The numbers for modal power content are normalized to total power at the horn output aperture.

| Freq | Modal Power Content at Horn Aperture | | | | | | | Back-to-Back Estimate | |
|---|---|---|---|---|---|---|---|---|---|
| | | | | | | | | Reflected Power | Insertion Loss |
| (GHz) | TEM | TM01 | TM02 | TM03 | TM04 | TM05 | TM06 | (%) | (dB) |
| 5 | 66.3 | 30.6 | 3.1 | | | | | 20 | −5.4 |
| 10 | 56.3 | 24.6 | 14.6 | 4.1 | | | | 8 | −5.7 |
| 20 | 49.2 | 27.4 | 10.3 | 6.3 | 4.5 | 1.7 | | 20 | −7.6 |
| 30 | 45.4 | 25.2 | 10.6 | 9.3 | 4.3 | 1.5 | 1.3 | 3 | −6.8 |
| 40 | 46.4 | 19.1 | 14.8 | 8.8 | 4.5 | 3.4 | 1.4 | 2 | −7.5 |
| 50 | 15.4 | 6.9 | 8.4 | 3.1 | 12.5 | 15.8 | 10.3 | 2 | −16.6 |

Mode Matching

The mode matching (MM) method is based on an expansion of the fields in the waveguide in terms of the modes of a cylindrical waveguide. At each change in the waveguide radius (smoothly varying walls are modeled as a series of small steps) the field expansion is matched across the common aperture to ensure continuity of the electric and magnetic fields. This approach is known to give an accurate multimode scattering matrix for rectangular, circular and coaxial waveguide geometries. The mode matching method is well suited for modeling the coax feed and horn geometry but does not provide a solution for the open single wire transmission as this is no longer a closed waveguide geometry. However, for aperture sizes much greater than a wavelength, the computed fields at the horn's radiating aperture do provide a very good approximation of the actual fields radiating into space on the single conductor. The main approximation error arises from diffraction due to non-zero fields on the horn's outer edge, which is not included in the mode matching calculation. For the horn output aperture dimensions, the error from neglecting the diffraction fields is small as the TEM electric field intensity is about −25 dB lower at the aperture edge versus the field intensity on the center conductor. The power coupled to the Sommerfeld mode will be given to a close approximation by the calculated power in the TEM mode.

The primary contributor to fluctuations in power in the desired output TEM mode is from mode conversion and Electric Field Integral Equation In the electric field integral equation (EFIE) method metal surfaces are replaced by surface currents whose radiated fields satisfy the original boundary condition that the tangential electric field (sum of incident and radiated fields) is zero on the surfaces and total field goes to zero at infinity (radiation boundary condition). From the equivalence theorem it is given that the total field derived with the EFIE formulation is identical to the original problem. Solution for the initially unknown surface currents requires an iterative solution of a large, dense matrix which is computationally very demanding but less so than a finite element solution when the total surface area is large compared to wavelength such as for this case of interest.

Figure 7H:
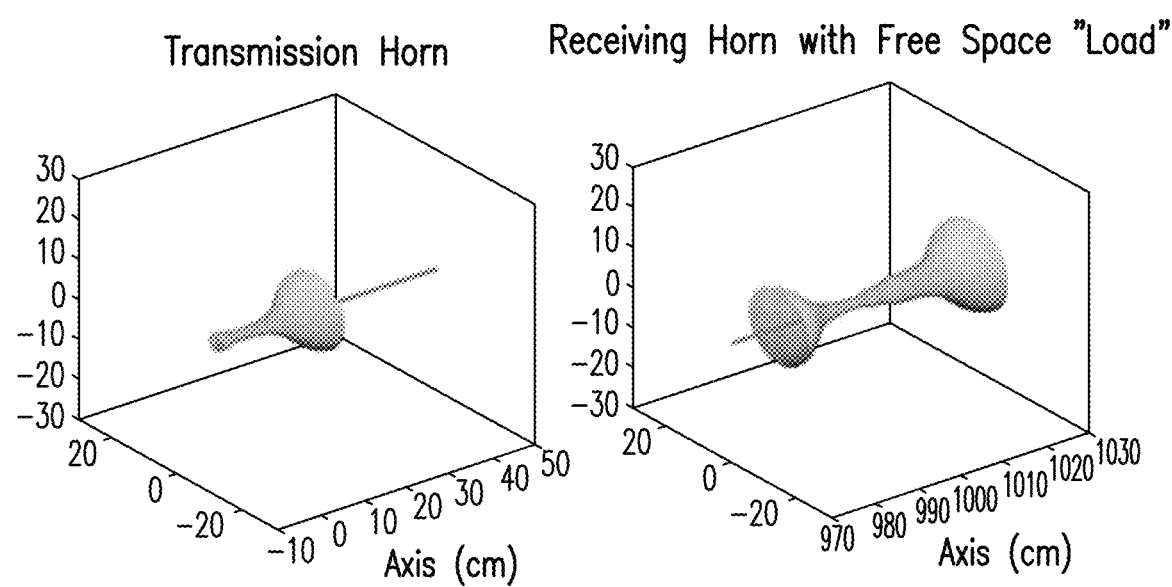
FIG. 7H is a graphical diagram illustrating, an example, non-limiting embodiment of a plot of mesh used to model transmitting and receive horns and connecting wire in accordance with various aspects described herein.
Figure 71:
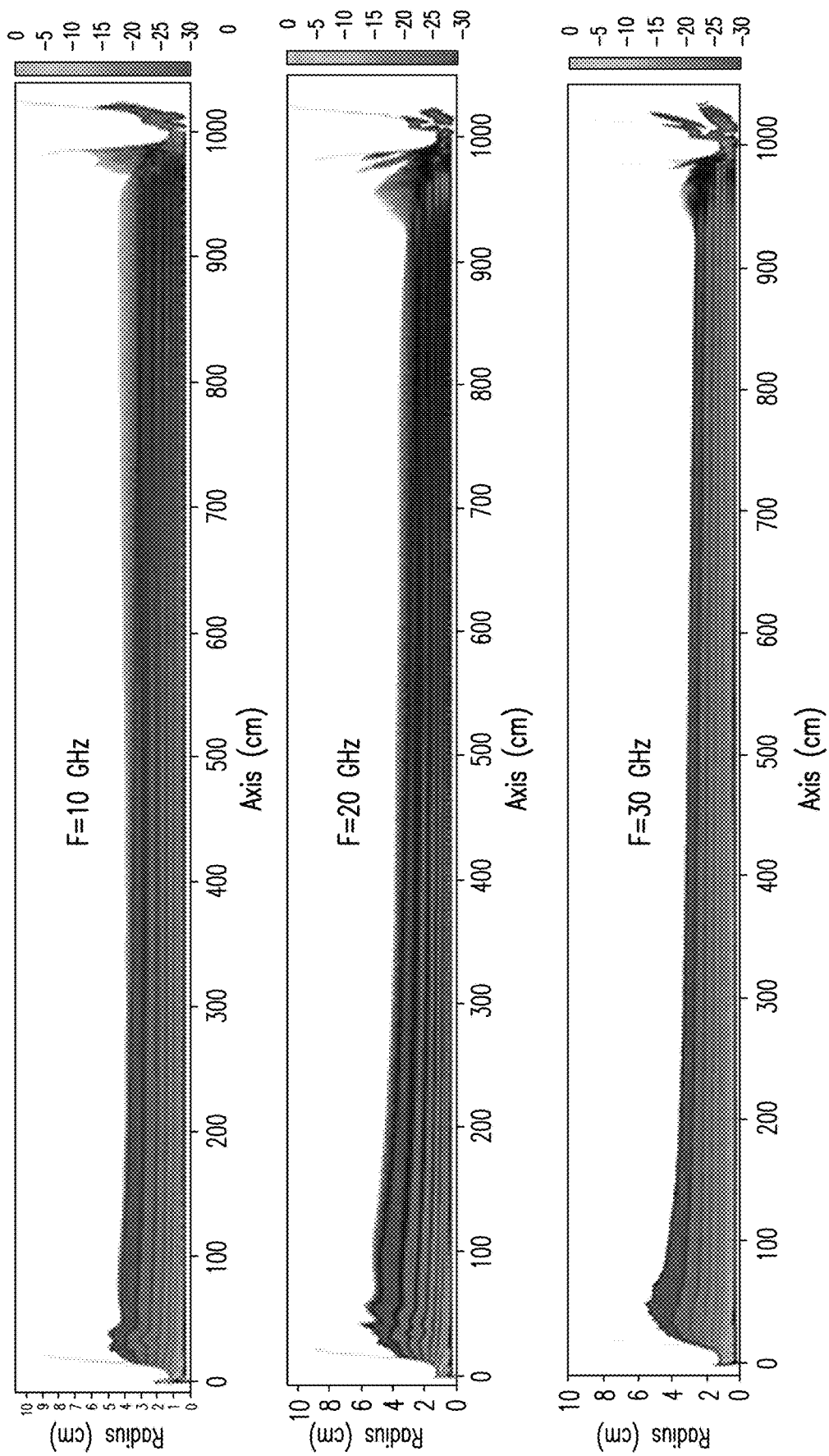

We have evaluated the transmission for the horn and wire geometry using the EFIE with perfect conductors. The metallic surfaces are modeled with a triangular mesh on which a basis set representing the unknown surface currents is placed. An example for a generated mesh is shown in FIG. 7H, which shows the horns and conducting wire connecting the two. For the receiving horn a second horn is used to act as a terminating load. This was necessary as a sudden termination of the inner conductor on the small diameter end of the receiving horn would result in a reflection of the power back into the horn and affect the transmission calculation. Numerical experiments showed this free space "load" has a power reflection of less than 1%.

Example calculations showing field intensity of the radial electric field for the horn and wire transmission are presented in FIG. 7I. The field pattern generated by the horn does not match the guided wire mode exactly so the transverse field profile changes over the first 100-200 cm as the non-guided field components radiate away from the wire. After this point the transverse field profile is constant but reducing in amplitude as part of the field diffracts away from the wire. At the receiving end of the horn there is a reflection as the guided mode profile does not match the horn aperture field that would couple to a TEM coax waveguide mode. This can be seen by the abrupt change in the transverse field profile and the standing wave pattern (due to the reflected field) in the vicinity of the receiving horn.

An estimate for the coupling of the coaxial waveguide TEM mode to the guided wire mode, and the propagation loss of that mode, can be obtained by calculation of the power flow (integration of E×H* on a plane transverse to the wire direction) versus distance with an integration radius of the horn radius. The result for this calculation performed for the 20 GHz simulation is shown in FIG. 7J (a). The power flow drops rapidly (due to diffracted power propagating beyond the radius of integration for the power flow) for the first 200 cm at which point the decay rate decreases significantly indicating a field propagating along the wire with diffraction losses. An estimate for that loss can be obtained from the slope of the decay which for this case is 0.3 dB/m. The loss estimate for coupling of the coaxial TEM mode to the guided wire mode is obtained by the ratio of power at the horn aperture to the point where the power decay is approximately linear and is 3.3 dB. This loss is very close to the 3 dB estimate obtained using the MM solution with the assumption that the coupling loss is equal to the fractional power in the TEM coax waveguide mode. What appears to be a rapid decay of the power flow at the wire end is due to the power reflected at the receiving horn subtracting from the forward power flow in the integration of E×H*. This reflected power rapidly diffracts outside of the region of integration for the power flow so only impacts the forward power flow calculation over approximately the last 100 cm.

The effect of the actual six strand configuration used for the wire in the measurement was examined by generation of a mesh with a surface defined as $R(\phi,z) = Ro + dr \, Sin(Np/2 \, (\phi + 2\pi z/pitch))^2$ where Np is the number of strands (FIG. 7J (b)). The calculation at 20 GHz was repeated using this model for the six-strand case and the results were essentially unchanged (see "Six Strand Wire" plot on FIG. 7J (a)). A plot of the transverse field for this case is shown in FIG. 7J (c) which shows field enhancement on the outer radii of the six strands.

Table 3 compares the transmission estimates for the MM and EFIE calculations over a frequency range from 5 to 30 GHz. It is observed for the horn only calculations (EFIE calculations were done with only the horn to reduce computation time) that there is relatively good agreement between the two approaches. This suggests that MM method (with the inclusion of a model which accounts for propagation loss along the wire length) can be used as a way to obtain rapid estimates for transmission loss over wide ranges of frequency and wire configurations (length, dry, wet, sag, etc.).

TABLE 3

Comparison of transmission loss estimates for MM and EFIE calculation methods.

| | Transmission Loss (dB) | | |
|---|---|---|---|
| Freq (GHz) | MM Horn and coax feed | MM Horn only | EFIE Horn only |
| 5 | −5.4 | −3.5 | −5 |
| 10 | −5.7 | −5.2 | −4.9 |
| 15 | −6.4 | −5.2 | −5.5 |
| 20 | −7.6 | −6.4 | −8 |
| 30 | −6.8 | −6.7 | −7.6 |

Bessel-Gauss Modes

Figure 7L:
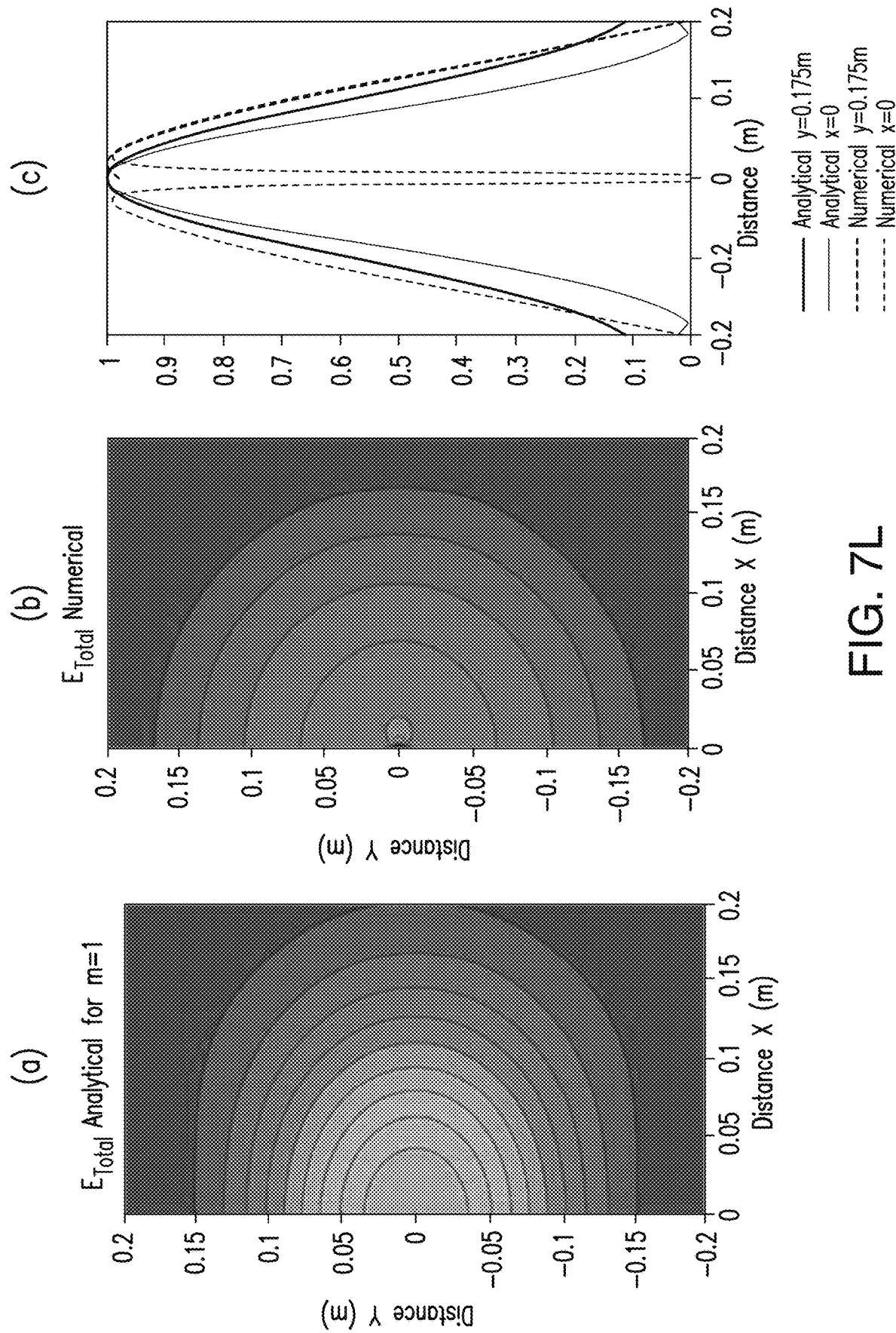
FIG. 7L is a graphical diagram illustrating, an example, non-limiting embodiment of (a) analytical fields for an m=1 Bessel-Gauss beam with no wire compared to the (b) numerical Bessel-Gauss-like $TM_1$ mode for 25 GHz with a 5 mm radius wire and no water, and (c) E-field magnitude on two lineouts for the analytical and numerical result in accordance with various aspects described herein.

From simulations for the fundamental $TM_0$ mode, it was observed that propagation losses are dominated by absorption due to the presence of the water film. These losses are high and increase dramatically with frequency, as shown in FIG. 7K, rendering operation above 10 GHz challenging. It was not observed that radiation losses or mode conversion to be a dominant loss. It was noted that, due to the high dielectric constant, a uniform thickness of water coating the wire does alter the field profile of a mode especially at higher frequency. In large scale simulations, problems were not observed with mode conversion due the shape of the wire for the fundamental $TM_0$ mode; however, for higher order modes this may be a concern. In order to decrease absorption losses in the water film the relative power density on the surface of the wire must be reduced. Additionally, non-azimuthally symmetric field distributions may prove advantageous to limit the impact of water beads on the surface. Given these conditions, the candidate modes could be simulated using the following constraints:

Decrease the field intensity on the wire relative to the power flow;
Pursue non-azimuthally uniform modes;
Limit the transverse extent of the mode to 0.2 m for practical implementation;
Seek modes that would be less sensitive to bends on the wire—these modes would show some response to the presence of water on the wire;
Balance absorption loss with guidance.

a) Bessel-Gauss-like $TM_1$ mode at 25 GHz. The most extensive modeling that was performed on the Bessel-Gauss-like $TM_1$ mode at 25 GHz. A significant amount of focus was placed on this frequency range for two reasons. First, the losses on the $TM_0$ mode at 25 GHz are extreme, >−2 dB/m, allowing testing in a challenging environment to demonstrate its efficacy. Second, simulations and analysis of an approach that was successful at this frequency would allow significant amounts of benchmarking and validation prior to extending this approach higher in frequency where computational constraints are dramatically increased.

b) Key Attributes of the Bessel-Gauss-like $TM_1$ mode at 25 GHz. The Bessel-Gauss-like $TM_1$ mode at 25 GHz meets many of the criteria that we set forth for providing a practical solution to the challenge of low-loss propagation on a single conductor wire with a water coating. The key attributes of this mode are:

Decreased field intensity around the wire relative to overall power flow—required to avoid extreme loss at high frequency;
Finite transverse extent with fields tapering off by 0.2 m addresses the practical limit to the transverse extent of launchers;
Not azimuthally uniform—required for water beading.

c) Analytical and Numerical Definition of the Bessel-Gauss-like $TM_1$. While the complete field distribution can only be described numerically or as a superposition of modes, the fields of the Bessel-Gauss-like $TM_1$ can be approximately described by a single Bessel-Gauss beam. In FIG. 7L the plot of the Bessel-Gauss beam most closely resembles the Bessel-Gauss-like $TM_1$. The fields for the Bessel-Gauss beam are plotted for the m=1 mode with $\omega_o=12.5\lambda$ where $\lambda=c/f$ and the frequency is 25 GHz. This mode is linearly polarized in the $\hat{x}$ direction for FIG. 7L (see, for example, Hall, Dennis G. "Vector-beam solutions of Maxwell's wave equation." *Optics letters* 21.1 (1996): 9-11).

Figure 7M:
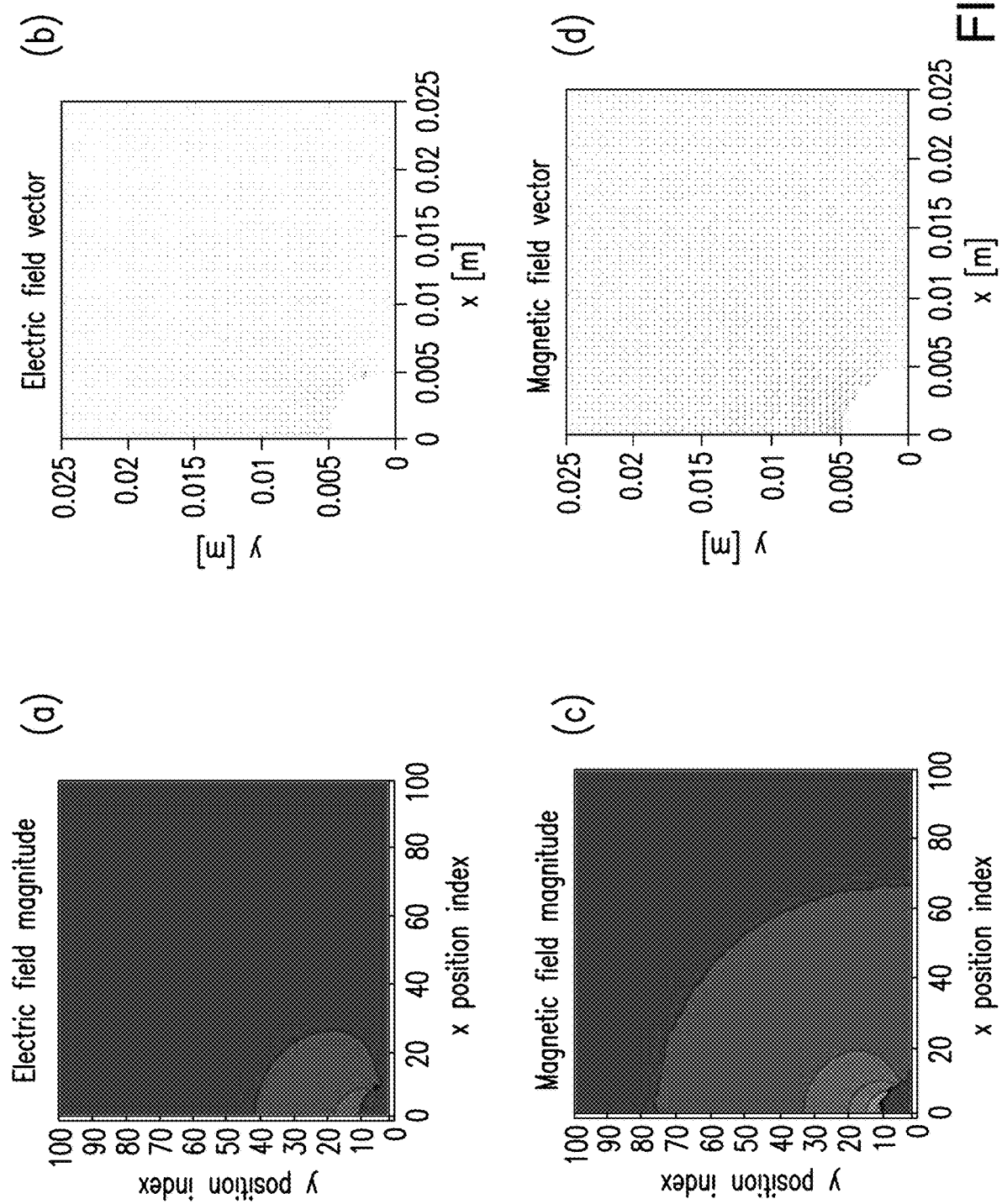
FIG. 7M is a graphical diagram illustrating, an example, non-limiting embodiment of field distributions for the Bessel-Gauss-like TM1 with a 0.1 mm water layer showing the (a) magnitude and (b) vector plot of the electric field, and the (c) magnitude and (d) vector plot of the electric field in accordance with various aspects described herein.

To provide a complete description of the electromagnetic fields for the Bessel-Gauss-like $TM_1$ we will provide the numerical values for E and H on a transverse plane derived from the numerical solution. These fields are used for the plots shown in FIG. 7M. This mode is linearly polarized in the y direction for FIG. 7L.

d) Excitation of the Bessel-Gauss-like $TM_1$. The excitation of the Bessel-Gauss-like $TM_1$ for electromagnetic simulations can be accomplished with a variety of approaches. The fields can be solved for with an eigenmode solver, the fields can be excited with a waveport, or the fields can be excited with a mode converter. Here we present details of those three approaches.

i) Eigenmode Simulations. Solving for the field distribution of this mode can be performed with eigenmode simulations from commercial electromagnetic solvers (e.g., HFSS is used for our simulations, or Computer Simulation Technology—CST's simulation tools, which are referred herein as CST). The setup of an eigenmode simulation will require a few key steps that are described here assuming the wire length is in the $\hat{z}$ direction, see FIG. 7N. To begin, it is recommended to use a ¼ symmetric solution to minimize the size of the mesh and number of modes. Define four concentric cylindrical sections with a longitudinal thickness $\Delta z=2$ mm and for each subsequent section a radial extent: wire $\Delta r=5$ mm, thin film layer $\Delta r=0.1$ mm, air $\Delta r=199.9$ mm, PML $\Delta r>5$ mm. Assign a finite conductivity boundary condition to the wire surface.

Assign the appropriate dielectric constant to the thin film layer whether water or air. On the two sets of surfaces in the x-y plane assign a master/slave boundary condition with a phase advance $\Delta\varphi=62°$. This phase advance forces a traveling wave solution. Apply a perfect-E boundary on the x-z plane and a perfect-H boundary on the y-z plane. These symmetry boundary conditions are required for the linearly polarized solution in ¼ symmetry. Note that the boundary conditions for both the Master/Slave and the symmetry planes should extend on the PML. This will result in an eigenmode solution at approximately 25.8 GHz for the Bessel-Gauss-like $TM_1$. It is recommended that this procedure be applied first to solving the $TM_0$ mode to verify the efficacy of the model. For the $TM_0$ mode two changes will be required, first the perfect-E boundary should be replaced with a perfect-H boundary and second the phase advance $\Delta\varphi$ may differ slightly.

Figure 7N:
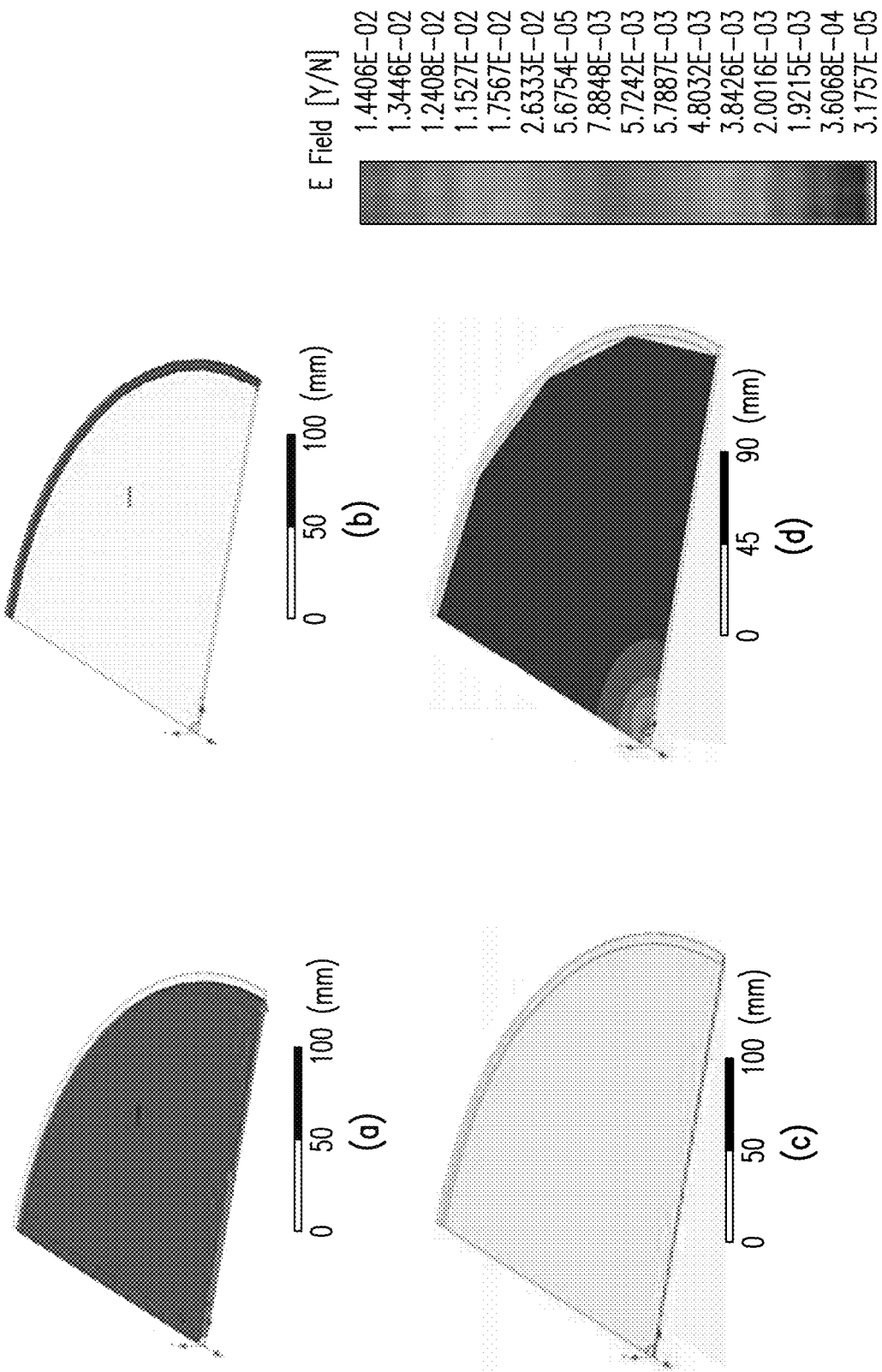
FIG. 7N is a graphical diagram illustrating, an example, non-limiting embodiment of views showing the simulation volume and boundary conditions required for periodic excitation. (a) Master/Slave boundary highlighted for the main simulation volume. (b) Master/Slave boundary highlighted for the PML volume. (c) Perfect H boundary highlighted. (d) Magnitude of the electric field plotted for the $TM_1$ mode at 25 GHz with a 0.1 mm water layer in accordance with various aspects described herein.

Reproducing this simulation in CST will require the activation of the nonlinear eigensolver and the use of open boundaries where a PML is shown in FIG. 7N.

ii) Waveport Excitation for Frequency or Time-Domain Simulations. For electromagnetic simulations in frequency or time domain, external mode excitation can be realized using ports at surface boundaries of a computational domain. The modes are solved as a 2-dimensional eigenvalue problem, which calculates the cutoff frequency of the propagating modes from the eigenvalues, and, the electric and magnetic fields from the eigenvectors. The eigenmodes are loaded at a port to enable excitation into the computational domain as well as to allow non-reflected termination of electromagnetic fields propagating out of the computational domain. Typical 2-dimensional eigensolvers for waveports can solve for modes without losses at the boundaries, such as TEM, TE and TM modes propagating in waveguides. For example, they do not solve for modes with lossy boundary conditions, for example, absorbing boundary condition (ABC) and impedance boundary condition.

Figure 7O:
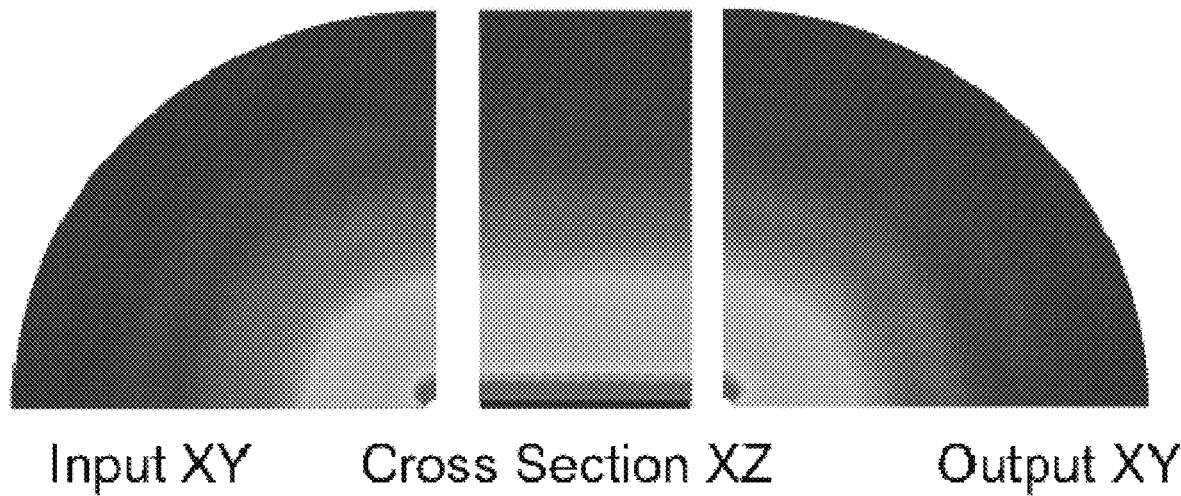
FIG. 7O is a graphical diagram illustrating, an example, non-limiting embodiment of electric field distribution from an exemplary S3P simulation for the $TM_1$ mode. The lack of intensity fringes along the z-direction in the XZ plane indicates a very low reflection coefficient at the boundaries. Note the nearly identical field distribution at the input and output XY plans in accordance with various aspects described herein.

The Sommerfeld $TM_0$, Bessel-Gauss-like $TM_1$ and Bessel-Gauss-like $TM_{11}$ modes used for this illustrative investigation are free-space modes that are not confined as typical modes in waveguides. The field distributions of these modes cannot be obtained by ACE3P's 2-dimensional eigensolver that are required as sources of external excitations. However, ACE3P provides a capability to read in the transverse electric and magnetic field components of these modes obtained by other means, either analytically or numerically. The resulting field map acts as the excitation source in a similar manner as the numerical solution obtained by ACE3P for waveguide modes, and also respects the lossy boundary conditions that are imposed in the actual simulation. Therefore, in our simulation tools (ACE3P T3P/S3P) we can define a field distribution for a waveport and use it to excite a driven modal simulation in frequency or time domain. We export the fields from eigenmode simulations and use those to drive the excitation in our simulations. A frequency domain example is shown in FIG. 7O.

In accordance with CST, the Bessel-Gauss-like $TM_1$ mode may be excited using a "near-field source" (term used by CST) to reproduce the same effect. This near-field source in CST is based on the equivalence principle allowing for the fields on an enclosed surface to represent a source inside of that volume. By importing the fields solved from the eigenmode solver we can excite a system with an equivalent "$TM_1$ waveport".

iii) Excitation with a Mode Converter. The Bessel-Gauss-like $TM_1$ can be excited in a full-wave electromagnetic solver code with a waveport coupled to a mode converter or horn. Optimized (bandwidth, efficiency, compactness, robustness multi-mode operation, etc.) simulations can be performed to design these sources. An example design approach is described below for simulations. An effective method to convert a $TE_{11}$ coaxial mode into a desired Bessel-Gaussian beam mode is to use a circular horn with a non-linear taper (see FIG. 7P1A(c) and FIGS. 7P1B-7P1F). The taper profile is generated by computer optimization to produce a mode mixture (TE11, TM11, TE12) through mode conversion, which can approximate the Bessel-Gaussian beam profile at the horn aperture. The optimization goal function to maximize in the computer optimization of the taper profile is given by $$\Sigma_n a_n \int \vec{E}_{oo}(r,\varphi) \cdot \underline{E}_n ds$$

where $E_{oo}$ is the desired Bessel-Gaussian electric field profile and $E_n$ are the orthonormalized waveguide mode functions of amplitudes $a_n$ at end of the non-linear taper. We have implemented this approach for a taper design using the mode-matching method to calculate the $a_n$ modal amplitude coefficients, shown in FIG. 7P1A.

It will be appreciated that the embodiments of FIG. 7P1A can be adapted according to other embodiments. For example, in the illustration of FIG. 7P1B a tapered dielectric coating can be disposed on a transmission medium (e.g., a wire) to ease a transition of electromagnetic waves from the transmission medium to the coupler and vice-versa. This coating can reduce the transverse extent of a wave mode. The coating can be located inside and/or outside of a coupler (see, for example, horn of 7P1A (c)). The coating taper profile can be adapted both longitudinally and azimuthally to improve coupling of electromagnetic waves between a coupler and the transmission medium. The taper can also consist of multiple layers of dielectric material. FIG. 7P1C depicts coupler geometry profiles for excitation of a $TM_1$ at 5 GHz and 12.5 GHz, respectively, about a 5 mm wire. FIG. 7P1D depicts a simulation performance of the coupler of FIG. 7P1C at 5 GHz. FIG. 7P1E depicts a simulation performance of the coupler of FIG. 7P1C at 12.5 GHz. FIG. 7P1F depicts a coupler with a non-uniform inner dimension. In this illustration, an inner surface of the coupler does not have a constant radius. An inner volume of the coupler can be adapted with a dielectric material constructed from a dielectric layer or multiple dielectrics/layers. The inner volume of the coupler may also consist of multiple longitudinal segments of dielectrics and/or metals.

FIG. 7P2 is a graphical diagram illustrating, an example, non-limiting embodiment of a desired beam structure of an electromagnetic wave centered about a wire in accordance with various aspects described herein. The coupler shown in FIG. 7P1A (c) (or in FIGS. 7P1B-7P1F) can be constructed with an aperture 702 that is of a sufficient diameter ($2A_0$) to produce a desired depth of focus 704 that enables the formation of a Bessel-shaped electromagnetic wave 706 that can propagate along a wire 708 (or other physical transmission medium that enables guidance of such a wave). The larger the depth of focus 704 the greater the intensity or concentration of the electromagnetic fields of the Bessel-shaped electromagnetic wave, which in turn reduces diffraction (or leakage) of the electromagnetic wave as it propagates along the wire 708 (or other physical structure). Diffraction in the present context represents leakage of electromagnetic energy associated with an electromagnetic wave into free space.

FIG. 7P3 is a graphical diagram illustrating, an example, non-limiting embodiment of a front-view of an aperture of a coupler 710 in accordance with various aspects described herein. The coupler 710 of FIG. 7P3 represents an alternative embodiment to the non-linear profile of the coupler illustrated in FIG. 7P1A(c) and FIGS. 7P1B-7P1F. In one embodiment, the aperture of the coupler 710 can be constructed of a dielectric material (e.g., nylon, Teflon®, polyethylene, a polyamide, or other plastics). In other embodiments, the aperture of the coupler 710 can be constructed of conducting traces, absorbing bands, or other materials that can modify an incoming electromagnetic wave entering the coupler 710 from the backside 714 as illustrated in FIG. 7P4. It will be appreciated in other embodiments that the aperture of the coupler 710 can be constructed from combinations of the foregoing materials and/or other materials described by the subject disclosure. The material of the coupler 710 can be configured as concentric rings (712A through 712D) having different frontal widths defined by a plurality of radii (see FIG. 7P3) and longitudinal depths (see FIG. 7P4), which can configure the phases, amplitude, wavelength, and/or focus of the electromagnetic waves generated by each ring. For example, in an embodiment where the coupler 710 is constructed of a dielectric material, when an electromagnetic wave is supplied to the backside 714 of the aperture of the coupler 710, the variable depths (see FIG. 7P4) of the concentric rings (712A through 712D) can produce electromagnetic waves of differing phases. For instance, the electromagnetic wave produced by ring 712A experiences less delay than the wave produced by ring 712B, while the wave produced by ring 712B experience less delay than the wave produced by ring 712C, and so on. In this fashion, rings 712A through 712E collectively produce electromagnetic waves of differing phases.

It will be appreciated that in embodiments where one or more rings (712A through 712D) of the coupler 710 is constructed of a conducting or absorbing material that the electromagnetic wave supplied to the backside 714 of the coupler 710 can produce at the aperture of the coupler 710 electromagnetic waves of differing amplitudes depending on the conductive and/or absorbent properties of the rings. It will be further appreciated that combinations of dielectric material and conducting or absorbing materials can be used to cause an electromagnetic wave supplied to the backside 714 of the coupler 710 to produce at the aperture of the coupler 710 electromagnetic waves of differing amplitudes, phases, and/or wavelengths depending on the conductive and/or absorbent properties of the rings. The electromagnetic waves produced at the aperture of the coupler 170 can combine to produce differing wave modes that in combination result in a Bessel-like electromagnetic field structure.

The front view of the aperture of coupler 710 (see FIG. 7P3) illustrates rings that are configured with different frontal widths, which can be defined by one or more radii. For example, the frontal width of ring 712E can be defined by a first radius that extends to the outer edge of the wire 708, and a second radius that extends to the outer edge of ring 712E. Similarly, the frontal width of ring 712D can be defined by a first radius that extends to the outer edge of ring 712E, and a second radius that extends to the outer edge of ring 712D. This same approach applies to determining the frontal widths of rings 712A-712C. The configuration of the variable frontal widths of the rings 712A-712E enables focusing of the electromagnetic waves in a longitudinal direction of the wire 708. The electromagnetic waves of differing phases can produce a mixture of wave modes that combine into a resulting electromagnetic wave having a desired depth of focus that produces a Bessel-like electromagnetic field structure. The Bessel-like field structure reduces the diffraction (leakage) of the resulting electromagnetic wave as it propagates along the wire 708.

It will be appreciated that the aperture shown in FIGS. 7P3 and 7P4 can be combined with the coupler of FIG. 7P1A (c) and FIGS. 7P1B-7P1F. Alternatively, the aperture shown in FIGS. 7P3 and 7P4 can be used with a tapered horn (not shown) having linear (metallic and/or dielectric) surfaces. It will be further appreciated that aperture shown in FIGS. 7P3 and 7P4 can be combined with other waveguide structures in order to enable the generation of Bessel-like electromagnetic waves that reduce diffraction of the wave as it propagates along a wire (or other physical transmission medium).

It will be further appreciated that the shape of the aperture of the coupler 710 shown in FIGS. 7P3 and 7P4 can be modified in whole or in part into other structural configurations that produce Bessel-like electromagnetic waves. For example, the edges of rings 712A through 712E can be curved or beveled to reduce sharp edges that can cause undesired radiation and/or undesirable wave modes. In another embodiment, the rings 712A-712E can be reconfigured to collectively form an aperture having a conical shape. In yet another embodiment, the backside 714 of the aperture of coupler 710 in whole or in part can be configured with one or more curved surfaces (e.g., convex or concave surface(s)) to configure the phases and focus of the electromagnetic waves generated by one or more rings 712A-712E.

It will be appreciated that the foregoing embodiments can be combined in whole or in part to configure a coupler 710 that produces electromagnetic waves having a Bessel-like field structure that reduces the diffraction (leakage) of the resulting electromagnetic wave as it propagates along the wire 708. It will be further appreciated that, singly or in combination, one or more of the embodiments of the coupler described above can be configured to produce an electromagnetic wave having a transverse electromagnetic field configuration with a first portion that has a field intensity greater than a second portion of the electromagnetic field configuration. In this embodiment, the first portion of the electromagnetic field configuration is positioned away from an outer surface of the transmission medium (e.g., wire), while the second portion of the electromagnetic field configuration is lightly bound to the outer surface of the transmission medium to enable guidance of the electromagnetic wave along the transmission medium. Having the first portion of the electromagnetic field configuration (which has the higher field intensity) positioned away from the outer surface of the transmission medium helps to substantially reduce a propagation loss experienced by the electromagnetic wave when the transmission medium is subject to an obstruction (e.g., water film, water droplets, etc.) located on the outer surface of the transmission medium.

FIG. 7P5 illustrates a flow diagram of an example, non-limiting embodiment of a method 720 in accordance with various aspects described herein. Method 720 can begin at step 722 where a transmitter (e.g., one or more antennas) generates a signal (e.g., an electromagnetic wave). The signal can be configured to convey data (e.g., voice, internet traffic, streaming video, etc.). At step 724, a coupler such as described in the subject disclosure (e.g., see FIGS. 7P1A-7P1F and 7P2-7P4), can be configured to convert the signal into a plurality of wave modes that combine at step 726 into an electromagnetic wave having an electromagnetic field configuration that reduces diffraction (leakage) of the electromagnetic wave as it propagates and is guided at step 728 by a transmission medium (e.g., a wire). In certain embodiments, the conversion can be performed by a circular horn having a non-linear profile that transforms the signal into the plurality of wave modes.

The non-linear transformation can be performed by, for example, a coupler having a non-linear structural profile as illustrated by the horn of FIG. 7P1A (c). Alternatively, an aperture such as shown in FIGS. 7P3-7P4 can be used to generate a plurality of focused electromagnetic waves of varying phases with a depth of focus that increases a concentration of electromagnetic fields of the electromagnetic wave, and thereby reduces a diffraction of the electromagnetic wave as it propagates along the transmission medium. The aforementioned transmitter and coupler can be part of a waveguide system that includes a processing system with at least one processor, and a power supply (e.g., an inductive power supply that inductively obtains power from a wire) to power the components of the waveguide system.

In other embodiments, the aforementioned waveguide system can be configured to produce common electromagnetic waves (e.g., TM00 wave), which nonetheless, under favorable environmental conditions (e.g., a dry wire), can propagate long distances on a physical transmission medium such as a (bare or insulated) wire. When, for example, the environment becomes untenable for such waves to propagate long distances (e.g., water accumulation on a wire), the waveguide system can be configured to detect at step 721 an interference that causes undesirable propagation losses of the diffracting electromagnetic wave. Such detection can be performed by receiving information from a recipient waveguide system indicating signal degradation, exchanging test waves between pairs of waveguide systems coupled to the same span of a wire, measuring atmospheric conditions at a transmitting waveguide system, or other suitable techniques. When such degradation is detected, a transmitting waveguide system can be configured to transition from transmitting diffracting electromagnetic waves to electromagnetic waves having an electromagnetic field structure that reduces diffraction (or leakage) as described by steps 722 through 728, and whose field structure concentrates at least a majority of its energy away from the obstruction causing the propagation losses.

Method 720 can be further adapted to receive at step 732 electromagnetic waves configured with an electromagnetic field structure that reduces diffraction (or leakage) as described by steps 722 through 728. The electromagnetic waves can be received by the same or similar coupler described by the subject disclosure (e.g., couplers of FIGS. 7P1A-7P1F and 7P2-7P4). At step 734, the electromagnetic waves can be converted by the coupler into a signal that conveys data, which can be extracted by a receiver at step 736. Pairs of waveguides that transmit or receive electromagnetic waves as described by method 720 can be configured with circuitry such as shown in FIG. 4. The circuitry of FIG. 4 can be further configured to also perform modulation and demodulation of signals as may be required.

While for purposes of simplicity of explanation, the respective processes are shown and described as a series of blocks in FIG. 7P5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

e) Measurement of Guidance on Curved Wires. When initially identifying candidate modes, simulations are performed with straight wires to take advantage of symmetry whether in eigenmode simulations with periodic boundary conditions or in driven modal frequency/time domain where we can utilize fourfold symmetry. These simulations demonstrate guidance in the presence of a wire for the Bessel-Gauss-like $TM_1$ mode as we do not observe the modification of the transverse profile of the beam.

The principal concern for the accuracy of these simulations is the impact of the absorbing boundary layer placed on the surface defined by the fixed radius terminating the simulation domain. Extensive testing was performed for validating these surfaces with various lengths and simulation domains. When performing simulations with both the time and frequency domain solvers and no wire we observe a divergence that matches the analytical prediction for a Bessel-Gauss beam, as shown in FIG. 7Q. This provides confirmation that our simulations are accurate.

When we are performing simulations with curved wires we utilize the time domain solver in T3P because the curvature is very weak, requiring a significant length for an effect to be observed. Initial benchmarking of these simulations was performed with the Sommerfeld mode, and we see strong guidance without mode conversion (i.e., the normalized transverse field profile is constant).

The Bessel-Gauss-like TM modes that we have identified—which are a superposition of guided modes—will inherently be more sensitive to the curvature of the wire, due to the weaker currents on the surface of the wire relative to the power propagating in the mode. A lack of guidance or a divergence in the power density of the beam in our simulations would result in two effects: (i) a change in the transverse profile of the beam or mode conversion, and (ii) loss due to absorption at the radial boundaries.

Figure 7S:
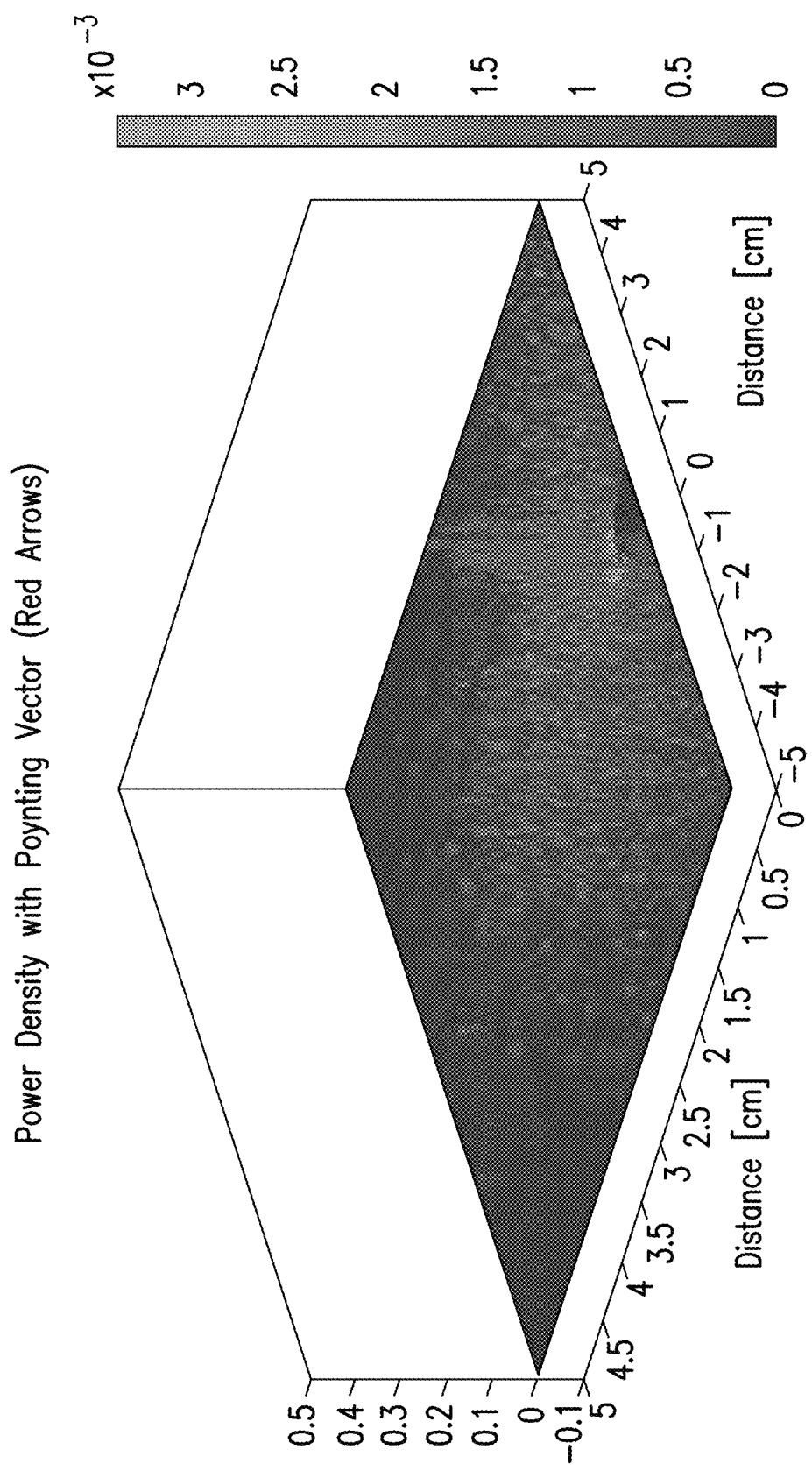
FIG. 7S is a graphical diagram illustrating, an example, non-limiting embodiment located on the left of a power denisty plot on the XY plane at 19.2 m for a 25 GHz, r=0.5 cm wire, t=0.1 mm water film, $TM_1$ mode simulation in T3P with red arrows showing the local Poynting vector (E×H) in accordance with various aspects described herein.
Figure 7T:
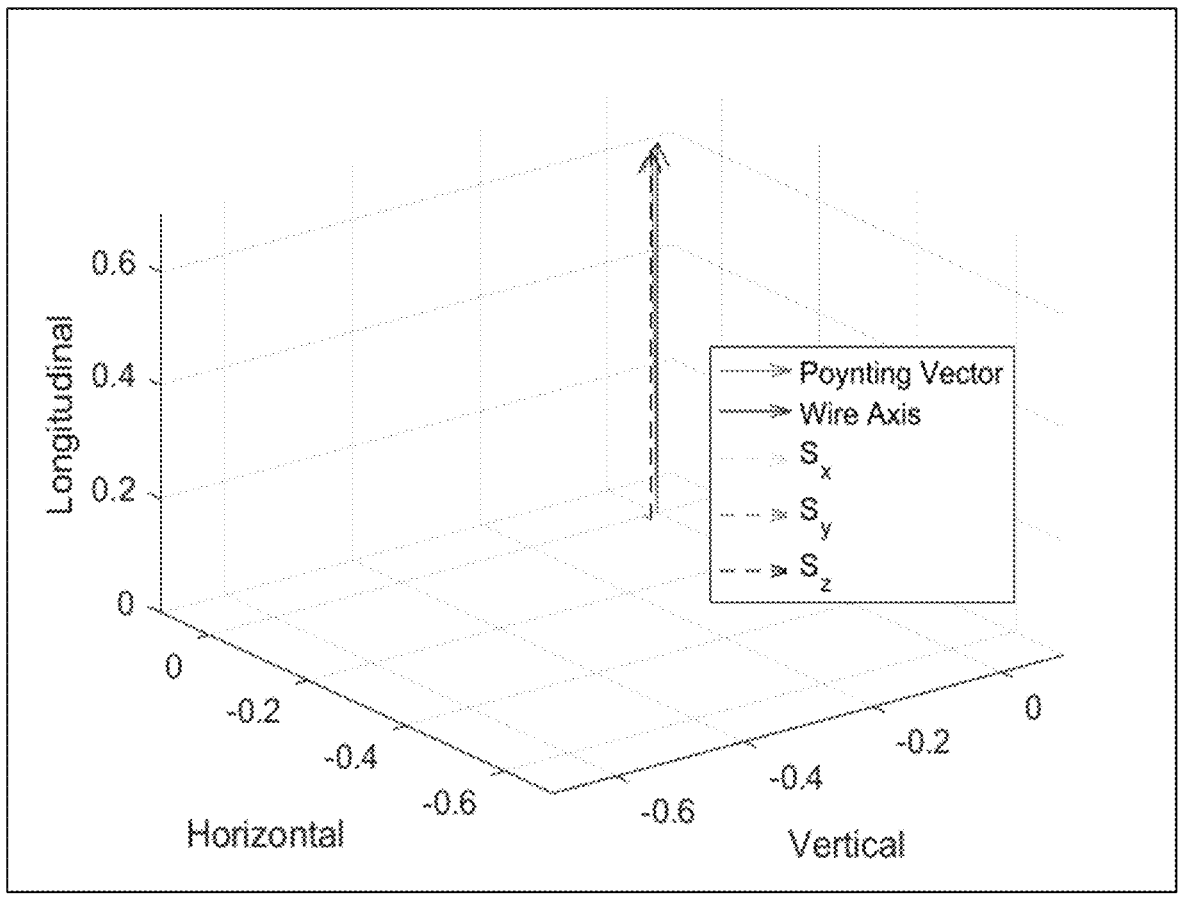
FIG. 7T is a graphical diagram illustrating, an example, non-limiting embodiment of an integrated Poynting vector (red) compared to a wire axis (blue) at 19.2 m for a 25 GHz, r=0.5 cm wire, t=0.1 mm water film, $TM_1$ mode simulation in accordance with various aspects described herein.

To confirm guidance, we can look at the transverse field profile as it propagates and also calculate the power flow with the Poynting vector. By exporting the electric and magnetic field at a transverse plane (X-Y) with respect to the direction of the wire (i.e., setting $\hat{z}$ along the cylindrical axis of the wire) we can observe both the transverse field profile for evidence of mode conversion, as well as calculate the Poynting vector to observe the direction of power-flow. For the $TM_1$ mode at 25 GHz we have performed simulations that extend 20 m with a transverse displacement in the wire of >0.5 m, and we confirm low-loss ~−0.2 dB/m, no mode conversion (FIG. 7R), and that the power flow both in aggregate (FIG. 7T) and locally (FIG. 7S) remains parallel to the direction of the wire $\hat{z}$. It is worth noting that the transverse offset is larger than the initial transverse extent of the simulation of 0.4 m.

f) Loss Calculations i) Eigenmode simulations. For eigenmode simulations we are calculating the fields in a periodic domain with a forced set of boundary conditions. For our simulations we utilize the $\hat{z}$ as the axis for the wire. The forced phase advance is between two x-y surfaces separated by a sub-wavelength distance $\Delta z$. To calculate the loss per unit length we begin integrating the Poynting vector over the transverse x-y plane to determine the power flowing in $\hat{z}$ for the mode, $P_z$. As a second step we integrate the power dissipated on the conducting surface of the wire ($I^2R$ losses). As a third step we integrate the volumetric losses (tan $\delta$). This includes the dielectric layer of water on the surface of the wire and the PML boundary layer. The combined surface and volumetric losses correspond to the total dissipated power $P_{disp}$ in the differential element $\Delta z$. To calculate the loss per meter we set $e^{-\alpha \Delta z}=(1-Pdisp/Pz)$ and solving for $\alpha=-\ln(1-Pdisp/Pz)/\Delta z$ [Np/m].

ii) Frequency Domain Driven Modal Simulations. The external field defined by its transverse distribution at a specific frequency is loaded at both the input and output ports. S3P is used for the S-Parameter calculation including $S_{00}$, $S_{11}$, $S_{01}(=S_{10})$, which are the reflection coefficients at the input and output ports, and the transmission coefficient from the input to output ports. The wire insertion loss is calculated through the S-parameters by $P_{loss}=10*\log(S_{01}*S_{01}/(1-S_{00}*S_{00}))$ to exclude the reflection loss at the ports.

iii) Time Domain Simulations. The external field is excited at the input port in a Gaussian pulse shape, which is defined by its mean frequency and bandwidth. The external field is determined by its transverse distribution at the mean frequency. T3P can simulate the mode power propagation along the wire system. The power $P_{in}$ and $P_{out}$ at the input and output ports, respectively, are calculated at each time step. An absorbing boundary condition is set at the downstream output port to terminate wave propagation. In addition, the reflection loss at the input port is negligible compared with the loss on a long wire system. Therefore, the wire insertion loss in T3P is calculated by $P_{loss}=10*\log(P_{out}/P_{in})$ by neglecting the reflection loss at the ports (which would only decrease the amount of loss).

Low-Loss Propagation of Guided Waves on a Wire

The guided modes on the wire can be described using a basis set of Hankel functions. In order to control the loss from propagation we aim to control the field distribution on the wire through a superposition of multiple modes—which should work well at high frequency with low dispersion—while localizing the field around the wire for good guidance. We found in our modeling that by forcing boundary conditions that require fields to go to zero beyond a given radius, we could control the field distribution and localize it to the vicinity of the wire. The fields we observed were simple to describe with a Bessel-Gauss formalism because effectively there are fewer parameters—primarily two: the Bessel index and the beam waist. (see, for example, Hall, Dennis G. "Vector-beam solutions of Maxwell's wave equation." *Optics letters* 21.1 (1996): 9-11.).

Figure 7U:
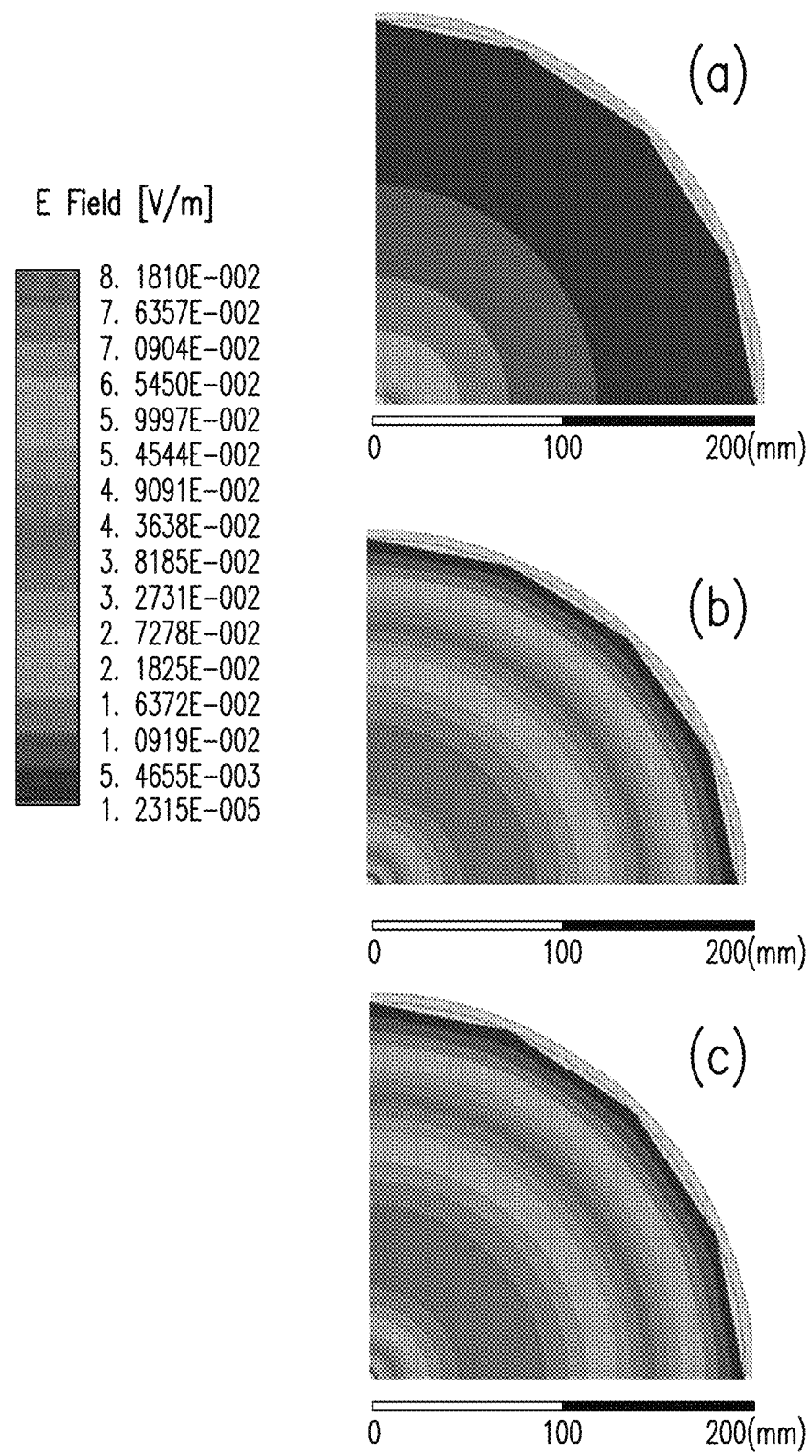
FIG. 7U is a graphical diagram illustrating, an example, non-limiting embodiment of a comparison between (a) the magnitude of the electric field in the presence of a 0.1 mm water film for the Bessel-Gauss $TM_1$ at 20 GHz, (b) $TM_{11}$ mode at 65 GHz and (c) $TM_1$ mode at 25 GHz with a 2 mm insulator in accordance with various aspects described herein.

These field distributions could also be described accurately with a sum of Bessel functions, but it would require many more parameters as many Bessel functions must be superimposed to force the fields to zero beyond a given radius. Our efforts have focused on investigating the Bessel-Gauss $TM_1$ and $TM_{11}$ mode where the first subscript indicates the order of the Bessel function and the second the number of radial variations. These two modes exemplify some clear benefits. First, the $TM_1$ mode has a non-uniform field distribution which may prove beneficial in handling the presence of water droplets on the wire. Second, the $TM_{11}$ mode has very weak fields on the wire surface, which are increased by the presence of water providing additional guidance at the cost of additional ohmic loss. This mode is weakly impacted by water allowing us to reach higher in frequency but is more sensitive to bends and mode conversion. Field patterns for the modes with water are shown below, see FIG. 7U.

a) Eigenmode Simulations—Periodic Straight Wire

Figure 7V:
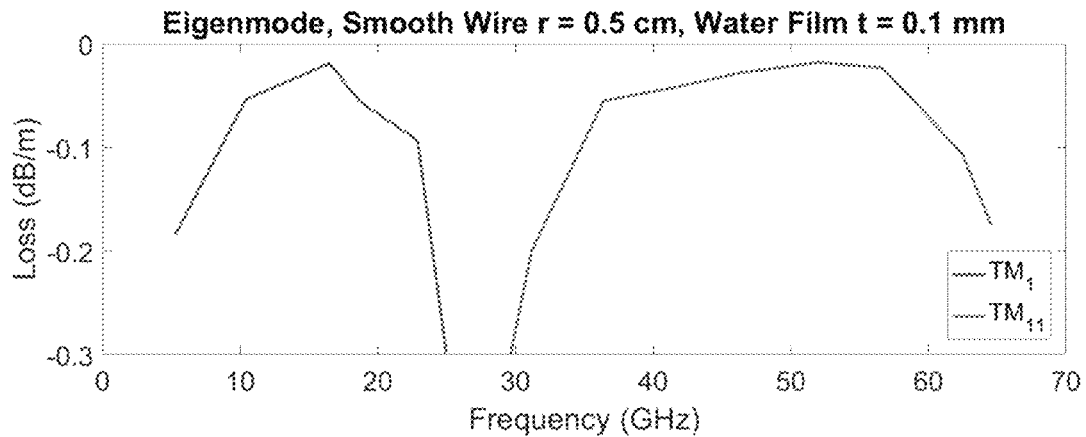
FIG. 7V is a graphical diagram illustrating, an example, non-limiting embodiment of loss as a function of frequency for the Bessel-Gauss-like $TM_1$ and $TM_{11}$ mode with a 0.1 mm water coating on a 0.5 cm radius aluminum wire in accordance with various aspects described herein.
Figure 7W:
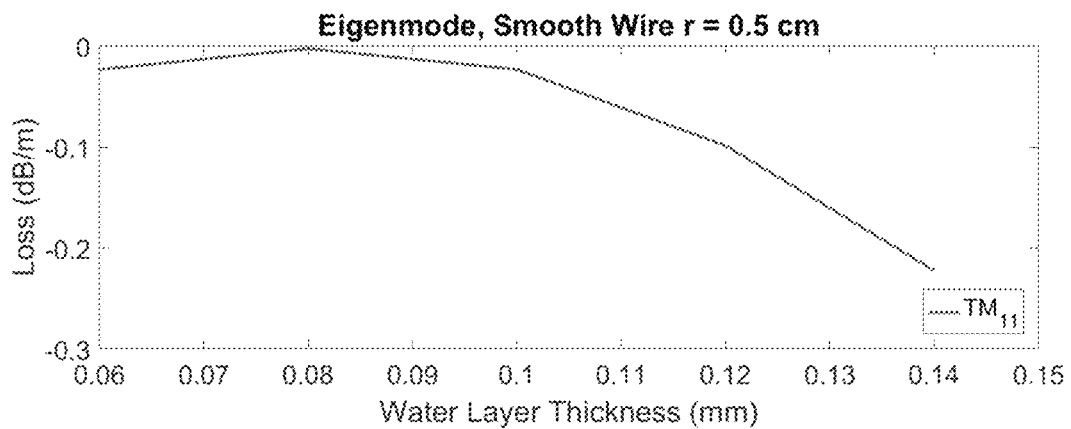
FIG. 7W is a graphical diagram illustrating, an example, non-limiting embodiment of loss as a function of water thickness for the Bessel-Gauss-like $TM_1$ mode at 57 GHz vs. water coating thickness on a 0.5 cm radius aluminum wire in accordance with various aspects described herein.
Figure 7X:
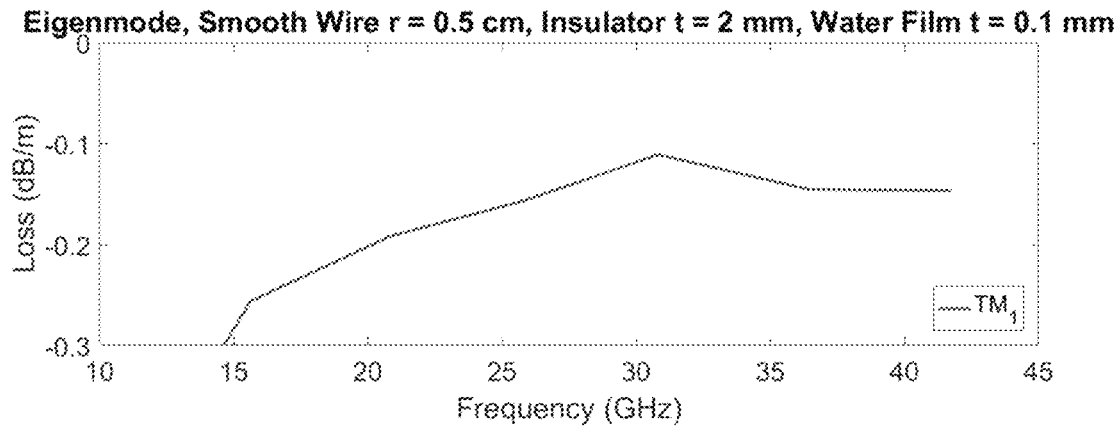
FIG. 7X is a graphical diagram illustrating, an example, non-limiting embodiment of loss as a function of frequency for the Bessel-Gauss-like $TM_{11}$ mode with a 2 mm insulator layer 0.1 mm water coating on a 0.5 cm radius aluminum wire. Dielectric constants given in Table 7 in accordance with various aspects described herein.

Initial calculations of loss for the candidate $TM_1$ and $TM_{11}$ modes were performed with the eigenmode solver over a large frequency range. These results indicate that the $TM_1$ and $TM_{11}$ solutions work well over two different frequency ranges. One from 5-25 GHz for the $TM_1$ and one from 30-65 GHz for the $TM_{11}$. Eigenmode simulations can produce very accurate results for periodic simulations, but they require extremely dense meshes. This is due to the periodic nature of the problem, where any defect (mesh quality at interface or impedance mismatch at PML) gets amplified. In FIGS. 7V, 7W and 7X we show the eigenmode simulation results for the Bessel-Gauss-like modes in the presence of a water layer for various modes, frequencies and with an insulator coating the wire. See Tables 6 and 7 for dielectric constants for water and insulator coatings.

TABLE 4

Dielectric Constant of Water vs. Frequency for Simulations.

| Freq. (GHz) | $\epsilon_r$ | $\epsilon_i$ | σ (S/m) |
|---|---|---|---|
| 5 | 73.5 | 17.7 | 4.9 |
| 10 | 63.0 | 29.6 | 16.5 |
| 15 | 50.8 | 34.4 | 28.7 |
| 20 | 40.1 | 35.4 | 39.4 |
| 25 | 31.9 | 34.5 | 48.0 |
| 30 | 26.1 | 32.6 | 54.3 |
| 35 | 22.0 | 30.3 | 58.9 |
| 40 | 19.0 | 28.2 | 62.7 |
| 45 | 16.7 | 26.3 | 65.7 |
| 50 | 15.0 | 24.5 | 68.2 |
| 55 | 13.8 | 22.9 | 70.1 |
| 60 | 12.9 | 21.4 | 71.4 |
| 65 | 12.1 | 19.9 | 72.1 |
| 70 | 11.5 | 18.7 | 72.6 |
| 75 | 10.7 | 17.6 | 73.3 |
| 80 | 9.9 | 16.7 | 74.3 |

TABLE 5

| Dielectric Constant of Wire Coating | | |
|---|---|---|
| Material | $\epsilon_r$ | Loss Tangent |
| HDPE Plastic | 2.3 | 0.0005 | b) S3P Frequency Domain Simulations—Straight Wire

To verify the loss calculations of the eigenmode simulations, we performed frequency domain simulations over straight wire sections for various modes at selected frequencies. Good agreement is observed between different approaches. An example of the simulation domain is shown in FIG. 7O. In Table 4 we present a combined summary of these results.

TABLE 6

Comparison between frequency domain simulation results for S3P and eigenmode solver for a straight wire with 0.5 cm radius.

| | | | S3P Frequency Domain | | Eigenmode |
|---|---|---|---|---|---|
| Mode | Freq. (GHz) | Notes | Length (m) | Loss (dB/m) | Loss (dB/m) |
| $TM_0$ | 5 | | 1 | −0.01 | 0.03 |
| $TM_0$ | 5 | 0.1 mm Water Film | 0.5 | −0.3 | −0.1 |
| $TM_0$ | 5 | 2 mm Insulator, 0.1 mm Water Film | 1 | −1.6 | −3.5 |
| $TM_0$ | 20 | | 0.06 | −0.1 | −0.06 |

TABLE 6-continued

Comparison between frequency domain simulation results for S3P and eigenmode solver for a straight wire with 0.5 cm radius.

| | | | S3P Frequency Domain | | Eigenmode |
|---|---|---|---|---|---|
| Mode | Freq. (GHz) | Notes | Length (m) | Loss (dB/m) | Loss (dB/m) |
| $TM_0$ | 20 | 0.1 mm Water Film | 0.06 | −1.4 | −1.1 |
| $TM_1$ | 12.5 | | 0.12 | −0.07 | −0.01 |
| $TM_1$ | 12.5 | 0.1 mm Water Film | 0.12 | −0.05 | −0.03 |
| $TM_1$ | 25 | | 0.1 | −0.04 | −0.01 |
| $TM_1$ | 25 | 0.1 mm Water Film | 0.1 | −0.4 | −0.35 |
| $TM_{11}$ | 36 | 0.1 mm Water Film | 0.016 | −0.023 | −0.055 |
| $TM_{11}$ | 57 | 0.1 mm Water Film | 0.005 | −0.028 | −0.023 |

Guided Mode Propagation Configured for Operation to Specific Geometry(ies)

Figure 7Y:
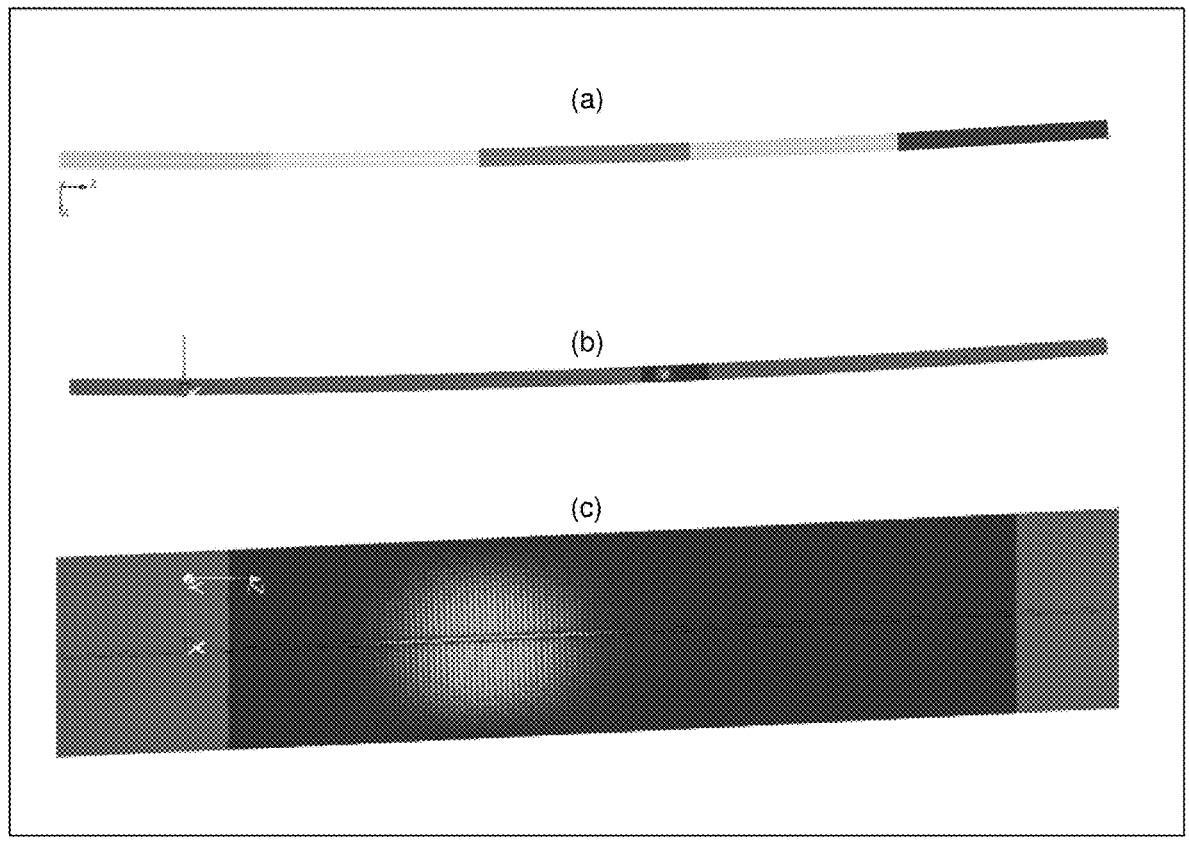
FIG. 7Y is a graphical diagram illustrating, an example, non-limiting embodiment of a 25 m simulation of the $TM_1$ mode at 12.5 GHz with showing the (a) mesh, (b) a snap shot in time of the pulse electric field magnitude and (c) a zoomed in view of the pulse in accordance with various aspects described herein.

To further our investigation into the guidance of these modes we utilized T3P to perform FEM time domain simulations. By directly exciting a particular field distribution onto the wire we can test propagation and loss, see FIG. 7Y. We utilize the same field distribution for excitation as was used for the frequency domain simulations in S3P. In the T3P simulations, we do see that these modes are guided along a wire. Table 5 presents a summarized list of the simulations that have been performed along with some details on the simulation parameters. Attenuation values for frequency domain driven modal and eigenmode simulations are listed for reference.

TABLE 7

Comparison between time domain simulation results for wire with 0.5 cm radius in T3P with S3P and eigenmode solver for reference.

| | | | T3P Time Domain | | S3P Frequency Domain | Eigenmode |
|---|---|---|---|---|---|---|
| Mode | Freq. (GHz) | Notes | Length (m) | Loss (dB/m) | Loss (dB/m) | Loss (dB/m) |
| $TM_0$ | 5 | Straight | 50 | −0.08 | −0.01 | −0.03 |
| $TM_0$ | 5 | 0.1 mm Water Film | | | −0.3 | −0.1 |
| $TM_0$ | 20 | Straight | | | −0.1 | −0.06 |
| $TM_0$ | 20 | 0.1 mm Water Film | | | −1.4 | −1.1 |
| $TM_1$ | 5 | 0.1 mm Water Film | | | | −0.18 |
| $TM_1$ | 5 | Sag - 0.1 mm Water Film | 25 | −0.52 | | |
| $TM_1$ | 12.5 | Straight | 10 | −0.09* | −0.07 | −0.01 |
| $TM_1$ | 12.5 | 0.1 mm Water Film | 10 | −0.05 | −0.05 | −0.03 |
| $TM_1$ | 12.5 | Sag | 10 | −0.07* | | |
| $TM_1$ | 12.5 | Sag 0.1 mm Water Film | 25 | −0.05 | | |
| $TM_1$ | 25 | Straight | | | −0.04 | −0.01 |
| $TM_1$ | 25 | 0.1 mm Water Film | | | −0.4 | −0.35 |
| $TM_1$ | 25 | Sag | 5 | −0.28* | | |
| $TM_1$ | 25 | Sag - 0.1 mm Water Film | 20 | −0.2 | | |
| $TM_{11}$ | 36 | 0.1 mm Water Film | 0.1 | −0.07 | −0.023 | −0.055 |
| $TM_{11}$ | 57 | 0.1 mm Water Film | | | −0.028 | −0.023 |
| $TM_{11}$ | 36 | Sag - 0.1 mm Water Film | 5 | −0.6[#] | | |
| $TM_{11}$ | 57 | Sag - 0.1 mm Water Film | 2 | −2.5[#] | | |

Figure 7Z:
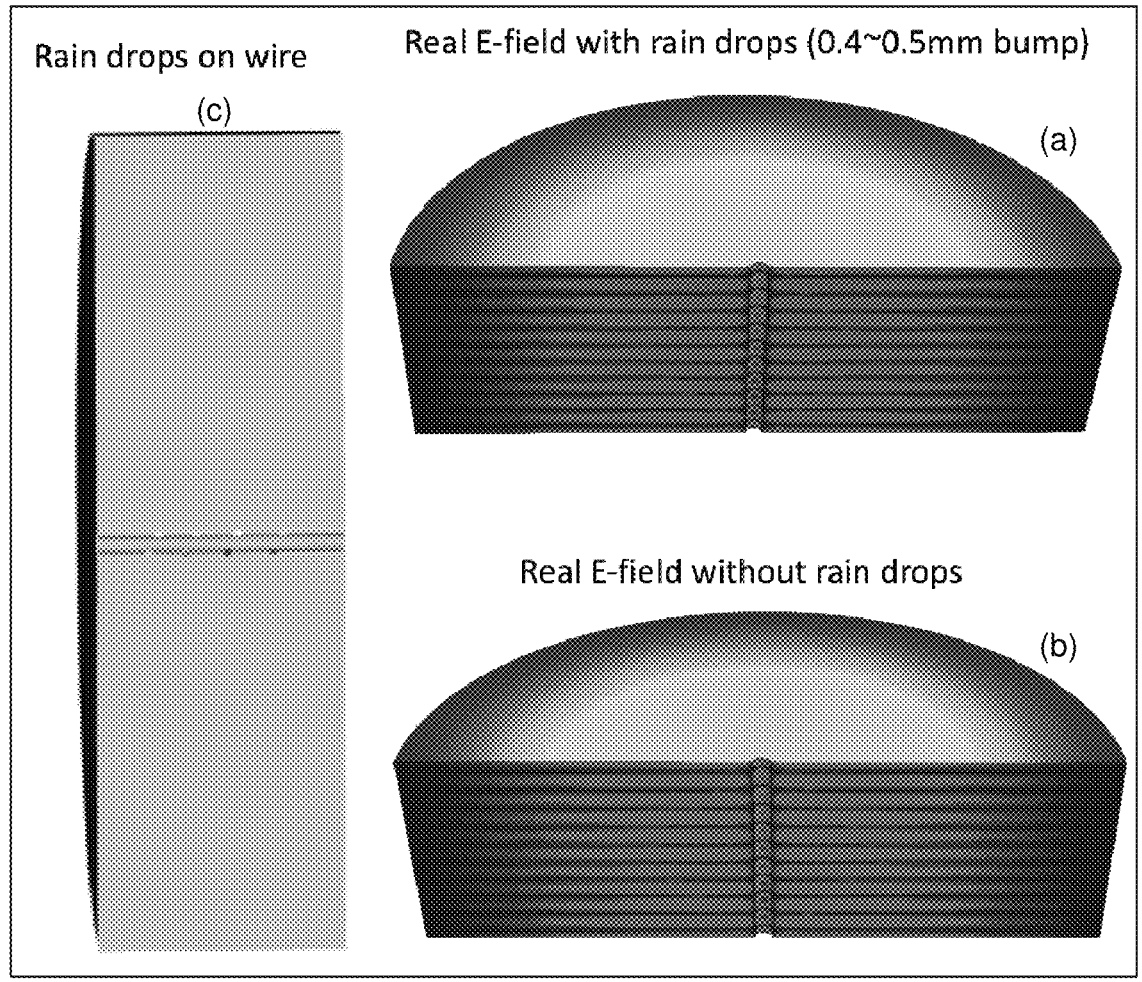
FIG. 7Z is a graphical diagram illustrating, an example, non-limiting embodiment of a comparison between two simulations at 12.5 GHz (a) with water droplets, (b) without water droplets with no observable difference in attenuation of the $TM_1$, and (c) water droplets on wire highlighted and appearing as colored dots in accordance with various aspects described herein.
Figure 7A:
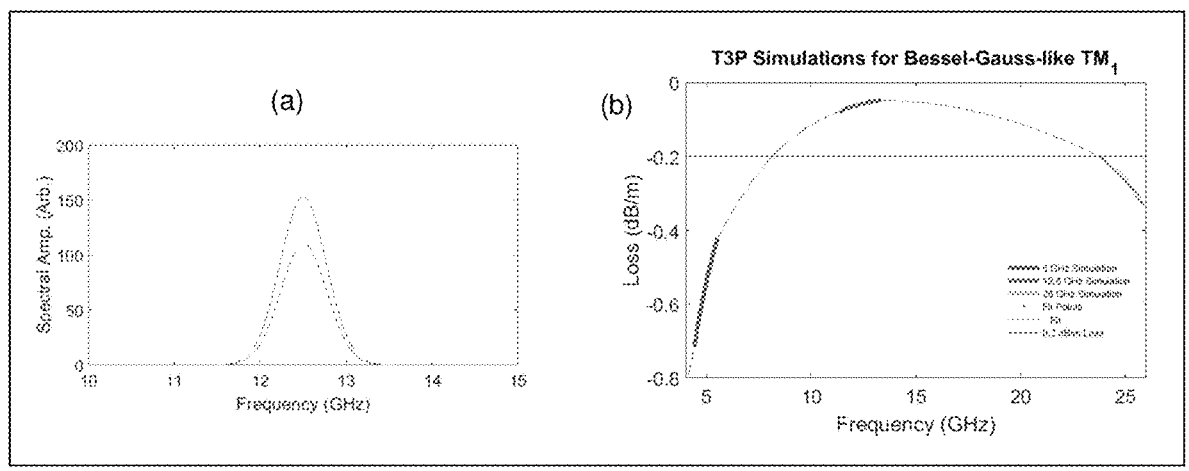
Figure 7A:
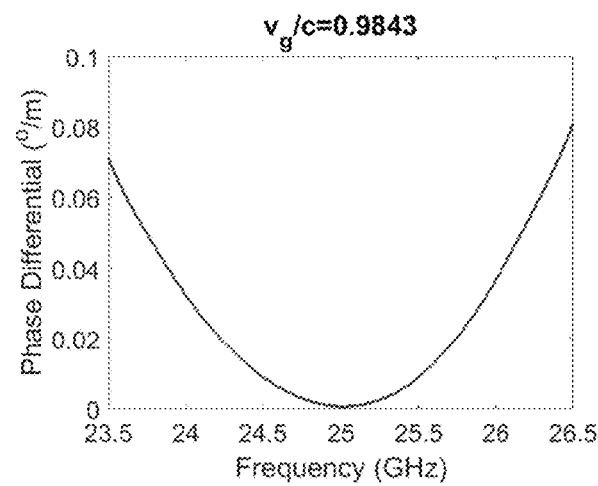

Water Droplets. We have also initiated our investigation into the impact of water droplets on the wire, which we expect to be limited due to the azimuthal asymmetry of the mode. Water droplets that are 0.5 mm thick were placed on a wire as shown in FIG. 7Z. For this simulation with the $TM_1$ at 12.5 GHz, there was no measurable increase in loss (−0.07 dB/m) or distortion to the field.

See also FIGS. 7AA-7AB. FIG. 7AA is a graphical diagram illustrating, an example, non-limiting embodiment of (a) spectral amplitude compared between input (blue) and out (red) pulse for a 1 ns 12.5 GHz $TM_1$ pulse for at 25 m simulation on a 0.5 cm radius wire with 0.1 mm water film; and (b) Calculated loss from spectral attenuation for various simulations of the $TM_1$ mode in accordance with various aspects described herein. FIG. 7AB is a graphical diagram illustrating, an example, non-limiting embodiment of dispersion as a function of frequency calculated from a 25 GHz $TM_1$ pulse in a 10 m simulation on a 0.5 cm radius wire with a 0.1 mm water film after removing the constant phase advance from the group velocity of the pulse in accordance with various aspects described herein.

It will be appreciated that the foregoing embodiments of the subject disclosure are not limited to a specific frequency, or frequency ranges as may be disclosed in the subject disclosure. It will also be appreciated that simulations described by the subject disclosure that are configured at a particular frequency or ranges of frequencies are illustrative and non-limiting. Accordingly, the couplers described by the subject disclosure can be configured to transmit and receive electromagnetic waves having the field structure described above at other operating frequencies not described in the subject disclosure.

It will be further appreciated that the foregoing embodiments of FIGS. 1-6, and 7A through 7AB can be combined in whole or in part with one another, and/or can be combined in whole or in part with other embodiments of the subject disclosure, and/or can be adapted for use in whole or in part with other embodiments of the subject disclosure.

It is also appreciated that any of the embodiments of the subject disclosure (singly or in any combination) which are adaptable for transmitting or receiving communication signals can be utilized as network elements for the distribution and/or routing of media content, voice communications, video streaming, internet traffic or other data transport. It is further appreciated that such network elements can be adapted or otherwise utilized in a communication network described below in relation to FIG. 8 for the distribution or routing of media content, voice communications, video streaming, internet traffic or other data transport. It is also appreciated that such network elements can also be configured to utilize virtualized communication network techniques described below in relation to FIG. 9.

Figure 8:
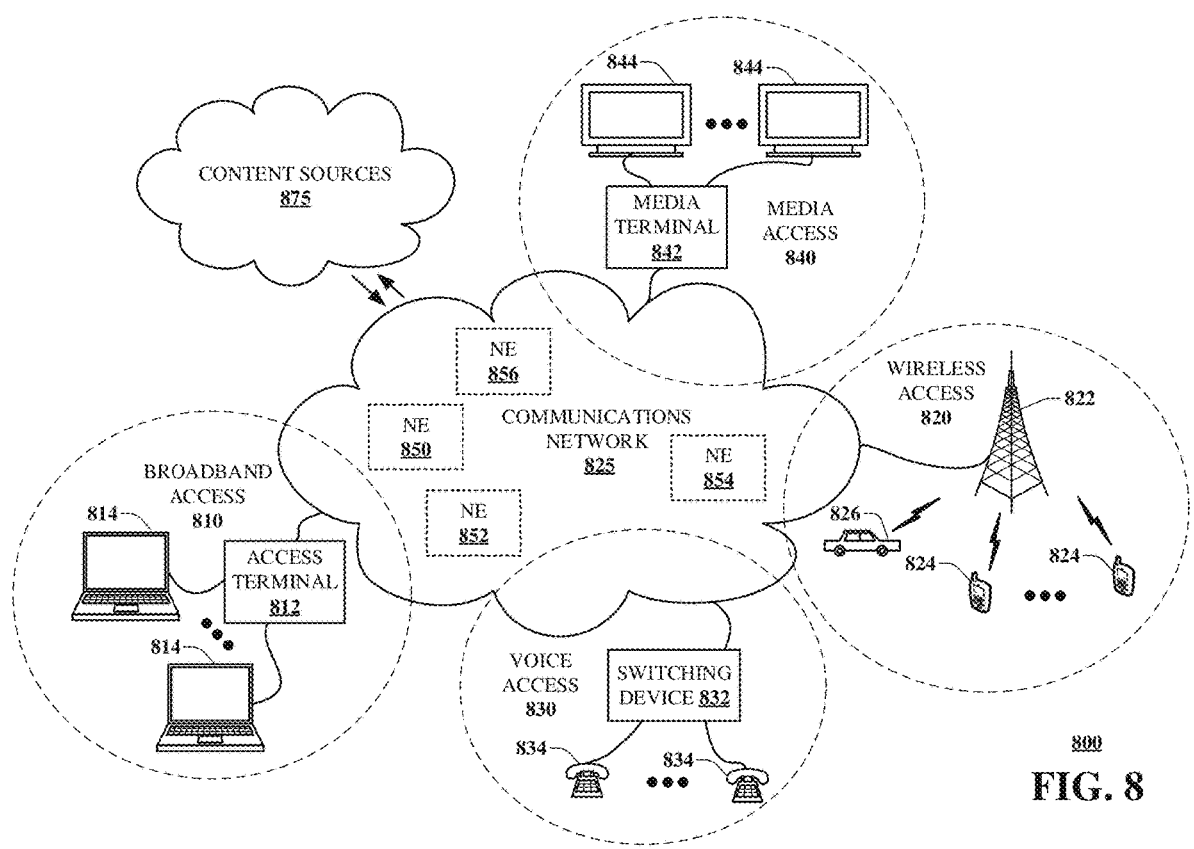
FIG. 8 is a block diagram illustrating an example, non-limiting embodiment of a communications network in accordance with various aspects described herein.

Referring now to FIG. 8, a block diagram is shown illustrating an example, non-limiting embodiment of a communications network 800 in accordance with various aspects described herein. In particular, a communications network 825 is presented for providing broadband access 810 to a plurality of data terminals 814 via access terminal 812, wireless access 820 to a plurality of mobile devices 824 and vehicle 826 via base station or access point 822, voice access 830 to a plurality of telephony devices 834, via switching device 832 and/or media access 840 to a plurality of audio/video display devices 844 via media terminal 842. In addition, communication network 825 is coupled to one or more content sources 875 of audio, video, graphics, text and/or other media. While broadband access 810, wireless access 820, voice access 830 and media access 840 are shown separately, one or more of these forms of access can be combined to provide multiple access services to a single client device (e.g., mobile devices 824 can receive media content via media terminal 842, data terminal 814 can be provided voice access via switching device 832, and so on).

The communications network 825 includes a plurality of network elements (NE) 850, 852, 854, 856, etc. for facilitating the broadband access 810, wireless access 820, voice access 830, media access 840 and/or the distribution of content from content sources 875. The communications network 825 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 812 can include a digital subscriber line access multiplexer (DSLAM), cable modem termination system (CMTS), optical line terminal (OLT) and/or other access terminal. The data terminals 814 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 822 can include a 4G, 5G, or higher generation base station, an access point that operates via an 802.11 standard such as 802.11n, 802.11ac, 802.11ag, 802.11agn or other wireless access terminal. The mobile devices 824 can include mobile phones, e-readers, tablets, phablets, wireless modems, and/or other mobile computing devices.

In various embodiments, the switching device 832 can include a private branch exchange or central office switch, a media services gateway, VoIP gateway or other gateway device and/or other switching device. The telephony devices 834 can include traditional telephones (with or without a terminal adapter), VoIP telephones and/or other telephony devices.

In various embodiments, the media terminal 842 can include a cable head-end or other TV head-end, a satellite receiver, gateway or other media terminal 842. The display devices 844 can include televisions with or without a set top box, personal computers and/or other display devices.

In various embodiments, the content sources 875 include broadcast television and radio sources, video on demand platforms and streaming video and audio services platforms, one or more content data networks, data servers, web servers and other content servers, and/or other sources of media.

In various embodiments, the communications network 825 can include wired, optical and/or wireless links and the network elements 850, 852, 854, 856, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

It will be appreciated that any of the subsystems (e.g., access terminal 812, network elements 850-856, media terminal 842, switching device 832, wireless access 820, and so on) of the communication network 800 can be configured or otherwise adapted to utilize in whole or in part any of the embodiments of the subject disclosure for transmitting and receiving communication signals via electromagnetic waves that propagate over wireless or physical transmission media.

Figure 9:
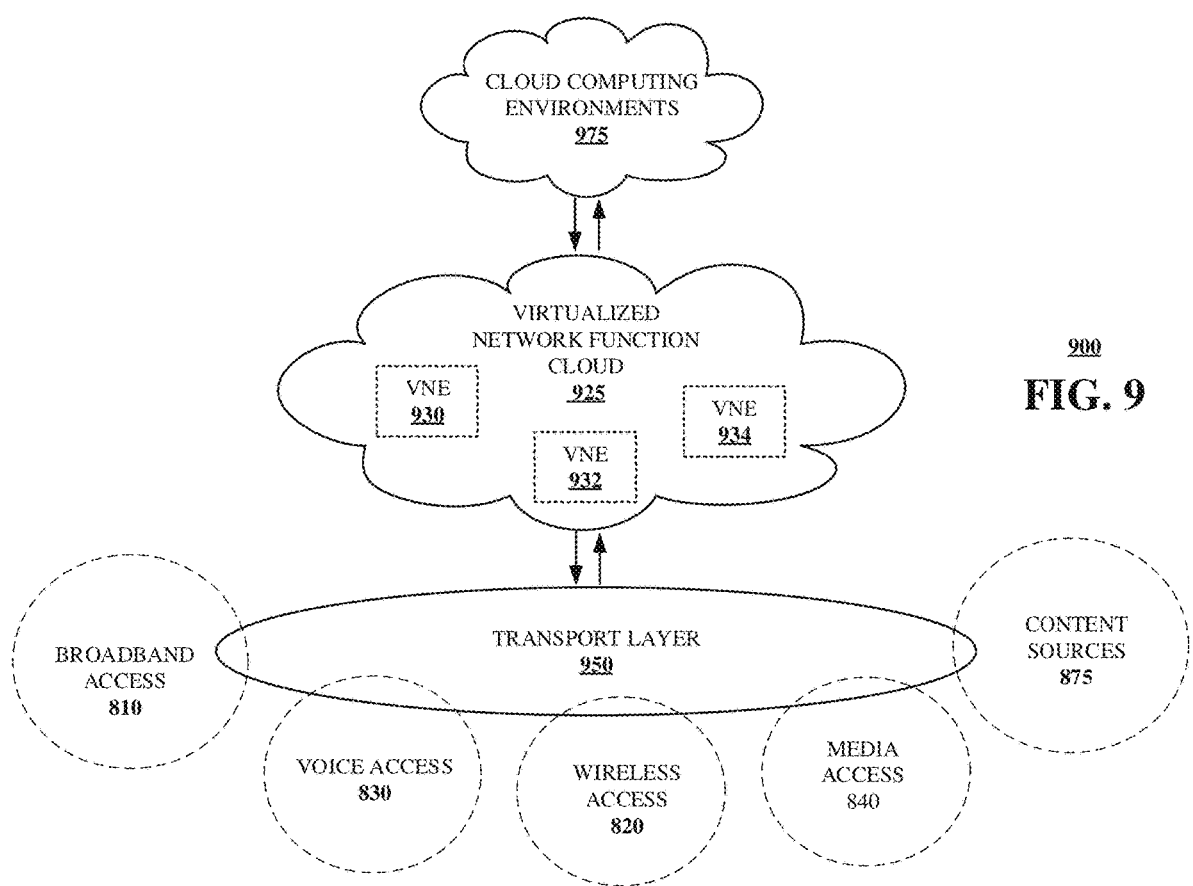
FIG. 9 is a block diagram illustrating an example, non-limiting embodiment of a virtualized communication network in accordance with various aspects described herein.

Referring now to FIG. 9, a block diagram 900 is shown illustrating an example, non-limiting embodiment of a virtualized communication network in accordance with various aspects described herein. In particular a virtualized communication network is presented that can be used to implement some or all of the subsystems and functions of communication network 800, some or all of the embodiments associated with waveguide systems and methods thereof, some or all of the embodiments associated with distributed antenna systems, or other embodiments and methods thereof described by the subject disclosure.

In particular, a cloud networking architecture is shown that leverages cloud technologies and supports rapid innovation and scalability via a transport layer 950, a virtualized network function cloud 925 and/or one or more cloud computing environments 975. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 930, 932, 934, etc. that perform some or all of the functions of network elements 850, 852, 854, 856, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 850 (shown in FIG. 8), such as an edge router can be implemented via a virtual network element 930 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 950 includes fiber, cable, wired and/or wireless transport elements, network elements and interfaces to provide broadband access 810, wireless access 820, voice access 830, media access 840 and/or access to content sources 875 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 930, 932 or 934. These network elements can be included in transport layer 950.

The virtualized network function cloud 925 interfaces with the transport layer 950 to provide the virtual network elements 930, 932, 934, etc. to provide specific NFVs. In particular, the virtualized network function cloud 925 leverages cloud operations, applications, and architectures to support networking workloads. The virtualized network elements 930, 932 and 934 can employ network function software that provides either a one-for-one mapping of traditional network element function or alternately some combination of network functions designed for cloud computing. For example, virtualized network elements 930, 932 and 934 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 930, 932, 934, etc. can be instantiated and managed using an orchestration approach similar to those used in cloud compute services.

The cloud computing environments 975 can interface with the virtualized network function cloud 925 via APIs that expose functional capabilities of the VNE 930, 932, 934, etc. to provide the flexible and expanded capabilities to the virtualized network function cloud 925. In particular, network workloads may have applications distributed across the virtualized network function cloud 925 and cloud computing environment 975 and in the commercial cloud, or might simply orchestrate workloads supported entirely in NFV infrastructure from these third party locations.

It will be appreciated that any of the foregoing techniques can be applied or combined in whole or in party with any embodiments of the subsystems and functions of communication network 800, some or all of the embodiments associated with waveguide systems and methods thereof, some or all of the embodiments associated with distributed antenna systems, as well as other embodiments and methods thereof described by the subject disclosure.

Figure 10:
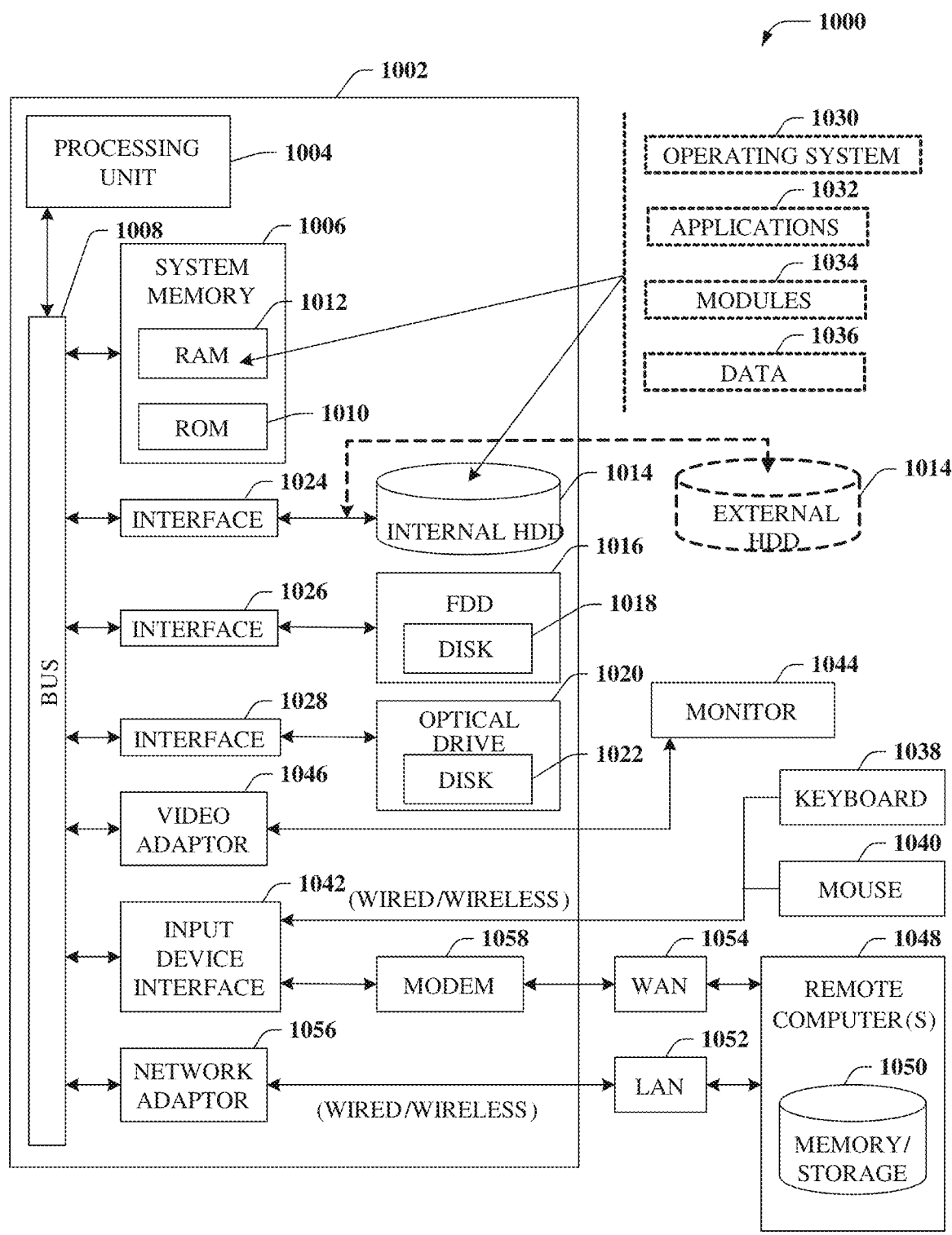
FIG. 10 is a block diagram of an example, non-limiting embodiment of a computing environment in accordance with various aspects described herein.

Referring now to FIG. 10, there is illustrated a block diagram of a computing environment in accordance with various aspects described herein. In order to provide additional context for various embodiments of the embodiments described herein, FIG. 10 and the following discussion are intended to provide a brief, general description of a suitable computing environment 1000 in which the various embodiments of the subject disclosure can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes processor as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment 1000 for transmitting and receiving signals via or forming at least part of a base station (e.g., base station devices 304, macrocell site 302) or central office (e.g., central office 301). At least a portion of the example environment 1000 can also be used for transmission devices 101 or 102. The example environment can comprise a computer 1002, the computer 1002 comprising a processing unit 1004, a system memory 1006 and a system bus 1008. The system bus 1008 couple's system components including, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems. Examples of application programs 1032 that can be implemented and otherwise executed by processing unit 1004 include the diversity selection determining performed by transmission device 101 or 102.

A user can enter commands and information into the computer 1002 through one or more wired/wireless input devices, e.g., a keyboard 1038 and a pointing device, such as a mouse 1040. Other input devices (not shown) can comprise a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. It will also be appreciated that in alternative embodiments, a monitor 1044 can also be any display device (e.g., another computer having a display, a smart phone, a tablet computer, etc.) for receiving display information associated with computer 1002 via any communication means, including via the Internet and cloud-based networks. In addition to the monitor 1044, a computer typically comprises other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also comprise a wireless AP disposed thereon for communicating with the wireless adapter 1056.

When used in a WAN networking environment, the computer 1002 can comprise a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and Bluetooth® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 11:
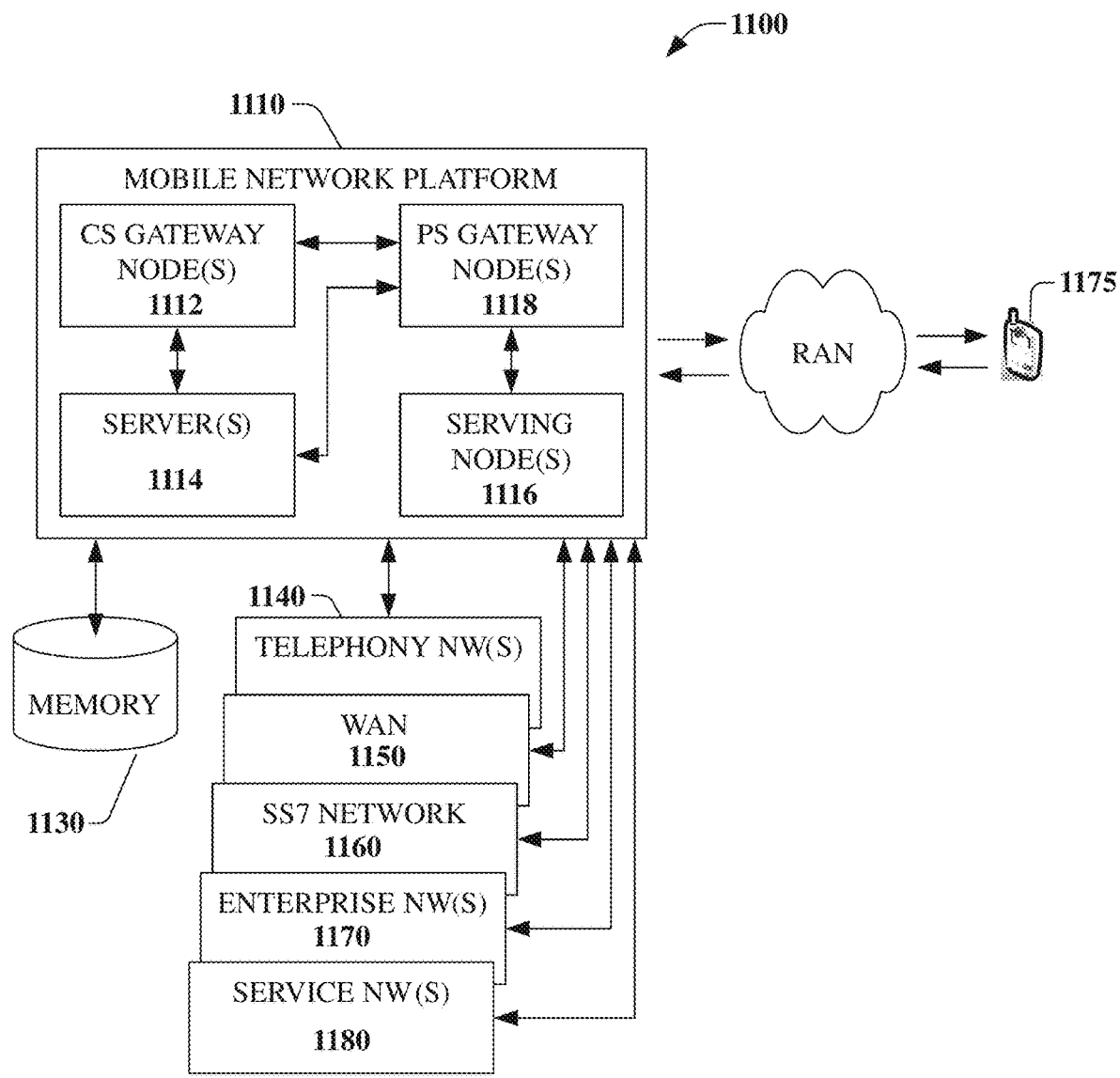
FIG. 11 is a block diagram of an example, non-limiting embodiment of a mobile network platform in accordance with various aspects described herein.

FIG. 11 presents an example embodiment 1100 of a mobile network platform 1110 that can implement and exploit one or more aspects of the disclosed subject matter described herein. In one or more embodiments, the mobile network platform 1110 can generate and receive signals transmitted and received by base stations (e.g., base station devices 304, macrocell site 302), central office (e.g., central office 301), or transmission device 101 or 102 associated with the disclosed subject matter. Generally, wireless network platform 1110 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 comprises CS gateway node(s) 1122 which can interface CS traffic received from legacy networks like telephony network(s) 1140 (e.g., public switched telephone network (PSTN), or public land mobile network (PLMN)) or a signaling system #7 (SS7) network 1160. Circuit switched gateway node(s) 1122 can authorize and authenticate traffic (e.g., voice) arising from such networks. Additionally, CS gateway node(s) 1122 can access mobility, or roaming, data generated through SS7 network 1160; for instance, mobility data stored in a visited location register (VLR), which can reside in memory 1130. Moreover, CS gateway node(s) 1122 interfaces CS-based traffic and signaling and PS gateway node(s) 1118. As an example, in a 3GPP UMTS network, CS gateway node(s) 1122 can be realized at least in part in gateway GPRS support node(s) (GGSN). It should be appreciated that functionality and specific operation of CS gateway node(s) 1122, PS gateway node(s) 1118, and serving node(s) 1116, is provided and dictated by radio technologies utilized by mobile network platform 1110 for telecommunication.

In addition to receiving and processing CS-switched traffic and signaling, PS gateway node(s) 1118 can authorize and authenticate PS-based data sessions with served mobile devices. Data sessions can comprise traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1170 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also comprises serving node(s) 1116 that, based upon available radio technology layer(s), convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1122 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as the distributed antennas networks shown in FIG. 1 that enhance wireless service coverage by providing more network coverage.

It is to be noted that server(s) 1114 can comprise one or more processors configured to confer at least in part the functionality of macro network platform 1110. To that end, the one or more processor can execute code instructions stored in memory 1130, for example. It is should be appreciated that server(s) 1114 can comprise a content manager, which operates in substantially the same manner as described hereinbefore.

In example embodiment 1100, memory 1130 can store information related to operation of wireless network platform 1110. Other operational information can comprise provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1170, or SS7 network 1160. In an aspect, memory 1130 can be, for example, accessed as part of a data store component or as a remotely connected memory store.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 12:
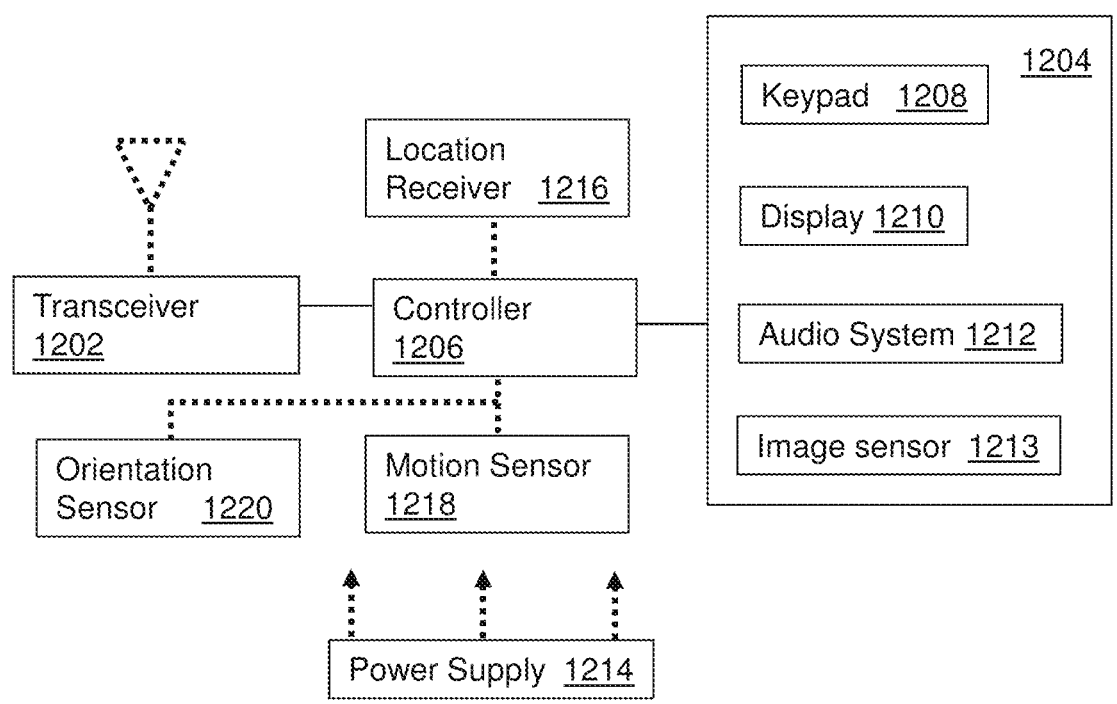
FIG. 12 is a block diagram of an example, non-limiting embodiment of a communication device in accordance with various aspects described herein.

FIG. 12 depicts an illustrative embodiment of a communication device 1200. The communication device 1200 can serve as an illustrative embodiment of devices such as mobile devices and in-building devices referred to by the subject disclosure (e.g., in FIGS. 3 and 5A-5B).

The communication device 1200 can comprise a wireline and/or wireless transceiver 1202 (herein transceiver 1202), a user interface (UI) 1204, a power supply 1214, a location receiver 1216, a motion sensor 1218, an orientation sensor 1220, and a controller 1206 for managing operations thereof. The transceiver 1202 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/

GPRS, TDMA/EDGE, EV/DO, WiMAX, SDR, LTE, as well as other next generation wireless communication technologies as they arise. The transceiver 1202 can also be adapted to support circuit-switched wireline access technologies (such as PSTN), packet-switched wireline access technologies (such as TCP/IP, VoIP, etc.), and combinations thereof.

The UI 1204 can include a depressible or touch-sensitive keypad 1208 with a navigation mechanism such as a roller ball, a joystick, a mouse, or a navigation disk for manipulating operations of the communication device 1200. The keypad 1208 can be an integral part of a housing assembly of the communication device 1200 or an independent device operably coupled thereto by a tethered wireline interface (such as a USB cable) or a wireless interface supporting for example Bluetooth®. The keypad 1208 can represent a numeric keypad commonly used by phones, and/or a QWERTY keypad with alphanumeric keys. The UI 1204 can further include a display 1210 such as monochrome or color LCD (Liquid Crystal Display), OLED (Organic Light Emitting Diode) or other suitable display technology for conveying images to an end user of the communication device 1200. In an embodiment where the display 1210 is touch-sensitive, a portion or all of the keypad 1208 can be presented by way of the display 1210 with navigation features.

The display 1210 can use touch screen technology to also serve as a user interface for detecting user input. As a touch screen display, the communication device 1200 can be adapted to present a user interface having graphical user interface (GUI) elements that can be selected by a user with a touch of a finger. The touch screen display 1210 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1210 can be an integral part of the housing assembly of the communication device 1200 or an independent device communicatively coupled thereto by a tethered wireline interface (such as a cable) or a wireless interface.

The UI 1204 can also include an audio system 1212 that utilizes audio technology for conveying low volume audio (such as audio heard in proximity of a human ear) and high volume audio (such as speakerphone for hands free operation). The audio system 1212 can further include a microphone for receiving audible signals of an end user. The audio system 1212 can also be used for voice recognition applications. The UI 1204 can further include an image sensor 1213 such as a charged coupled device (CCD) camera for capturing still or moving images.

The power supply 1214 can utilize common power management technologies such as replaceable and rechargeable batteries, supply regulation technologies, and/or charging system technologies for supplying energy to the components of the communication device 1200 to facilitate long-range or short-range portable communications. Alternatively, or in combination, the charging system can utilize external power sources such as DC power supplied over a physical interface such as a USB port or other suitable tethering technologies.

The location receiver 1216 can utilize location technology such as a global positioning system (GPS) receiver capable of assisted GPS for identifying a location of the communication device 1200 based on signals generated by a constellation of GPS satellites, which can be used for facilitating location services such as navigation. The motion sensor 1218 can utilize motion sensing technology such as an accelerometer, a gyroscope, or other suitable motion sensing technology to detect motion of the communication device 1200 in three-dimensional space. The orientation sensor 1220 can utilize orientation sensing technology such as a magnetometer to detect the orientation of the communication device 1200 (north, south, west, and east, as well as combined orientations in degrees, minutes, or other suitable orientation metrics).

The communication device 1200 can use the transceiver 1202 to also determine a proximity to a cellular, WiFi, Bluetooth©, or other wireless access points by sensing techniques such as utilizing a received signal strength indicator (RSSI) and/or signal time of arrival (TOA) or time of flight (TOF) measurements. The controller 1206 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1200.

Other components not shown in FIG. 12 can be used in one or more embodiments of the subject disclosure. For instance, the communication device 1200 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. For example, artificial intelligence can be used in optional training controller 230 evaluate and select candidate frequencies, modulation schemes, MIMO modes, and/or guided wave modes in order to maximize transfer efficiency. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
  a coupler operative to receive a signal from a transmitter and to induce a first electromagnetic wave that propagates along a physical transmission medium, wherein the coupler has a non-linear structure, the non-linear structure converting the signal into a plurality of wave modes that combines to form the first electromagnetic wave, and the first electromagnetic wave having a first electromagnetic field configuration having a depth of focus that reduces leakage of the first electromagnetic wave.

2. The device of claim 1, wherein the non-linear structure of the coupler causes the plurality of wave modes to have the depth of focus that results in the first electromagnetic wave having the first electromagnetic field configuration.

3. The device of claim 1, wherein the non-linear structure of the coupler converts the signal into the plurality of wave modes.

4. The device of claim 1, wherein the non-linear structure of the coupler comprises a hollow tapered structure with an inner surface that conforms to a non-linear surface.

5. The device of claim 1, wherein the non-linear structure is metallic.

6. The device of claim 1, wherein the non-linear structure of the coupler defines an aperture formed from a dielectric material that causes the plurality of wave modes to have the depth of focus that results in the first electromagnetic field configuration.

7. The device of claim 6, wherein the dielectric material comprises a plurality of sections, and wherein each respective section the plurality of sections has a respective depth of a plurality of differing depths.

8. The device of claim 7, wherein each respective section of the plurality of sections has a respective frontal width of a plurality of differing frontal widths defined by a corresponding plurality of radii.

9. The device of claim 8, wherein the plurality of differing frontal widths and the plurality of differing depths of the plurality of sections convert the signal into the plurality of wave modes having the depth of focus that results in the first electromagnetic field configuration.

10. The device of claim 1, wherein an aperture of the coupler is structurally configured to convert the signal to the plurality of wave modes.

11. The device of claim 1, wherein the depth of focus of the plurality of wave modes increases a concentration of electromagnetic fields of the first electromagnetic wave.

12. The device of claim 1, wherein the coupler is further operative to receive a second electromagnetic wave propagating along the physical transmission medium, wherein the second electromagnetic wave has a second electromagnetic field configuration that reduces leakage of the second electromagnetic wave as the second electromagnetic wave propagates along the physical transmission medium towards the coupler.

13. A method, comprising:
receiving data; and
causing a transmitter to transmit a signal that conveys the data, wherein a non-linear coupler coupled to the transmitter converts the signal into a plurality of wave modes that combines to form a first electromagnetic wave that propagates along a transmission medium, and wherein the plurality of wave modes when combined have a depth of focus that increases a concentration of electromagnetic fields of the first electromagnetic wave to reduce a leakage of the first electromagnetic wave.

14. The method of claim 13, wherein the non-linear coupler comprises a non-linear surface that converts the signal into the plurality of wave modes.

15. The method of claim 13, wherein the non-linear coupler comprises a non-linear structure that defines an aperture formed from a dielectric material that converts the signal into the plurality of wave modes to have the depth of focus that increases the concentration of electromagnetic fields.

16. The method of claim 13, wherein causing a transmitter to transmit a signal comprises inducing an electromagnetic wave that approximates a Bessel-shaped waveform.

17. The method of claim 13, wherein the causing the transmitter to transmit the signal comprises inducing an electromagnetic wave that approximates a Bessel-Gauss-shaped waveform.

18. A communication device, comprising:
a processing system including a processor; and
a memory that stores executable instructions that, when executed by the processing system, facilitate performance of operations, the operations comprising:
detecting an obstruction that increases a propagation loss of a first electromagnetic wave as the first electromagnetic wave propagates along a physical transmission medium; and
responsive to the detecting, inducing via a non-linear coupler a propagation of a second electromagnetic wave along the physical transmission medium, wherein the second electromagnetic wave comprises an electromagnetic field configuration, wherein a first portion of the electromagnetic field configuration has a first intensity, wherein a second portion of the electromagnetic field configuration has a second intensity, wherein the first intensity of the first portion of the electromagnetic field configuration is greater than the second intensity of the second portion of the electromagnetic field configuration, and wherein the first portion of the electromagnetic field configuration is positioned away from the obstruction to reduce the propagation loss caused by the obstruction.

19. The communication device of claim 18, wherein the second portion of the electromagnetic field configuration enables guidance of the second electromagnetic wave along the physical transmission medium.

20. The communication device of claim 18, wherein the non-linear coupler produces a plurality of wave modes that combines to form the second electromagnetic wave.

* * * * *